US010389136B2

(12) United States Patent
Drees

(10) Patent No.: US 10,389,136 B2
(45) Date of Patent: Aug. 20, 2019

(54) PHOTOVOLTAIC ENERGY SYSTEM WITH VALUE FUNCTION OPTIMIZATION

(71) Applicant: Con Edison Battery Storage, LLC, Valhalla, NY (US)

(72) Inventor: Kirk H. Drees, Cedarburg, WI (US)

(73) Assignee: Con Edison Battery Storage, LLC, Valhalla, NY (US)

( * ) Notice: Subject to any disclaimer, the term of this patent is extended or adjusted under 35 U.S.C. 154(b) by 246 days.

(21) Appl. No.: 15/247,844

(22) Filed: Aug. 25, 2016

(65) Prior Publication Data

US 2017/0104337 A1 Apr. 13, 2017

Related U.S. Application Data

(60) Provisional application No. 62/239,249, filed on Oct. 8, 2015, provisional application No. 62/239,246, filed
(Continued)

(51) Int. Cl.

| | |
|---|---|
| ***H02J 9/00*** | (2006.01) |
| ***H02J 3/38*** | (2006.01) |
| ***H02J 3/32*** | (2006.01) |
| ***H02J 7/35*** | (2006.01) |
| ***H02S 40/32*** | (2014.01) |

(Continued)

(52) U.S. Cl.
CPC .......... *H02J 3/385* (2013.01); *G06Q 30/0283* (2013.01); *H02J 3/32* (2013.01); *H02J 3/383* (2013.01); *H02J 7/35* (2013.01); *H02S 40/32* (2014.12); *H02S 40/38* (2014.12); *H02S 50/00* (2013.01); *Y02E 10/563* (2013.01); *Y02E 10/566* (2013.01); *Y02E 70/30* (2013.01); *Y04S 50/14* (2013.01)

(58) Field of Classification Search
USPC .......... 307/66
See application file for complete search history.

(56) References Cited

U.S. PATENT DOCUMENTS

| | | | |
|---|---|---|---|
| 4,349,869 | A | 9/1982 | Prett et al. |
| 4,616,308 | A | 10/1986 | Morshedi et al. |

(Continued)

FOREIGN PATENT DOCUMENTS

| | | | |
|---|---|---|---|
| CN | 102566435 | B | 10/2013 |
| CN | 102891495 | | 1/2016 |

(Continued)

OTHER PUBLICATIONS

U.S. Office Action on U.S. Appl. No. 15/247,793 dated May 10, 2018. 9 pages.

(Continued)

*Primary Examiner* — Rexford N Barnie
*Assistant Examiner* — Dru Parries
(74) *Attorney, Agent, or Firm* — Michael Best & Friedrich LLP

(57) ABSTRACT

A photovoltaic energy system includes a photovoltaic field configured to convert solar energy into electrical energy, a power inverter configured to control an electric power output of the photovoltaic field, and a controller. The controller can determine optimal power setpoints for the power inverter by optimizing a value function that includes a penalty cost for failing to comply with a ramp rate limit and photovoltaic revenue.

19 Claims, 17 Drawing Sheets

Related U.S. Application Data on Oct. 8, 2015, provisional application No. 62/239,131, filed on Oct. 8, 2015, provisional application No. 62/239,231, filed on Oct. 8, 2015, provisional application No. 62/239,233, filed on Oct. 8, 2015.

(51) Int. Cl.

| | |
|---|---|
| ***H02S 40/38*** | (2014.01) |
| ***G06Q 30/02*** | (2012.01) |
| ***H02S 50/00*** | (2014.01) |

(56) References Cited

U.S. PATENT DOCUMENTS

| | | | |
|---|---|---|---|
| 5,301,101 | A | 4/1994 | MacArthur et al. |
| 5,347,446 | A | 9/1994 | Iino et al. |
| 5,351,184 | A | 9/1994 | Lu et al. |
| 5,408,406 | A | 4/1995 | Mathur et al. |
| 5,442,544 | A | 8/1995 | Jelinek |
| 5,519,605 | A | 5/1996 | Cawlfield |
| 5,572,420 | A | 11/1996 | Lu |
| 5,867,384 | A | 2/1999 | Drees et al. |
| 6,055,483 | A | 4/2000 | Lu |
| 6,122,555 | A | 9/2000 | Lu |
| 6,278,899 | B1 | 8/2001 | Piche et al. |
| 6,347,254 | B1 | 2/2002 | Lu |
| 6,459,939 | B1 | 10/2002 | Hugo |
| 6,757,591 | B2 | 6/2004 | Kramer |
| 6,807,510 | B1 | 10/2004 | Backstrom et al. |
| 6,900,556 | B2 | 5/2005 | Provanzana et al. |
| 7,050,863 | B2 | 5/2006 | Mehta et al. |
| 7,050,866 | B2 | 5/2006 | Martin et al. |
| 7,113,890 | B2 | 9/2006 | Frerichs et al. |
| 7,152,023 | B2 | 12/2006 | Das |
| 7,165,399 | B2 | 1/2007 | Stewart |
| 7,188,779 | B2 | 3/2007 | Alles |
| 7,197,485 | B2 | 3/2007 | Fuller |
| 7,203,554 | B2 | 4/2007 | Fuller |
| 7,266,416 | B2 | 9/2007 | Gallestey et al. |
| 7,272,454 | B2 | 9/2007 | Wojsznis et al. |
| 7,275,374 | B2 | 10/2007 | Stewart et al. |
| 7,328,074 | B2 | 2/2008 | Das et al. |
| 7,328,577 | B2 | 2/2008 | Stewart et al. |
| 7,376,471 | B2 | 5/2008 | Das et al. |
| 7,376,472 | B2 | 5/2008 | Wojsznis et al. |
| 7,389,773 | B2 | 6/2008 | Stewart et al. |
| 7,400,933 | B2 | 7/2008 | Rawlings et al. |
| 7,418,372 | B2 | 8/2008 | Nishira et al. |
| 7,454,253 | B2 | 11/2008 | Fan |
| 7,496,413 | B2 | 2/2009 | Fan et al. |
| 7,577,483 | B2 | 8/2009 | Fan et al. |
| 7,591,135 | B2 | 9/2009 | Stewart |
| 7,610,108 | B2 | 10/2009 | Boe et al. |
| 7,650,195 | B2 | 1/2010 | Fan et al. |
| 7,664,573 | B2 | 2/2010 | Ahmed |
| 7,676,283 | B2 | 3/2010 | Liepold et al. |
| 7,826,909 | B2 | 11/2010 | Attarwala |
| 7,827,813 | B2 | 11/2010 | Seem |
| 7,839,027 | B2 | 11/2010 | Shelton et al. |
| 7,844,352 | B2 | 11/2010 | Vouzis et al. |
| 7,856,281 | B2 | 12/2010 | Thiele et al. |
| 7,878,178 | B2 | 2/2011 | Stewart et al. |
| 7,894,943 | B2 | 2/2011 | Sloup et al. |
| 7,930,045 | B2 | 4/2011 | Cheng |
| 7,945,352 | B2 | 5/2011 | Koc |
| 7,949,416 | B2 | 5/2011 | Fuller |
| 7,987,005 | B2 | 7/2011 | Rund |
| 7,987,145 | B2 | 7/2011 | Baramov |
| 7,996,140 | B2 | 8/2011 | Stewart et al. |
| 8,005,575 | B2 | 8/2011 | Kirchhof |
| 8,032,235 | B2 | 10/2011 | Sayyar-Rodsari |
| 8,036,758 | B2 | 10/2011 | Lu et al. |
| 8,046,089 | B2 | 10/2011 | Renfro et al. |
| 8,060,258 | B2 | 11/2011 | Butoyi |
| 8,060,290 | B2 | 11/2011 | Stewart et al. |
| 8,073,659 | B2 | 12/2011 | Gugaliya et al. |
| 8,078,291 | B2 | 12/2011 | Pekar et al. |
| 8,096,140 | B2 | 1/2012 | Seem |
| 8,105,029 | B2 | 1/2012 | Egedal et al. |
| 8,109,255 | B2 | 2/2012 | Stewart et al. |
| 8,121,818 | B2 | 2/2012 | Gorinevsky |
| 8,126,575 | B2 | 2/2012 | Attarwala |
| 8,145,329 | B2 | 3/2012 | Pekar et al. |
| 8,180,493 | B1 | 5/2012 | Laskow |
| 8,185,217 | B2 | 5/2012 | Thiele |
| 8,200,346 | B2 | 6/2012 | Thiele |
| 8,295,989 | B2 | 10/2012 | Rettger et al. |
| 8,489,666 | B1 | 7/2013 | Nikitin |
| 8,492,926 | B2 | 7/2013 | Collins et al. |
| 8,495,888 | B2 | 7/2013 | Seem |
| 8,583,520 | B1 | 11/2013 | Forbes, Jr. |
| 8,600,561 | B1 | 12/2013 | Modi et al. |
| 8,600,571 | B2 | 12/2013 | Dillon et al. |
| 8,843,238 | B2 | 9/2014 | Wenzel et al. |
| 8,901,411 | B2 | 12/2014 | Liu et al. |
| 8,914,158 | B2 | 12/2014 | Geinzer et al. |
| 8,922,056 | B2 | 12/2014 | Thisted |
| 9,002,532 | B2 | 4/2015 | Asmus |
| 9,002,761 | B2 | 4/2015 | Montalvo |
| 9,061,599 | B2 | 6/2015 | Sisk |
| 9,235,657 | B1 | 1/2016 | Wenzel et al. |
| 2004/0095237 | A1 | 5/2004 | Chen et al. |
| 2005/0062289 | A1 | 3/2005 | Cho et al. |
| 2007/0080675 | A1 | 4/2007 | Gray et al. |
| 2007/0087756 | A1 | 4/2007 | Hoffberg |
| 2009/0094173 | A1 | 4/2009 | Smith et al. |
| 2009/0254396 | A1 | 10/2009 | Metcalfe |
| 2009/0313083 | A1 | 12/2009 | Dillon et al. |
| 2009/0319090 | A1 | 12/2009 | Dillon et al. |
| 2010/0087933 | A1 | 4/2010 | Cheng |
| 2010/0198420 | A1 | 8/2010 | Rettger et al. |
| 2010/0198421 | A1 | 8/2010 | Fahimi et al. |
| 2010/0235004 | A1 | 9/2010 | Thind |
| 2010/0269854 | A1 | 10/2010 | Barbieri et al. |
| 2011/0022193 | A1 | 1/2011 | Panaitescu |
| 2011/0060424 | A1 | 3/2011 | Havlena |
| 2011/0066258 | A1 | 3/2011 | Torzhkov et al. |
| 2011/0088000 | A1 | 4/2011 | Mackay |
| 2011/0125293 | A1 | 5/2011 | Havlena |
| 2011/0184565 | A1 | 7/2011 | Peterson |
| 2011/0190958 | A1 | 8/2011 | Hirst |
| 2011/0221276 | A1 | 9/2011 | Geinzer et al. |
| 2011/0257789 | A1 | 10/2011 | Stewart et al. |
| 2011/0264289 | A1 | 10/2011 | Sawyer et al. |
| 2011/0276269 | A1 | 11/2011 | Hummel |
| 2011/0301723 | A1 | 12/2011 | Pekar et al. |
| 2012/0010757 | A1 | 1/2012 | Francino et al. |
| 2012/0059351 | A1 | 3/2012 | Nordh |
| 2012/0060505 | A1 | 3/2012 | Fuller et al. |
| 2012/0083930 | A1 | 4/2012 | Ilic et al. |
| 2012/0109620 | A1 | 5/2012 | Gaikwad et al. |
| 2012/0116546 | A1 | 5/2012 | Sayyar-Rodsari |
| 2012/0130555 | A1 | 5/2012 | Jelinek |
| 2012/0143385 | A1 | 6/2012 | Goldsmith |
| 2012/0215362 | A1 | 8/2012 | Stagner |
| 2012/0232701 | A1 | 9/2012 | Carty et al. |
| 2012/0261990 | A1 | 10/2012 | Collins et al. |
| 2012/0323396 | A1 | 12/2012 | Shelton et al. |
| 2012/0326511 | A1 | 12/2012 | Johnson |
| 2013/0099565 | A1 | 4/2013 | Sachs et al. |
| 2013/0138285 | A1 | 5/2013 | Bozchalui et al. |
| 2013/0154583 | A1 | 6/2013 | Shi et al. |
| 2013/0184884 | A1 | 7/2013 | More et al. |
| 2013/0204443 | A1 | 8/2013 | Steven et al. |
| 2013/0212410 | A1 | 8/2013 | Li et al. |
| 2013/0300194 | A1 | 11/2013 | Palmer et al. |
| 2013/0345880 | A1 | 12/2013 | Asmus |
| 2014/0037909 | A1 | 2/2014 | Hawwa et al. |
| 2014/0039709 | A1 | 2/2014 | Steven et al. |
| 2014/0049109 | A1 | 2/2014 | Kearns et al. |
| 2014/0052308 | A1 | 2/2014 | Hanafusa |
| 2014/0089692 | A1 | 3/2014 | Hanafusa |
| 2014/0100810 | A1 | 4/2014 | Nielsen |
| 2014/0152009 | A1 | 6/2014 | Meisner et al. |
| 2014/0159491 | A1 | 6/2014 | Kusunose |

(56) References Cited

U.S. PATENT DOCUMENTS

| | | | |
|---|---|---|---|
| 2014/0239722 A1 | 8/2014 | Arai et al. | |
| 2014/0279361 A1 | 9/2014 | Streeter et al. | |
| 2014/0336840 A1 | 11/2014 | Geinzer et al. | |
| 2014/0354239 A1 | 12/2014 | Miyazaki et al. | |
| 2014/0358316 A1 | 12/2014 | Shichiri | |
| 2015/0002105 A1 | 1/2015 | Kelly | |
| 2015/0008884 A1 | 1/2015 | Waki et al. | |
| 2015/0019034 A1* | 1/2015 | Gonatas ............ | H01L 31/02021 700/291 |
| 2015/0021991 A1 | 1/2015 | Wood et al. | |
| 2015/0045962 A1 | 2/2015 | Wenzel et al. | |
| 2015/0046221 A1 | 2/2015 | Narayan et al. | |
| 2015/0084339 A1 | 3/2015 | McDaniel et al. | |
| 2015/0088315 A1 | 3/2015 | Behrangrad | |
| 2015/0094870 A1 | 4/2015 | Fornage et al. | |
| 2015/0094968 A1 | 4/2015 | Jia et al. | |
| 2015/0127425 A1 | 5/2015 | Greene et al. | |
| 2015/0277467 A1 | 10/2015 | Steven et al. | |
| 2015/0283912 A1 | 10/2015 | Shimizu et al. | |
| 2016/0028234 A1 | 1/2016 | Watanabe et al. | |
| 2016/0047862 A1 | 2/2016 | Shimizu et al. | |
| 2016/0190810 A1 | 6/2016 | Bhavaraju et al. | |
| 2016/0241042 A1 | 8/2016 | Mammoli et al. | |
| 2016/0254671 A1 | 9/2016 | Cutright et al. | |
| 2016/0315475 A1 | 10/2016 | Carlson et al. | |
| 2017/0060113 A1 | 3/2017 | Kaucic et al. | |
| 2017/0090440 A1 | 3/2017 | Eck et al. | |
| 2017/0104345 A1 | 4/2017 | Wenzel et al. | |

FOREIGN PATENT DOCUMENTS

| | | |
|---|---|---|
| EP | 2 506 380 | 10/2012 |
| EP | 2 549 617 | 1/2013 |
| EP | 2 660 943 | 11/2013 |
| EP | 2 773 008 | 9/2014 |
| EP | 2 871 742 | 5/2015 |
| JP | 2014-233096 | 12/2014 |
| WO | WO 02/15365 | 2/2002 |
| WO | WO-2010/042550 | 4/2010 |
| WO | WO-2010/057250 | 5/2010 |
| WO | WO-2010/094012 | 8/2010 |
| WO | WO-2011/080548 | 7/2011 |
| WO | WO-2012/122234 | 9/2012 |
| WO | WO 2013/063581 | 5/2013 |
| WO | WO-2014/016727 | 1/2014 |
| WO | WO 2015/019541 | 2/2015 |
| WO | WO 2015/139061 | 9/2015 |

OTHER PUBLICATIONS

U.S. Office Action on U.S. Appl. No. 15/247,880 dated May 11, 2018. 12 pages.

U.S. Office Action on U.S. Appl. No. 15/247,777 dated Feb. 9, 2018. 25 pages.

U.S. Office Action on U.S. Appl. No. 15/247,784 dated Apr. 19, 2018. 7 pages.

U.S. Office Action on U.S. Appl. No. 15/247,788 dated May 7, 2018. 19 pages.

U.S. Office Action on U.S. Appl. No. 15/247,875 dated Feb. 8, 2018. 27 pages.

U.S. Office Action on U.S. Appl. No. 15/247,881 dated Mar. 8, 2018. 25 pages.

U.S. Office Action on U.S. Appl. No. 15/247,883 dated Mar. 21, 2018. 36 pages.

U.S. Office Action on U.S. Appl. No. 15/247,885 dated Apr. 16, 2018. 33 pages.

U.S. Office Action on U.S. Appl. No. 15/247,886 dated Feb. 9, 2018. 7 pages.

Office Action on European Patent Application No. 16787642.4 dated Jun. 21, 2018. 7 pages.

U.S. Appl. No. 13/802,154, filed Mar. 13, 2013, Johnson Controls Technology Company.

U.S. Appl. No. 13/802,279, filed Mar. 13, 2013, Johnson Controls Technology Company.

Extended European Search Report for EP Application No. 16154938.1, dated Jun. 23, 2016, 8 pages.

Extended European Search Report for EP Application No. 16154940.7, dated Jun. 30, 2016, 7 pages.

Hoke et al., Active Power Control of Photovoltaic Power Systems, 2013 1st IEEE Conference on Technologies for Sustainability (SusTech), Aug. 1-2, 2013, 8 pages.

Lopez-Martinez et al., Vision-Based System for the Safe Operation of a Solar Power Tower Plant, In Advances in Artificial Intelligence—IBERAMIA 2002, 8th Ibero-American Conference on Artificial Intelligence, Nov. 2002, Springer Berlin Heidelberg, 10 pages.

Sasikala et al., Coordinated Control and Strategy of Solar Photovoltaic Generators with MPPT and Battery Storage in Micro Grids, International Journal of Scientific Engineering and Technology Research, vol. 3, No. 46, Dec. 2014, 7 pages.

SMA Solar Technology AG, PV and Storage: Solutions with Potential-Energy on demand with the Sunny Central Storage, Brochure, Nov. 30, 2002, 8 pages.

Search Report for International Application No. PCT/US2016/056181, dated Jan. 26, 2017, 10 pages.

Search Report and Written Opinion for International Application No. PCT/US2016/056165, dated Jan. 3, 2017, 13 pages.

Search Report and Written Opinion for International Application No. PCT/US2016/056167, dated Jan. 3, 2017, 12 pages.

Search Report and Written Opinion for International Application No. PCT/US2016/056169, dated Jan. 3, 2017, 12 pages.

Search Report and Written Opinion for International Application No. PCT/US2016/056170, dated Jan. 18, 2017, 12 pages.

Search Report and Written Opinion for International Application No. PCT/US2016/056179, dated Jan. 19, 2017, 10 pages.

Search Report and Written Opinion for International Application No. PCT/US2016/056182, dated Jan. 4, 2017, 13 pages.

Search Report and Written Opinion for International Application No. PCT/US2016/056183, dated Dec. 20, 2016, 13 pages.

Search Report and Written Opinion for International Application No. PCT/US2016/056184, dated Dec. 20, 2016, 13 pages.

Search Report and Written Opinion for International Application No. PCT/US2016/056186, dated Jan. 16, 2017, 10 pages.

Search Report and Written Opinion for International Application No. PCT/US2016/056187, dated Dec. 9, 2016, 12 pages.

Search Report and Written Opinion for International Application No. PCT/US2016/056189, dated Dec. 21, 2016, 11 pages.

Search Report and Written Opinion for International Application No. PCT/US2016/056190, dated Jan. 18, 2017, 10 pages.

Search Report and Written Opinion for International Application No. PCT/US2016/056192, dated Jan. 16, 2017, 11 pages.

Search Report for International Application No. PCT/US2016/056178, dated Jan. 25, 2017, 3 pages.

U.S. Office Action on U.S. Appl. No. 15/247,869 dated Aug. 9, 2018. 16 pages.

U.S. Office Action for U.S. Appl. No. 15/247,883 dated Oct. 17, 2018 15 pages.

U.S. Office Action for U.S. Appl. No. 15/247,885 dated Nov. 28, 2018 45 pages.

U.S. Office Action for U.S. Appl. No. 15/247,788 dated Dec. 11, 2018 25 pages.

United States Patent Office Action for U.S. Appl. No. 15/247,873 dated Sep. 19, 2018 (15 Pages).

* cited by examiner

PHOTOVOLTAIC ENERGY SYSTEM WITH VALUE FUNCTION OPTIMIZATION

CROSS-REFERENCE TO RELATED PATENT APPLICATIONS

This application claims the benefit of and priority to U.S. Provisional Patent Application No. 62/239,131, U.S. Provisional Patent Application No. 62/239,231, U.S. Provisional Patent Application No. 62/239,233, U.S. Provisional Patent Application No. 62/239,246, and U.S. Provisional Patent Application No. 62/239,249, each of which has a filing date of Oct. 8, 2015. The entire disclosure of each of these patent applications is incorporated by reference herein.

BACKGROUND

The present invention relates generally to a photovoltaic energy system and more particularly to systems and methods for controlling a ramp rate in a photovoltaic energy system.

Photovoltaic energy systems are used to convert solar energy into electricity using solar panels or other materials that exhibit the photovoltaic effect. Large scale photovoltaic energy systems include a collection of solar panels that form a photovoltaic field. The power output of a photovoltaic energy system is largely dependent upon weather conditions and other environmental factors that affect solar intensity. Changes in solar intensity can occur suddenly, for example, if a cloud formation casts a shadow upon the photovoltaic field.

Unpredictable and large changes in power production from grid scale photovoltaic fields can be problematic for utilities since they must maintain a precise match between electrical energy generation and customer demand. Many utilities use spinning reserves or other traditional power-generation systems to compensate for this volatility. However, these systems can be expensive to operate and maintain and often cannot respond quickly to sudden changes in photovoltaic energy production. As a result, some utilities and government entities mandate that any photovoltaic energy system supplying power to the energy grid must comply with a ramp rate. The ramp rate defines a maximum rate of change in power output provided to the energy grid by the photovoltaic energy system.

In order to comply with the ramp rate, a photovoltaic energy system must not increase or decrease its photovoltaic power output at a rate that exceeds the ramp rate (e.g., 10% of rated power capacity/min). If this requirement is not satisfied, the photovoltaic energy system may be deemed non-compliant and its capacity may be de-rated. This directly impacts the revenue generation potential of the photovoltaic energy system. Additionally, complying with ramp rate requirements may be critical to maintain proper operation of the power grid for locations with large renewable portfolios, such as island nations.

Some photovoltaic energy systems use stored electrical energy to comply with ramp rate requirements. Energy from the photovoltaic field can be stored in a battery and discharged from the battery to smooth sudden drops in photovoltaic power output. However, the battery capacity and performance characteristics needed to satisfy ramp rate requirements can be substantial. For example, the required battery capacity may be approximately 30% of the capacity of the photovoltaic energy system and the battery must be capable of discharging rapidly. High-performance batteries and associated components can be very expensive for some photovoltaic energy systems. It would be desirable to provide a photovoltaic energy system that can comply with ramp rate requirements without requiring expensive and high-performance electrical power storage and discharge components.

SUMMARY

One implementation of the present disclosure is a photovoltaic energy system. The system includes a photovoltaic field configured to convert solar energy into electrical energy, a power inverter configured to control an electric power output of the photovoltaic field, and a controller. The controller determines optimal power setpoints for the power inverter by optimizing a value function that includes a penalty cost for failing to comply with a ramp rate limit and photovoltaic revenue.

In some embodiments, the power inverter may be configured to control the power output of the photovoltaic field to an energy grid.

In some embodiments, the power inverter may be configured to convert a direct current (DC) output of the photovoltaic field into an alternating current (AC) output and provide the AC output to an energy grid. The AC output defines an electric power output of the photovoltaic energy system.

In some embodiments, the controller may be configured to determine a set of optimal power setpoints for the power inverter at a plurality of time steps within a prediction window.

In some embodiments, the controller may be configured to estimate the photovoltaic revenue as a function of an electric power output to an energy grid. The revenue is the result of the power setpoints and the price per unit of the electric power output to the energy grid.

In some embodiments, the controller may be configured to estimate the penalty cost of failing to comply with the ramp rate limit as a function of a number of noncompliance events and an amount by which an actual rate of change of the electric power output exceeds the ramp rate limit.

In some embodiments, the controller may be configured to optimize the value function over a prediction window comprising a plurality of time steps. The value function may be a summation of the photovoltaic revenue and the penalty cost at each of the plurality of time steps.

Another implementation of the present disclosure is a photovoltaic energy system. The system may include a photovoltaic field configured to convert solar energy into electrical energy, a first power inverter configured to control an electric power output of the photovoltaic field, a battery, a second power inverter configured to control an electric power output of the battery, and a controller. The controller can determine optimal power setpoints for the first power inverter and the second power inverter by optimizing a value function that includes at least one of a cost of battery capacity loss and a battery operating cost.

In some embodiments, the first power inverter may be configured to control the electric power output of the photovoltaic field to an energy grid and the second power inverter is configured to control the electric power output of the battery to the energy grid.

In some embodiments, the first and second power inverters may be configured to convert a direct current (DC) output of the photovoltaic field and the battery into an alternating current (AC) output and provide the AC outputs to an energy grid, the AC outputs defining a total electric power output of the photovoltaic energy system.

In some embodiments, the battery may be configured to store at least a portion of the electrical energy generated by the photovoltaic field. The controller may be configured to adjust a total electric power output of the photovoltaic energy system using electrical energy from the battery to supplement the electric power output of the photovoltaic field.

In some embodiments, the controller may be configured to estimate the battery operating cost as a function of the cost of charging the battery, the cost of discharging the battery, and the heat generated from the battery.

In some embodiments, the value function may include an estimated revenue from an electric power output of the photovoltaic energy system to an energy grid, an estimated cost of failing to comply with a ramp rate limit, and an electric power loss within the first power inverter and the second power inverter.

In some embodiments, the controller may be configured to determine a set of optimal power setpoints for the first power inverter and the second power inverter at each of a plurality of time steps within a prediction window.

Another implementation of the present disclosure is a renewable energy system. The system includes a renewable energy field configured to convert a renewable energy source into electrical energy, a first power inverter configured to control a power output of the renewable energy field, a battery, a second power inverter configured to control a power output of the battery, and a controller. The controller is configured to determine optimal power setpoints for the first power inverter and the second power inverter by optimizing a value function. The value function include at least one of a cost of battery capacity loss and battery operating cost.

In some embodiments, the renewable energy field may comprise at least one of a photovoltaic field, a wind turbine field, a hydroelectric field, a tidal energy field, and a geothermal energy field.

In some embodiments, the first power inverter may be configured to control the electric power output of the renewable energy field to an energy grid and the second power inverter may be configured to control the electric power output of the battery to the energy grid.

In some embodiments, the battery may be configured to store at least a portion of the electrical energy generated by the renewable energy field. The controller may be configured to adjust a total electric power output of the renewable energy system using electrical energy from the battery. The electrical energy from the battery may be used to supplement the electric power output of the renewable energy field.

In some embodiments, the controller may be configured to estimate the battery operating cost as a function of the cost of charging the battery, the cost of discharging the battery, and heat generation from the battery.

In some embodiments, the controller may be configured to determine a set of optimal power setpoints for the first power inverter and the second power inverter at each of a plurality of time steps within a prediction window.

Those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings.

DETAILED DESCRIPTION

Figure 1:
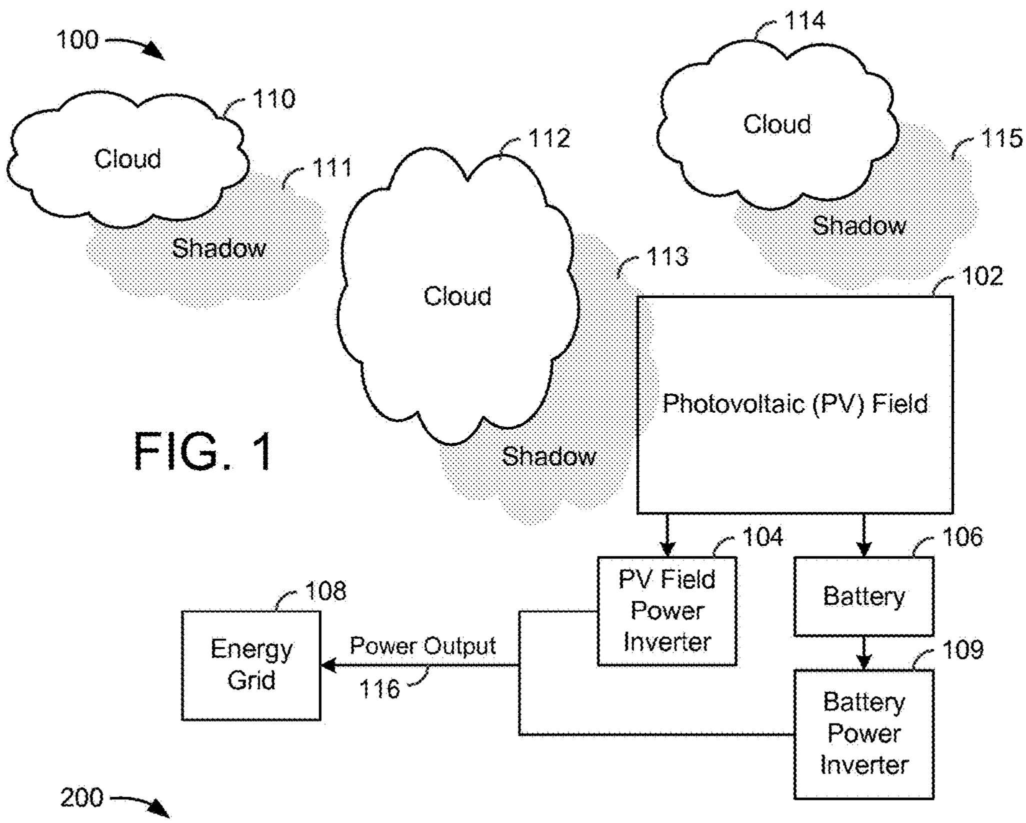
FIG. 1 is a drawing of a conventional photovoltaic energy system including a photovoltaic field and a power inverter which uses energy from a battery to perform ramp rate control, according to an exemplary embodiment.

Referring generally to the FIGURES, systems and methods for controlling ramp rate in a photovoltaic energy system are shown, according to various exemplary embodiments. A photovoltaic energy system includes a photovoltaic field configured to convert solar energy into electrical energy. The photovoltaic field generates a direct current (DC) output, which is converted to an alternating current (AC) output by a power inverter. In some embodiments, the AC output is provided to an energy grid and represents the electric power output of the photovoltaic energy system. The electric power output of the photovoltaic energy system may vary based on the solar intensity within the photovoltaic field. A change in solar intensity may be caused, for example, by a cloud casting a shadow on the photovoltaic field.

The photovoltaic system includes one or more cloud detectors configured to detect cloud formations and/or shadows approaching the photovoltaic field. In some embodiments, the cloud detectors are solar intensity sensors located outside the photovoltaic field. In other embodiments, the cloud detectors may include cameras, radar devices, or any other means (e.g., systems, devices, services, etc.) for detecting clouds and/or the shadows created by clouds. In further embodiments, the cloud detectors may be individual photovoltaic devices located along an edge of the photovoltaic field.

A controller uses input from the cloud detectors to predict solar intensity disturbances before solar intensity disturbances affect the photovoltaic field. A solar intensity disturbance may include a cloud or shadow passing over the photovoltaic field. In some embodiments, the controller detects various attributes of the clouds and/or the shadows created by the clouds. For example, the controller may use input from the cloud detectors to determine the position, size, velocity, opacity, or any other attribute of the clouds/shadows that may have an effect on the solar intensity within the photovoltaic field. The controller predicts when a solar intensity disturbance is estimated to occur within the photovoltaic field based on the attributes of the detected clouds/shadows.

The controller preemptively initiates ramp rate control before the solar intensity disturbance affects the photovoltaic field. For example, the controller may cause the power inverter to limit the power output from the photovoltaic field in order to gradually decrease the power output provided to the energy grid. Advantageously, preemptively ramping down the power output before the solar intensity disturbance affects the photovoltaic field allows the controller to ramp down power output without requiring additional energy from a battery or other electrical energy storage. Since the power output of the photovoltaic field is still high while the ramp down occurs, the controller can ramp down power output by limiting the power output from the photovoltaic field. This feature provides a distinct advantage over conventional photovoltaic energy systems that merely react to a drop in power output by providing stored energy from a battery. Additional features and advantages of the present invention are described in greater detail below.

Conventional Photovoltaic Energy System

Referring now to FIG. 1, a conventional photovoltaic energy system 100 is shown, according to an exemplary embodiment. System 100 may be configured to convert solar energy into electricity using solar panels or other materials that exhibit the photovoltaic effect. System 100 stores collected solar energy in a battery. The stored solar energy may be used by system 100 to satisfy a demand for electricity at times when electricity consumption exceeds photovoltaic energy production (e.g., at night) and/or to facilitate ramp rate control. An exemplary use of stored solar energy to facilitate ramp rate control is described in greater detail with reference to FIG. 2.

System 100 is shown to include a photovoltaic (PV) field 102, a PV field power inverter 104, a battery 106, a battery power inverter 109, and an energy grid 108. PV field 102 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 102 may have any of a variety of sizes and/or locations. In some embodiments, PV field 102 is part of a large-scale photovoltaic power station (e.g., a solar park or farm) capable of providing an energy supply to a large number of consumers. When implemented as part of a large-scale system, PV field 102 may cover multiple hectares and may have power outputs of tens or hundreds of megawatts. In other embodiments, PV field 102 may cover a smaller area and may have a relatively lesser power output (e.g., between one and ten megawatts, less than one megawatt, etc.). For example, PV field 102 may be part of a rooftop-mounted system capable of providing enough electricity to power a single home or building. It is contemplated that PV field 102 may have any size, scale, and/or power output, as may be desirable in different implementations.

PV field 102 may generate a variable direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of factors such as clouds that cast a shadow upon PV field 102. For example, FIG. 1 is shown to include several clouds 110, 112, and 114 that cast shadows 111, 113, and 115, respectively. If any of the shadows falls upon PV field 102, the power output of PV field 102 may drop as a result of the decrease in solar intensity.

In some embodiments, PV field 102 is configured to maximize solar energy collection. For example, PV field 102 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 102. In some embodiments, PV field 102 includes a collection of mirrors, lenses, or solar concentrators configured to direct and/or concentrate sunlight on the solar panels. The energy generated by PV field 102 may be stored in battery 106 or provided to energy grid 108.

Still referring to FIG. 1, system 100 is shown to include a PV field power inverter 104. Power inverter 104 may be configured to convert the DC output of PV field 102 into an alternating current (AC) output that can be fed into energy grid 108 or used by a local (e.g., off-grid) electrical network. For example, power inverter 104 may be a solar inverter or grid-tie inverter configured to convert the DC output from PV field 102 into a sinusoidal AC output synchronized to the grid frequency of energy grid 108. In some embodiments, power inverter 104 receives a cumulative DC output from PV field 102. For example, power inverter 104 may be a string inverter or a central inverter. In other embodiments, power inverter 104 may include a collection of micro-inverters connected to each solar panel or solar cell.

Power inverter 104 may receive a DC power output from PV field 102 and convert the DC power output to an AC power output that can be fed into energy grid 108. Power inverter 104 may synchronize the frequency of the AC power output with that of energy grid 108 (e.g., 50 Hz or 60 Hz) using a local oscillator and may limit the voltage of the AC power output to no higher than the grid voltage. In some embodiments, power inverter 104 is a resonant inverter that includes or uses LC circuits to remove the harmonics from a simple square wave in order to achieve a sine wave matching the frequency of energy grid 108. In various embodiments, power inverter 104 may operate using high-frequency transformers, low-frequency transformers, or without transformers. Low-frequency transformers may convert the DC output from PV field 102 directly to the AC output provided to energy grid 108. High-frequency transformers may employ a multi-step process that involves converting the DC output to high-frequency AC, then back to DC, and then finally to the AC output provided to energy grid 108.

Power inverter 104 may be configured to perform maximum power point tracking and/or anti-islanding. Maximum power point tracking may allow power inverter 104 to produce the maximum possible AC power from PV field 102. For example, power inverter 104 may sample the DC power output from PV field 102 and apply a variable resistance to find the optimum maximum power point. Anti-islanding is a protection mechanism that immediately shuts down power inverter 104 (i.e., preventing power inverter 104 from generating AC power) when the connection to an electricity-consuming load no longer exists.

Still referring to FIG. 1, system 100 is shown to include a battery power inverter 109. Power inverter 109 may receive a DC power output from battery 106 and convert the DC power output into an AC power output that can be fed into energy grid 108. Battery power inverter 109 may be the same or similar to PV field power inverter 104 with the exception that battery power inverter 109 controls the power output of battery 106, whereas PV field power inverter 104 controls the power output of PV field 102. The power outputs from PV field power inverter 104 and battery power inverter 109 combine to form the power output 116 provided to energy grid 108.

System 100 may be configured to control a ramp rate of the power output 116 provided to energy grid 108. Ramp rate may be defined as the time rate of change of power output 116. Power output 116 may vary depending on the magnitude of the DC output provided by PV field 102. For example, if a cloud passes over PV field 102, power output 116 may rapidly and temporarily drop while PV field 102 is within the cloud's shadow. System 100 may be configured to calculate the ramp rate by sampling power output 116 and determining a change in power output 116 over time. For example, system 100 may calculate the ramp rate as the derivative or slope of power output 116 as a function of time, as shown in the following equations:

$$\text{Ramp Rate} = \frac{dP}{dt} \text{ or Ramp Rate} = \frac{\Delta P}{\Delta t}$$

where P represents power output 116 and t represents time.

In some embodiments, system 100 controls the ramp rate to comply with regulatory requirements or contractual requirements imposed by energy grid 108. For example, photovoltaic energy system 100 may be required to maintain the ramp rate within a predetermined range in order to deliver power to energy grid 108. In some embodiments, system 100 is required to maintain the absolute value of the ramp rate at less than a threshold value (e.g., less than 10% of the rated power capacity per minute). In other words, system 100 may be required to prevent power output 116 from increasing or decreasing too rapidly. If this requirement is not met, system 100 may be deemed to be in non-compliance and its capacity may be de-rated, which directly impacts the revenue generation potential of system 100.

System 100 may use battery 106 to perform ramp rate control. For example, system 100 may use energy from battery 106 to smooth a sudden drop in power output 116 so that the absolute value of the ramp rate is less than a threshold value. As previously mentioned, a sudden drop in power output 116 may occur when a solar intensity disturbance occurs, such as a passing cloud blocking the sunlight to PV field 102. System 100 may use the energy from battery 106 to make up the difference between the power provided by PV field 102 (which has suddenly dropped) and the minimum required power output 116 to maintain the required ramp rate. The energy from battery 106 allows system 100 to gradually decrease power output 116 so that the absolute value of the ramp rate does not exceed the threshold value.

Once the cloud has passed, the power output from PV field 102 may suddenly increase as the solar intensity returns to its previous value. System 100 may perform ramp rate control by gradually ramping up power output 116. Ramping up power output 116 may not require energy from battery 106. For example, power inverter 104 may use only a portion of the energy generated by PV field 102 (which has suddenly increased) to generate power output 116 (i.e., limiting the power output) so that the ramp rate of power output 116 does not exceed the threshold value. The remainder of the energy generated by PV field 102 (i.e., the excess energy) may be stored in battery 106 and/or dissipated. Limiting the energy generated by PV field 102 may include diverting or dissipating a portion of the energy generated by PV field 102 (e.g., using variable resistors or other circuit elements) so that only a portion of the energy generated by PV field 102 is provided to energy grid 108. This allows power inverter 104 to ramp up power output 116 gradually without exceeding the ramp rate. The excess energy may be stored in battery 106, used to power other components of system 100, or dissipated.

In system 100, limiting the energy generated by PV field 102 is only effective to control the ramp rate when the power output of PV field 102 is suddenly increasing. However, when the power output of PV field 102 suddenly decreases, system 100 requires energy from battery 106 to prevent the absolute value of the ramp rate from exceeding the threshold value. The capacity and charge/discharge rates of battery 106 required to perform ramp rate control can be substantial. In some instances, the battery capacity needed to satisfy the ramp rate requirements may be approximately 30% of the maximum power capacity of PV field 102. The battery and associated power inverter costs can also be substantial. Accordingly, the ramp rate control provided by system 100 may require a high performance battery for battery 106 and a high performance power inverter for power inverter 109, both of which can be prohibitively expensive.

Figure 2:
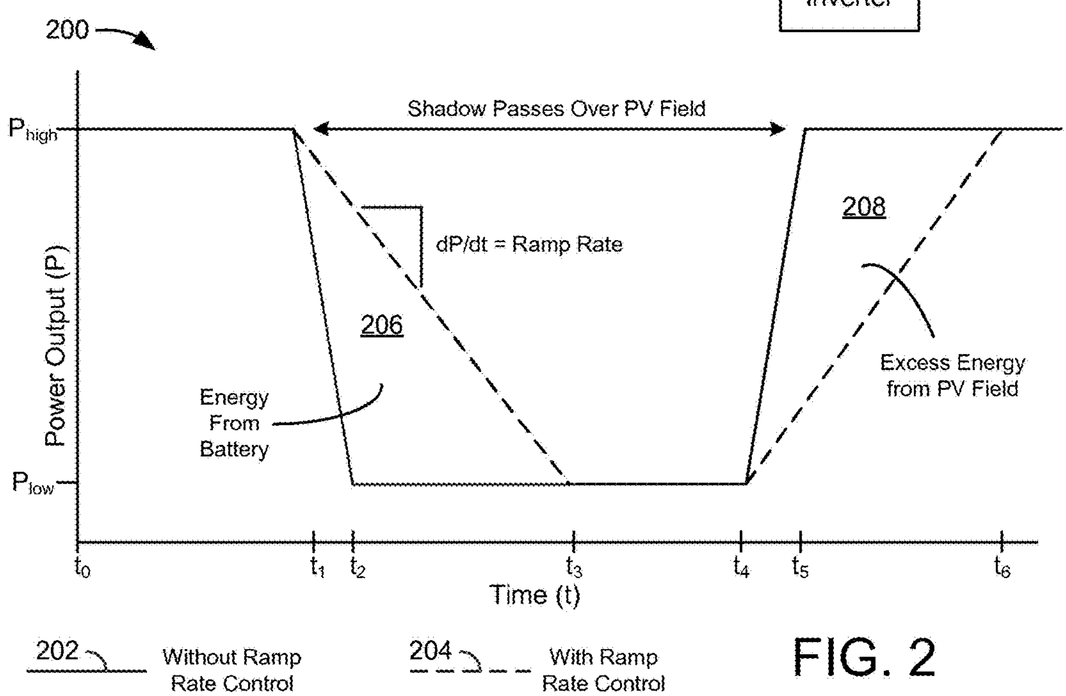
FIG. 2 is a graph illustrating the ramp rate control performed by the photovoltaic energy system of FIG. 1, according to an exemplary embodiment.

Referring now to FIG. 2, a graph 200 illustrating the ramp rate control performed by system 100 is shown, according to an exemplary embodiment. Graph 200 plots the power output P provided to energy grid 108 as a function of time t. The solid line 202 illustrates power output P without any ramp rate control, whereas the broken line 204 illustrates power output P with ramp rate control.

Between times $t_0$ and $t_1$, power output P is at a high value $P_{high}$. At time $t_1$, a cloud begins to cast its shadow on PV field 102, causing the power output of PV field 102 to suddenly decrease, until PV field 102 is completely in shadow at time $t_2$. Without any ramp rate control, the sudden drop in power output from PV field 102 causes the power output P to rapidly drop to a low value $P_{low}$ at time $t_2$. However, with ramp rate control, system 100 uses energy from battery 106 to gradually decrease power output P to $P_{low}$ at time $t_3$. Triangular region 206 represents the energy from battery 106 used to gradually decrease power output P.

Between times $t_2$ and $t_4$, PV field 102 is completely in shadow. At time $t_4$, the shadow cast by the cloud begins to move off PV field 102, causing the power output of PV field 102 to suddenly increase, until PV field 102 is entirely in sunlight at time $t_5$. Without any ramp rate control, the sudden increase in power output from PV field 102 causes the power output P to rapidly increase to the high value $P_{high}$ at time $t_5$. However, with ramp rate control, power inverter 104 limits the energy from PV field 102 to gradually increase power output P to $P_{high}$ at time $t_6$. Triangular region 208 represents the energy generated by PV field 102 in excess of the ramp rate limit. The excess energy may stored in battery 106 and/or dissipated in order to gradually increase power output P at a rate no greater than the maximum allowable ramp rate.

Notably, both triangular regions 206 and 208 begin after a change in the power output of PV field 102 occurs. As such, both the decreasing ramp rate control and the increasing ramp rate control provided by system 100 are reactionary processes triggered by a detected change in the power output. In some embodiments, a feedback control technique is used to perform ramp rate control in system 100. For example, system 100 may monitor power output 116 and determine the absolute value of the time rate of change of power output 116 (e.g., dP/dt or ΔP/Δt). System 100 may initiate ramp rate control when the absolute value of the time rate of change of power output 116 exceeds a threshold value.

Disturbance Prediction and Preemptive Power Output Ramp Down

Figure 3:
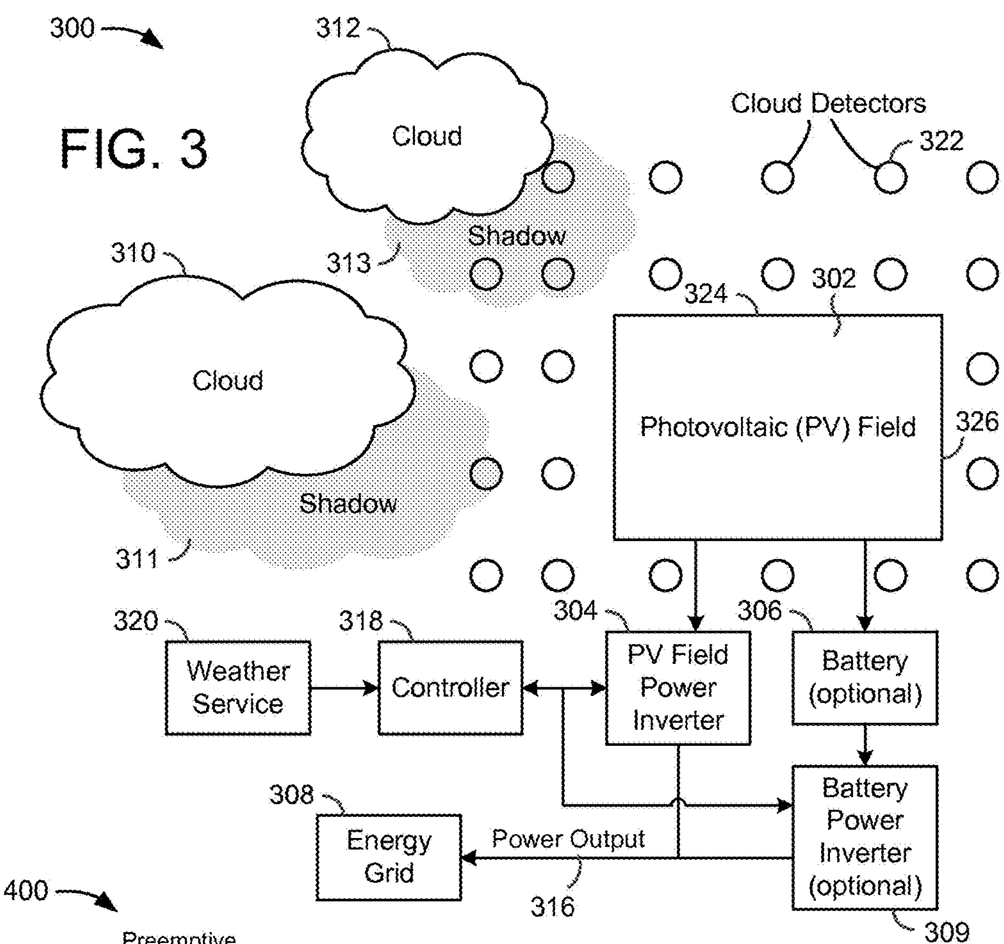
FIG. 3 is a drawing of an improved photovoltaic energy system which predicts solar intensity disturbances and pre-emptively initiates ramp rate control before the solar intensity disturbances affect the photovoltaic field, according to an exemplary embodiment.

Referring now to FIG. 3, an improved photovoltaic energy system 300 is shown, according to an exemplary embodiment. System 300 is shown to include a photovoltaic (PV) field 302, a PV field power inverter 304, and an energy grid 308, which may be the same or similar to PV field 102, PV field power inverter 104, and energy grid 108, as described with reference to FIG. 1. System 300 is also shown to include an optional battery power inverter 309 and an optional battery 306. Ramp rate control in system 300 does not require energy from battery 306 to ramp down the power output 316 provided to energy grid 308. Accordingly, battery 306 may be significantly less expensive than battery 106, and may even be omitted in some embodiments. Power inverter 309 may also be significantly less expensive than power inverter 109, and may even be omitted in some embodiments, since energy from battery 306 is not required to perform ramp rate control.

System 300 is shown to include a controller 318. Controller 318 may be configured to predict when solar intensity disturbances will occur and may cause power inverter 304 to ramp down the power output 316 provided to energy grid 308 preemptively. Instead of reacting to solar intensity disturbances after they occur, controller 318 actively predicts solar intensity disturbances and preemptively ramps down power output 316 before the disturbances affect PV field 302. Advantageously, this allows system 300 to perform both ramp down control and ramp up control by using only a portion of the energy provided by PV field 302 to generate power output 316 while the power output of PV field 302 is still high, rather than relying on energy from a battery. The remainder of the energy generated by PV field 302 (i.e., the excess energy) may be stored in battery 306 and/or dissipated.

In some embodiments, controller 318 predicts solar intensity disturbances using input from one or more cloud detectors 322. As shown in FIG. 3, cloud detectors 322 may include an array of solar intensity sensors. The solar intensity sensors may be positioned outside PV field 302 or within PV field 302. Each solar intensity sensor may have a known location. In some embodiments, the locations of the solar intensity sensors are based on the geometry and orientation of PV field 302. For example, if PV field 302 is rectangular, more sensors may be placed along its long side 324 than along its short side 326. A cloud formation moving perpendicular to long side 324 may cover more area of PV field 302 per unit time than a cloud formation moving perpendicular to short side 326. Therefore, it may be desirable to include more sensors along long side 324 to more precisely detect cloud movement perpendicular to long side 324. As another example, more sensors may be placed along the west side of PV field 302 than along the east side of PV field 302 since cloud movement from west to east is more common than cloud movement from east to west. The placement of sensors may be selected to detect approaching cloud formations without requiring unnecessary or redundant sensors.

The solar intensity sensors may be configured to measure solar intensity at various locations outside PV field 302. When the solar intensity measured by a particular solar intensity sensor drops below a threshold value, controller 318 may determine that a cloud is currently casting a shadow on the solar intensity sensor. For example, FIG. 3 shows cloud 310 casting a shadow 311 on one of the solar intensity sensors, and cloud 312 casting a shadow 313 on several other solar intensity sensors. In some embodiments, controller 318 uses the measured solar intensity to determine an opacity of the cloud.

Controller 318 may use input from multiple solar intensity sensors to determine various attributes of clouds approaching PV field 302 and/or the shadows produced by such clouds. For example, if a shadow is cast upon two or more of the solar intensity sensors sequentially, controller 318 may use the known positions of the solar intensity sensors and the time interval between each solar intensity sensor detecting the shadow to determine how fast the cloud/shadow is moving. If two or more of the solar intensity sensors are within the shadow simultaneously, controller 318 may use the known positions of the solar intensity sensors to determine a position, size, and/or shape of the cloud/shadow.

Although cloud detectors 322 are described primarily as solar intensity sensors, it is contemplated that cloud detectors 322 may include any type of device configured to detect the presence of clouds or shadows cast by clouds. For example, cloud detectors 322 may include one or more cameras that capture visual images of cloud movement. The cameras may be upward-oriented cameras located below the clouds (e.g., attached to a structure on the Earth) or downward-oriented cameras located above the clouds (e.g., satellite cameras). Images from the cameras may be used to determine cloud size, position, velocity, and/or other cloud attributes. In some embodiments, cloud detectors 322 include radar or other meteorological devices configured to detect the presence of clouds, cloud density, cloud velocity, and/or other cloud attributes. In some embodiments, controller 318 receives data from a weather service 320 that indicates various cloud attributes.

Advantageously, controller 318 may use the attributes of the clouds/shadows to determine when a solar intensity disturbance (e.g., a shadow) is approaching PV field 302. For example, controller 318 may use the attributes of the clouds/shadows to determine whether any of the clouds are expected to cast a shadow upon PV field 302. If a cloud is expected to cast a shadow upon PV field 302, controller 318 may use the size, position, and/or velocity of the cloud/shadow to determine a portion of PV field 302 that will be affected. The affected portion of PV field 302 may include some or all of PV field 302. Controller 318 may use the attributes of the clouds/shadows to quantify a magnitude of the expected solar intensity disturbance (e.g., an expected decrease in power output from PV field 302) and to determine a time at which the disturbance is expected to occur (e.g., a start time, an end time, a duration, etc.).

In some embodiments, controller 318 predicts a magnitude of the disturbance for each of a plurality of time steps. Controller 318 may use the predicted magnitudes of the disturbance at each of the time steps to generate a predicted disturbance profile. The predicted disturbance profile may indicate how fast power output 316 is expected to change as a result of the disturbance. Controller 318 may compare the expected rate of change to a ramp rate threshold to determine whether ramp rate control is required. For example, if power output 316 is predicted to decrease at a rate in excess of the maximum compliant ramp rate, controller 318 may preemptively implement ramp rate control to gradually decrease power output 316.

In some embodiments, controller 318 identifies the minimum expected value of power output 316 and determines when the predicted power output is expected to reach the minimum value. Controller 318 may subtract the minimum expected power output 316 from the current power output 316 to determine an amount by which power output 316 is expected to decrease. Controller 318 may apply the maximum allowable ramp rate to the amount by which power output 316 is expected to decrease to determine a minimum time required to ramp down power output 316 in order to comply with the maximum allowable ramp rate. For example, controller 318 may divide the amount by which power output 316 is expected to decrease (e.g., measured in units of power) by the maximum allowable ramp rate (e.g., measured in units of power per unit time) to identify the minimum time required to ramp down power output 316. Controller 318 may subtract the minimum required time from the time at which the predicted power output is expected to reach the minimum value to determine when to start preemptively ramping down power output 316.

Advantageously, controller 318 may preemptively act upon predicted disturbances by causing power inverter 304 to ramp down power output 316 before the disturbances affect PV field 302. This allows power inverter 304 to ramp down power output 316 by using only a portion of the energy generated by PV field 302 to generate power output 316 (i.e., performing the ramp down while the power output is still high), rather than requiring additional energy from a battery (i.e., performing the ramp down after the power output has decreased). The remainder of the energy generated by PV field 302 (i.e., the excess energy) may be stored in battery 306 and/or dissipated.

Figure 4:
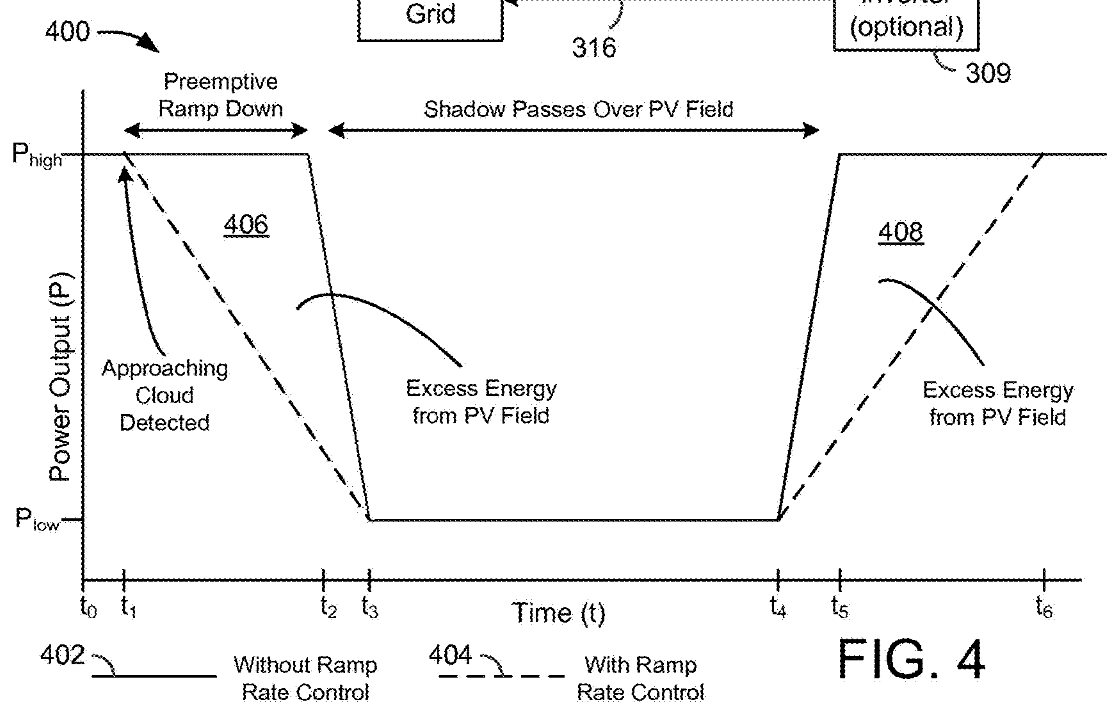
FIG. 4 is a graph illustrating the ramp rate control performed by the photovoltaic energy system of FIG. 3, according to an exemplary embodiment.

Referring now to FIG. 4, a graph 400 illustrating the ramp rate control performed by controller 318 is shown, according to an exemplary embodiment. Graph 400 plots the power output P provided to energy grid 308 as a function of time t. The solid line 402 illustrates power output P without any ramp rate control, whereas the broken line 404 illustrates power output P with preemptive ramp rate control.

Between times $t_0$ and $t_2$, power output P is at a high value $P_{high}$. At time $t_2$, a cloud begins to cast its shadow on PV field 302, causing the power output of PV field 302 to suddenly decrease, until PV field 302 is completely in shadow at time $t_3$. Without any ramp rate control, the sudden drop in power output from PV field 302 causes the power output P to rapidly drop from $P_{high}$ to a low value $P_{low}$ between times $t_2$ and $t_3$. However, with preemptive ramp rate control, controller 318 preemptively causes power inverter 304 to begin ramping down power output P at time $t_1$, prior to the cloud casting a shadow on PV field 302. The preemptive ramp down occurs between times $t_1$ and $t_3$, resulting in a ramp rate that is relatively more gradual. Triangular region 406 represents the energy generated by PV field 302 in excess of the ramp rate limit. The excess energy may be limited by power inverter 304 and/or stored in battery 306 to gradually decrease power output P at a rate no greater than the ramp rate limit.

Between times $t_3$ and $t_4$, PV field 302 is completely in shadow. At time $t_4$, the shadow cast by the cloud begins to move off PV field 302, causing the power output of PV field 302 to suddenly increase, until PV field 302 is entirely in sunlight at time $t_5$. Without any ramp rate control, the sudden increase in power output from PV field 302 causes the power output P to rapidly increase to the high value $P_{high}$ at time $t_5$.

However, with ramp rate control, power inverter 304 uses only a portion of the energy from PV field 302 to gradually increase power output P to $P_{high}$ at time $t_6$. Triangular region 408 represents the energy generated by PV field 302 in excess of the ramp rate limit. The excess energy may be limited by power inverter 304 and/or stored in battery 306 to gradually increase power output P at a rate no greater than the ramp rate limit.

Notably, a significant portion of triangular region 406 occurs between times $t_1$ and $t_2$, before the disturbance affects PV field 302. As such, the decreasing ramp rate control provided by system 300 is a preemptive process triggered by detecting an approaching cloud, prior to the cloud casting a shadow upon PV field 302. In some embodiments, controller 318 uses a predictive control technique (e.g., feedforward control, model predictive control, etc.) to perform ramp down control in system 300. For example, controller 318 may actively monitor the positions, sizes, velocities, and/or other attributes of clouds/shadows that could potentially cause a solar intensity disturbance affecting PV field 302. When an approaching cloud is detected at time $t_1$, controller 318 may preemptively cause power inverter 304 to begin ramping down power output 316. This allows power inverter 304 to ramp down power output 316 by limiting the energy generated by PV field 302 while the power output is still high, rather than requiring additional energy from a battery to perform the ramp down once the power output has dropped.

Figure 5:
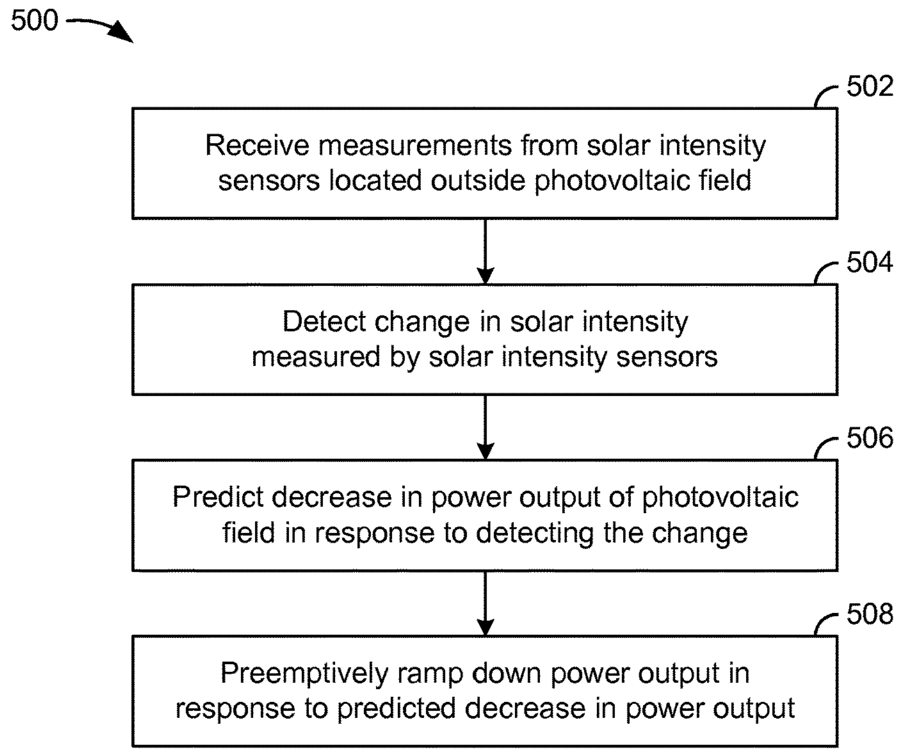
FIG. 5 is a flowchart of a process for controlling a ramp rate in the photovoltaic energy system of FIG. 3, according to an exemplary embodiment.

Referring now to FIG. 5, a flowchart of a process 500 for controlling a ramp rate in a photovoltaic energy system is shown, according to an exemplary embodiment. Process 500 may be performed by one or more components of photovoltaic energy system 300 (e.g., controller 318, power inverter 304, etc.), as described with reference to FIG. 3.

Process 500 is shown to include receiving measurements from solar intensity sensors located outside a photovoltaic field (step 502) and detecting a change in solar intensity measured by the solar intensity sensors (step 504). The change in solar intensity may be observed at a location outside the photovoltaic field and may indicate the presence of a cloud approaching the photovoltaic field.

Process 500 is shown to include predicting a decrease in the power output of the photovoltaic field in response to detecting the change (step 506). Step 506 may include predicting whether the approaching cloud is expected to cast a shadow upon the photovoltaic field. In some embodiments, step 506 includes predicting an amount by which the power output is expected to decrease (i.e., a magnitude of the decrease) and/or a time at which the decrease in power output is expected to occur. The decrease in the power output may be predicted prior to the solar intensity disturbance affecting the photovoltaic field.

Process 500 is shown to include preemptively ramping down the power output in response to the predicted decrease in power output (step 508). Step 508 may include causing a power inverter to limit the energy being generated by the photovoltaic field. Advantageously, since the ramping down is performed preemptively (i.e., while the power output is still high), no additional energy from a battery is required.

Figure 6:
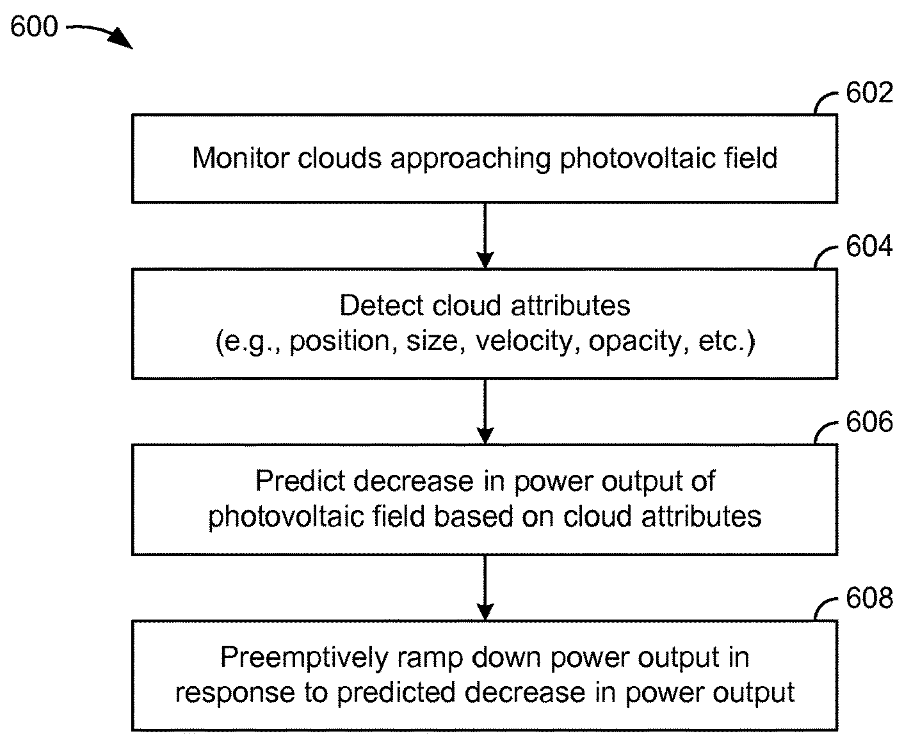
FIG. 6 is a flowchart of another process for controlling a ramp rate in the photovoltaic energy system of FIG. 3, according to an exemplary embodiment.

Referring now to FIG. 6, a flowchart of another process 600 for controlling a ramp rate in a photovoltaic energy system is shown, according to an exemplary embodiment. Process 600 may be performed by one or more components of photovoltaic energy system 300 (e.g., controller 318, power inverter 304, etc.), as described with reference to FIG. 3.

Process 600 is shown to include monitoring clouds approaching a photovoltaic field (step 602) and detecting attributes of the clouds (step 604). Clouds may be monitored in a variety of ways. For example, clouds may be monitored using input from solar intensity sensors, images from cameras, satellite images, radar, or input from a weather service. Detecting attributes of the clouds may include determining a size, position, velocity, and/or opacity of the clouds. In some embodiments, step 604 includes determining attributes of the shadows cast by the clouds. Attributes of shadows may include, for example, shadow size, shadow position, shadow velocity, and/or a solar intensity in the area affected by the shadow.

Process 600 is shown to include predicting a decrease in the power output of the photovoltaic field based on the cloud attributes (step 606). Step 606 may include predicting whether the approaching cloud is expected to cast a shadow upon the photovoltaic field. In some embodiments, step 606 includes predicting an amount by which the power output is expected to decrease (i.e., a magnitude of the decrease) and/or a time at which the decrease in power output is expected to occur. The decrease in the power output may be predicted prior to the solar intensity disturbance affecting the photovoltaic field.

Process 600 is shown to include preemptively ramping down the power output in response to the predicted decrease in power output (step 608). Step 608 may include causing a power inverter to limit the energy being generated by the photovoltaic field. Advantageously, since the ramping down is performed preemptively (i.e., while the power output is still high), no additional energy from a battery is required.

Preemptive Power Output Ramp Down Based on Individual PV Cell Power Outputs

Figure 7:
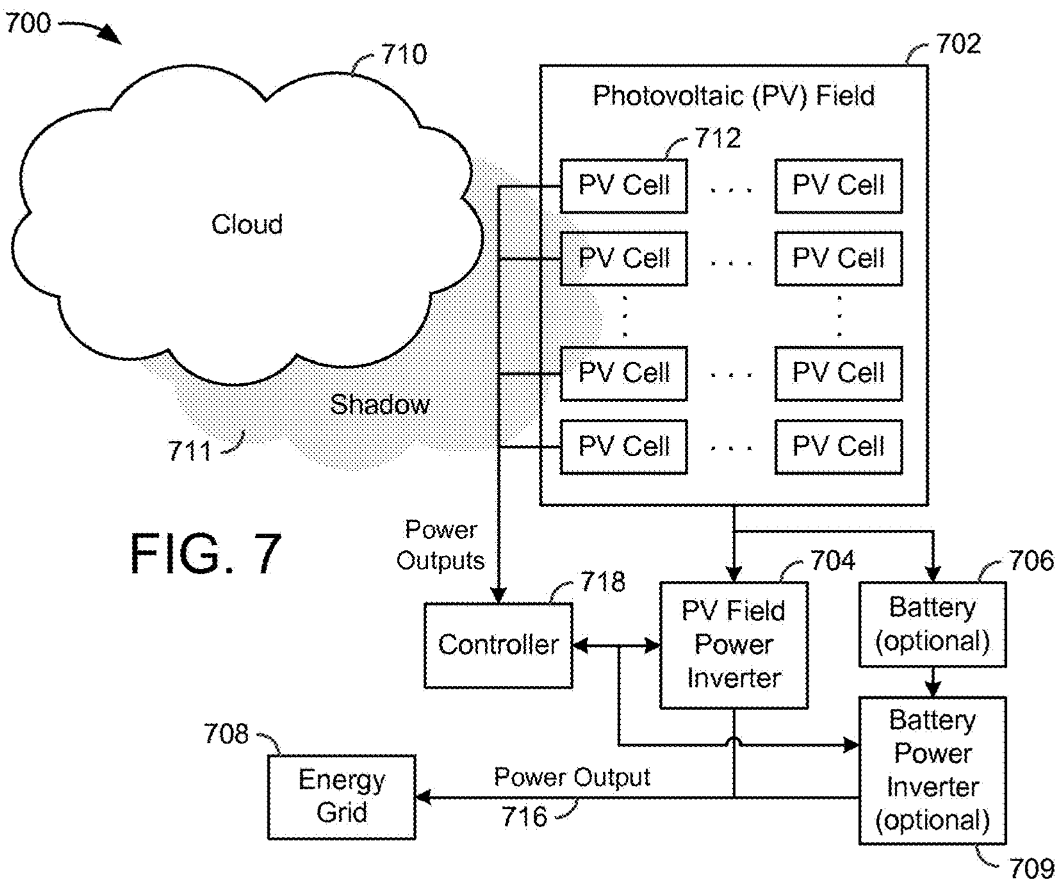
FIG. 7 is a drawing of a photovoltaic energy system which monitors the individual power outputs of photovoltaic devices within the photovoltaic field, predicts solar intensity disturbances, and preemptively initiates ramp rate control before the solar intensity disturbances significantly affect the photovoltaic field, according to an exemplary embodiment.

Referring now to FIG. 7, another photovoltaic energy system 700 is shown, according to an exemplary embodiment. System 700 is shown to include a photovoltaic (PV) field 702, a PV field power inverter 704, an optional battery 706, an optional battery power inverter 709, and an energy grid 708, which may be the same or similar to PV field 302, PV field power inverter 304, battery 306, battery power inverter 309, and energy grid 308, as described with reference to FIG. 3. System 700 is also shown to include a controller 718. Controller 718 may include some or all of the features of controller 318, as described with reference to FIG. 3.

Controller 718 may be configured to monitor the power outputs of individual photovoltaic cells 712 within PV field 702. Controller 718 may detect an approaching cloud or shadow in response to one or more of the monitored power outputs rapidly decreasing. For example, a cloud 710 is shown casting a shadow 711 onto two of PV cells 712. Shadow 711 can be characterized as a solar intensity disturbance that decreases the power output of the PV cells 712 onto which shadow 711 is cast. However, since many clouds are slow moving, the overall effect of solar intensity disturbance on PV field 702 may not be significant until shadow 711 covers a substantial portion of PV field 702. By monitoring the power outputs of individual PV cells 712, controller 718 can detect when shadow 711 begins affecting individual PV cells 712, even if the overall effect of shadow 711 is not yet significant.

In some embodiments, controller 718 monitors the individual power outputs of PV cells 712 along an edge or perimeter of PV field 702. Controller 718 may compare each of the individual power outputs to a threshold. If the power output of a particular PV cell drops below the threshold, controller 718 may determine that a cloud is casting a shadow on the PV cell. Each of PV cells 712 may have a known location. Controller 718 may use the known locations of PV cells 712 in combination with the individual power outputs of PV cells 712 to detect when a cloud is approaching PV field 702.

Controller 718 may use input from multiple PV cells 712 to determine various attributes of clouds approaching PV field 702 and/or the shadows produced by such clouds. For example, if a shadow is cast upon two or more of PV cells 712 sequentially, controller 718 may use the known positions of PV cells 712 and the time interval between each PV cell detecting the shadow to determine how fast the cloud/shadow is moving. If two or more PV cells 712 are within the shadow simultaneously, controller 718 may use the known positions of PV cells to determine a position, size, and/or shape of the cloud/shadow.

Controller 718 may predict solar intensity disturbances based on the detected attributes of the clouds/shadows approaching PV field 702. In some embodiments, controller 718 predicts solar intensity disturbances for some of PV cells 712 (e.g., PV cells located in the middle of PV field 702) based on a detected solar intensity disturbance for other PV cells 712 (e.g., PV cells located along an edge of PV field 702). Controller 718 may be configured to predict solar intensity disturbances that occur at a particular location within PV field 702 based on detected solar intensity disturbances that occur at a different location and the attributes of the clouds causing the detected disturbances. For example, if a disturbance is detected along a west edge of PV field 702 and controller 718 determines that the shadow causing the disturbance is moving from west to east, controller 718 may predict a disturbance for one or more of PV cells 712 that the shadow is expected to cover (e.g., based on the size and velocity of the detected shadow).

In some embodiments, controller 718 uses a combination of feedback control and predictive control to control the ramp rate. For example, controller 718 may use feedback control to monitor the power outputs of individual PV cells 712 and begin ramping down power output 716 when the power outputs drop below a threshold. Controller 718 may use predictive control (e.g., feedforward control, model predictive control, etc.) to predict the magnitude and duration of the solar intensity disturbance based on limited information from a subset of PV cells 712. In some embodiments, controller 718 predicts whether a solar intensity disturbance will cause power output 716 to decrease at a rate exceeding the maximum allowable ramp rate. If the maximum allowable ramp rate is expected to be exceeded, controller 718 may preemptively begin ramping down power output 716 before the actual ramp rate exceeds the maximum allowable ramp rate.

Advantageously, controller 718 may preemptively act upon predicted disturbances by causing power inverter 704 to ramp down power output 716 before the disturbances significantly affect PV field 702. A disturbance may be deemed significant when it causes the absolute value of the ramp rate of power output 716 to exceed the maximum allowable ramp rate. By preemptively acting upon predicted disturbances before they become significant, power inverter 704 can ramp down power output 716 by limiting the energy generated by PV field 702 (i.e., performing the ramp down while the power output is still high), rather than requiring additional energy from a battery (i.e., performing the ramp down after the power output has decreased).

Figure 8:
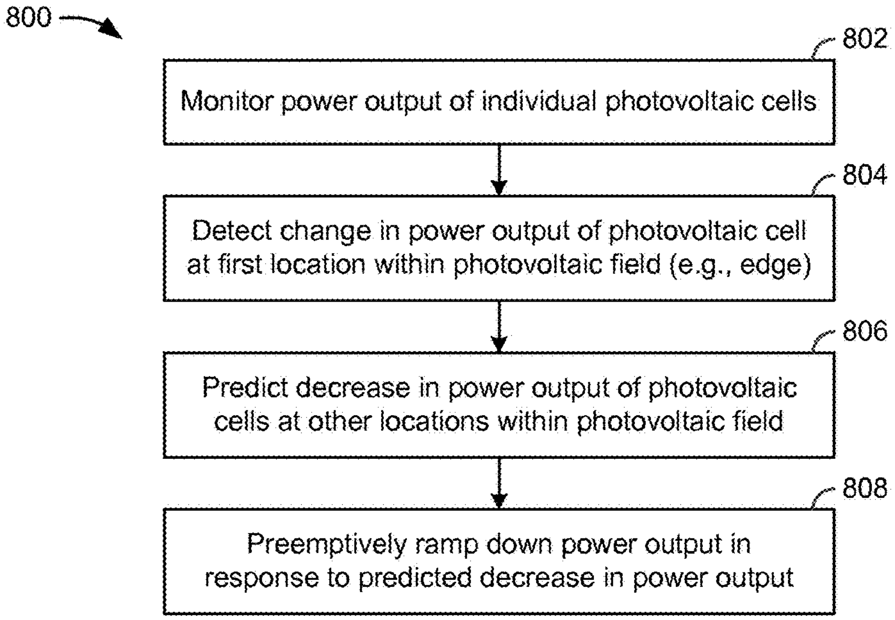
FIG. 8 is a flowchart of a process for controlling a ramp rate in the photovoltaic energy system of FIG. 7, according to an exemplary embodiment.

Referring now to FIG. 8, a flowchart of another process 800 for controlling a ramp rate in a photovoltaic energy system is shown, according to an exemplary embodiment. Process 800 may be performed by one or more components of photovoltaic energy system 700 (e.g., controller 718, power inverter 704, etc.), as described with reference to FIG. 7.

Process 800 is shown to include monitoring the power output of individual photovoltaic cells in a photovoltaic field (step 802) and detecting a change in the power output of the photovoltaic cells (step 804). In some embodiments, step 802 includes monitoring the power output of individual photovoltaic cells at a first location (e.g., along an edge) of the photovoltaic field. Step 804 may include comparing the monitored power outputs to a threshold. A change in the power output may be detected in response to the power output dropping below a threshold.

Process 800 is shown to include predicting a decrease in the power output of photovoltaic cells at other locations within the photovoltaic field (step 806). Step 806 may include identifying a solar intensity disturbance responsible for the detected change in power output. For example, step 806 may include determining various attributes of a cloud or shadow that causes the solar intensity disturbance (e.g., position, size, velocity, etc.). The attributes of the cloud/shadow may be used to determine an expected future location of the cloud/shadow and to identify one or more photovoltaic cells at the expected future location. Step 806 may include predicting a decrease in the power output of any photovoltaic cells within the expected future location of the shadow. For example, step 806 may include predicting an amount by which the power output is expected to decrease (i.e., a magnitude of the decrease) and/or a time at which the decrease in power output is expected to occur.

Process 800 is shown to include preemptively ramping down the power output in response to the predicted decrease in power output (step 808). Step 808 may include causing a power inverter to limit the energy being generated by the photovoltaic field. Advantageously, since the ramping down is performed preemptively (i.e., while the power output is still high), no additional energy from a battery is required.

Controller

Figure 9A:
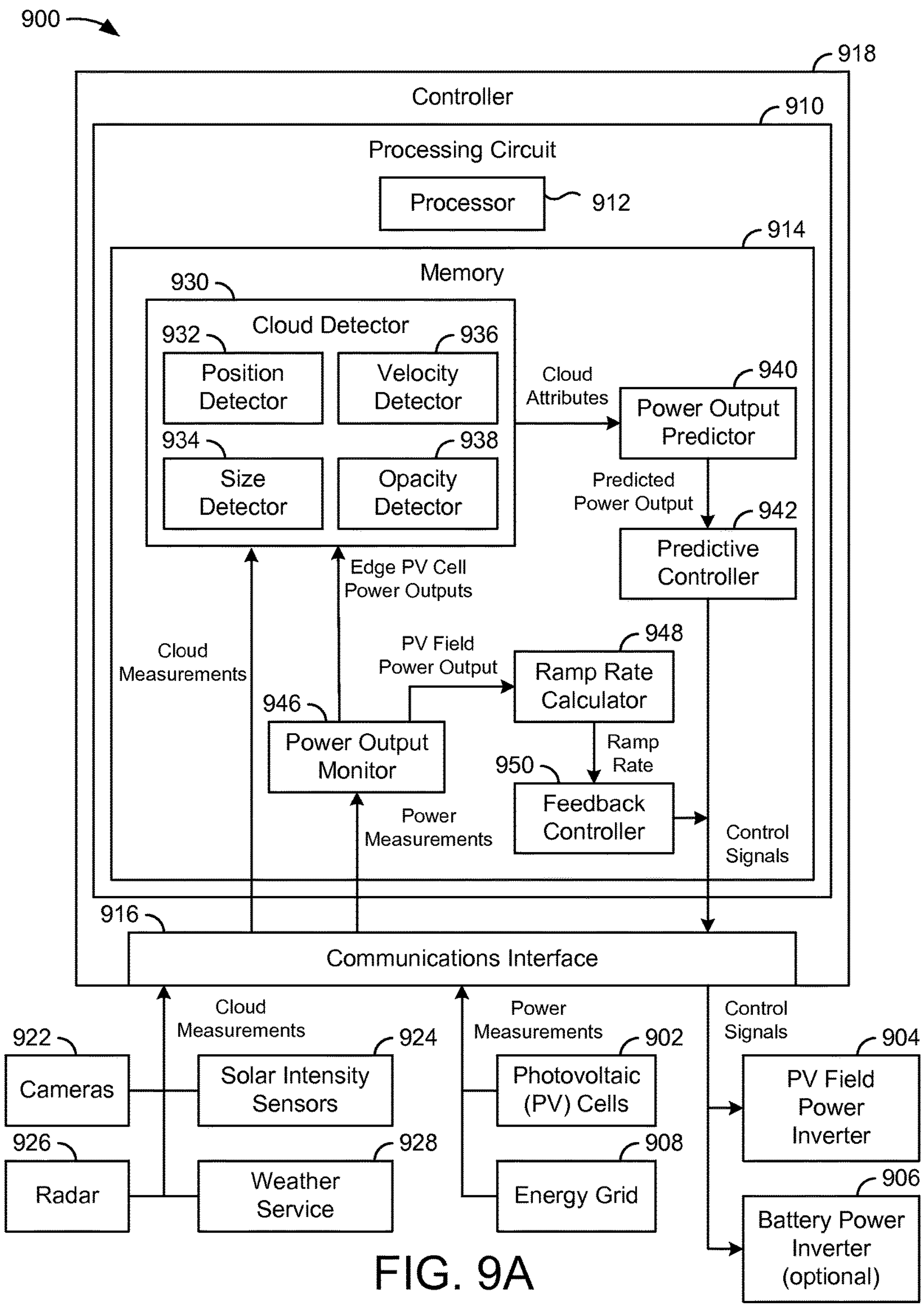
FIG. 9A is a block diagram of a controller which may be used to control the photovoltaic energy systems of FIGS. 3 and 7, according to an exemplary embodiment.

Referring now to FIG. 9A, a block diagram of a controller 918 is shown, according to an exemplary embodiment. Controller 918 may be used as any of controllers described herein (e.g., controllers 318, 718, and/or 1018). Controller 918 is shown to include a communications interface 916 and a processing circuit 910.

Communications interface 916 may facilitate communications between controller 918 and external systems of devices. For example, communications interface 916 may receive cloud measurements from cloud detectors such as cameras 922, solar intensity sensors 924, radar 926, a weather service 928, or other cloud detection means. Communications interface 916 may receive power output measurements from photovoltaic (PV) cells 902 (e.g., individually or collectively). The power output measurements from PV cells 902 may represent the power output of a photovoltaic field or components thereof (e.g., individual PV cells within the PV field). Communications interface 916 may also receive power output measurements from an energy grid 908. The power output measurements from energy grid 908 may include a total power output provided by the photovoltaic energy system to energy grid 908. Controller 918 may monitor the power output to energy grid 908 to determine whether the ramp rate is within an allowable range. Communications interface 916 may provide control signals to PV field power inverter 904 and/or to an optional battery power inverter 906. The control signals provided to PV field power inverter 904 may cause PV field power inverter 904 to perform a ramp down or ramp up of the power output by providing only a portion of the energy generated by PV cells 902 to energy grid 908.

Communications interface 916 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 916 can include an Ethernet card and port for sending and receiving data via an Ethernet-based communications link or network. In another example, communications interface 916 can include a WiFi transceiver for communicating via a wireless communications network or cellular or mobile phone communications transceivers.

Processing circuit 910 is shown to include a processor 912 and memory 914. Processor 912 may be a general purpose or specific purpose processor, an application specific integrated circuit (ASIC), one or more field programmable gate arrays (FPGAs), a group of processing components, or other suitable processing components. Processor 912 is configured to execute computer code or instructions stored in memory 914 or received from other computer readable media (e.g., CDROM, network storage, a remote server, etc.).

Memory 914 may include one or more devices (e.g., memory units, memory devices, storage devices, etc.) for storing data and/or computer code for completing and/or facilitating the various processes described in the present disclosure. Memory 914 may include random access memory (RAM), read-only memory (ROM), hard drive storage, temporary storage, non-volatile memory, flash memory, optical memory, or any other suitable memory for storing software objects and/or computer instructions. Memory 914 may include database components, object code components, script components, or any other type of information structure for supporting the various activities and information structures described in the present disclosure. Memory 914 may be communicably connected to processor 912 via processing circuit 910 and may include computer code for executing (e.g., by processor 912) one or more processes described herein. When processor 912 executes instructions stored in memory 914 for completing the various activities described herein, processor 912 generally configures controller 918 (and more particularly processing circuit 910) to complete such activities.

Still referring to FIG. 9A, memory 914 is shown to include a cloud detector 930. Cloud detector 930 may use input from cameras 922, solar intensity sensors 924, radar 926, weather service 928, and/or other cloud detection means to detect clouds/shadows approaching PV cells 902. In some embodiments, cloud detector 930 uses power output measurements from individual PV cells 902 along an edge of the PV field to detect a cloud/shadow beginning to affect PV cells 902. Cloud detector 930 is shown to include a position detector 932, a size detector 934, a velocity detector 936, and an opacity detector 938.

Position detector 932 and size detector 934 may determine the position and size of an approaching cloud/shadow. For example, position detector 932 may use the known locations of solar intensity sensors 924 to determine which of the solar intensity sensors are currently detecting a shadow. Size detector 934 may determine the size of the shadow based on which of solar intensity sensors 924 are within the shadow simultaneously. Velocity detector 936 may determine the speed and direction (e.g., a velocity vector) of an approaching cloud/shadow. For example, if a shadow is cast upon two or more of the solar intensity sensors sequentially, velocity detector 936 may use the known positions of the solar intensity sensors and the time interval between each solar intensity sensor detecting the shadow to determine how fast the cloud/shadow is moving. Opacity detector 938 may determine an opacity of an approaching cloud and/or an intensity of an approaching shadow.

Still referring to FIG. 9A, memory 914 is shown to include a power output predictor 940. Power output predictor 940 may receive the detected attributes of the clouds/shadows (e.g., position, size, velocity, opacity, etc.) from cloud detector 930. Power output predictor 940 may use the attributes of the clouds/shadows to determine when a solar intensity disturbance (e.g., a shadow) is approaching the PV field. For example, power output predictor 940 may use the attributes of the clouds/shadows to determine whether any of the clouds are expected to cast a shadow upon the PV field. If a cloud is expected to cast a shadow upon the PV field, power output predictor 940 may use the size, position, and/or velocity of the cloud/shadow to determine a portion of the PV field that will be affected. The affected portion of the PV field may include some or all of the PV field.

Power output predictor 940 may use the attributes of the clouds/shadows to quantify a magnitude of the expected solar intensity disturbance (e.g., an expected decrease in power output from the PV field) and to determine a time at which the disturbance is expected to occur (e.g., a start time, an end time, a duration, etc.). In some embodiments, power output predictor 940 predicts a magnitude of the disturbance for each of a plurality of time steps. Power output predictor 940 may use the predicted magnitudes of the disturbance at each of the time steps to generate a predicted disturbance profile. The predicted disturbance profile may indicate how fast the power output provided to energy grid 908 is expected to change as a result of the disturbance.

Still referring to FIG. 9A, memory 914 is shown to include a predictive controller 942. Predictive controller 942 may use a predictive control technique (e.g., feedforward control, model predictive control, etc.) to preemptively compensate for predicted disturbances before the disturbances affect the power output of the PV field. Predictive controller 942 may receive the predicted power output from power output predictor 940 and may determine whether any preemptive control actions are required based on the predicted power output. For example, predictive controller 942 may be configured to calculate an expected ramp rate of the predicted power output. Predictive controller 942 may compare the expected ramp rate to a threshold to determine whether ramp rate control is required. If the absolute value of the expected ramp rate exceeds the threshold, predictive controller 942 may determine that ramp rate control is required.

In some embodiments, predictive controller 942 identifies the minimum expected value of the predicted power output and determines when the predicted power output is expected to reach the minimum value. Predictive controller 942 may subtract the minimum expected power output from the current power output to determine an amount by which the power output is expected to decrease. Predictive controller 942 may apply the maximum allowable ramp rate to the amount by which the power output is expected to decrease to determine a minimum time required to ramp down the power output in order to comply with the maximum allowable ramp rate. For example, predictive controller 942 may divide the amount by which the power output is expected to decrease (e.g., measured in units of power) by the maximum allowable ramp rate (e.g., measured in units of power per unit time) to identify the minimum time required to ramp down the power output. Predictive controller 942 may subtract the minimum required time from the time at which the predicted power output is expected to reach the minimum value to determine when to start preemptively ramping down the power output.

In some embodiments, predictive controller 942 uses a model predictive control technique to determine optimal power setpoints for power inverters 904-906 at each time step within a prediction window. The prediction window may be window of time starting at the current time and ending at a time horizon (e.g., the current time plus a predetermined value). The power setpoints may be used by power inverters 904-906 to control an amount of power from the PV field and an amount of power from the battery (if any) output to energy grid 908 at each time step. Predictive controller 942 may determine the optimal power setpoints by selecting a set of power setpoints that optimize (e.g., maximize) a value function over the duration of the prediction window. The value function may include a plurality of terms that vary based on the power setpoints. For example, the value function may include an estimated revenue from the power output to energy grid 908, an estimated cost of failing to comply with the ramp rate limit, an estimated cost of battery capacity loss attributable to charging and discharging the battery, and/or the cost of operating the battery (e.g., heat generation, inverter losses, etc.). An exemplary model predictive control technique which may be used by predictive controller 942 is described in greater detail with reference to FIG. 9B.

Advantageously, predictive controller 942 may preemptively act upon predicted disturbances by causing PV field power inverter 904 to ramp down the power output before the disturbances affect the PV field. This allows PV field power inverter 904 to ramp down the power output by providing only a portion of the energy generated by PV cells 902 to energy grid 908 (i.e., performing the ramp down while the power output is still high), rather than requiring additional energy from a battery (i.e., performing the ramp down after the power output has decreased).

Still referring to FIG. 9A, memory 914 is shown to include a power output monitor 946. Power output monitor 946 may be configured to monitor the DC power outputs of PV cells 902 and the AC power output provided to energy grid 908. Power output monitor 946 may monitor the DC power outputs for individual PV cells 902 and/or a total DC power output for the PV field. The power outputs of individual PV cells 902 may be communicated to cloud detector 930 for use in detecting clouds/shadows that are beginning to affect the PV field. The power output provided to energy grid 908 may be communicated to ramp rate calculator 948 for use in calculating an actual ramp rate.

Ramp rate calculator 948 may calculate the ramp rate of the power output provided to energy grid 908. In some embodiments, ramp rate calculator 948 uses a plurality of power output values to determine an amount by which the power output has changed over time. For example, ramp rate calculator 948 may calculate the ramp rate as the derivative or slope of the power output as a function of time, as shown in the following equations:

$$\text{Ramp Rate} = \frac{dP}{dt} \text{ or Ramp Rate} = \frac{\Delta P}{\Delta t}$$

where P represents the power output to energy grid 908 and t represents time. Ramp rate calculator 948 may provide the calculated ramp rate to feedback controller 950.

Still referring to FIG. 9A, memory 914 is shown to include a feedback controller 950. Feedback controller 950 may receive the calculated ramp rate from ramp rate calculator 948 and may use the calculated ramp rate to determine whether ramp rate control is needed. For example, feedback controller 950 may compare the absolute value of the ramp rate to a threshold. If the absolute value of the ramp rate exceeds the threshold, feedback controller 950 may determine that ramp rate control is needed.

If the calculated ramp rate is positive and exceeds the threshold, feedback controller 950 may determine that the power output is increasing faster than the allowable ramp rate. In response to such a determination, feedback controller 950 may provide a control signal to power inverter 904. The control signal may cause power inverter 904 to provide only a portion of the energy generated by PV cells 902 to energy grid 908 so that the power output gradually increases at a rate less than the maximum allowable ramp rate. The remainder of the energy generated by PV cells 902 (i.e., the excess energy) may be stored in the battery and/or limited by power inverter 904.

If the calculated ramp rate is negative and the absolute value of the ramp rate exceeds the threshold, feedback controller 950 may determine that the power output is decreasing faster than the allowable ramp rate. In response to such a determination, feedback controller 950 may provide a control signal to battery power inverter 906. The control signal may cause battery power inverter 906 use energy from the battery to supplement the power output so that the power output gradually decreases at an absolute rate less than the maximum allowable ramp rate.

Figure 9B:
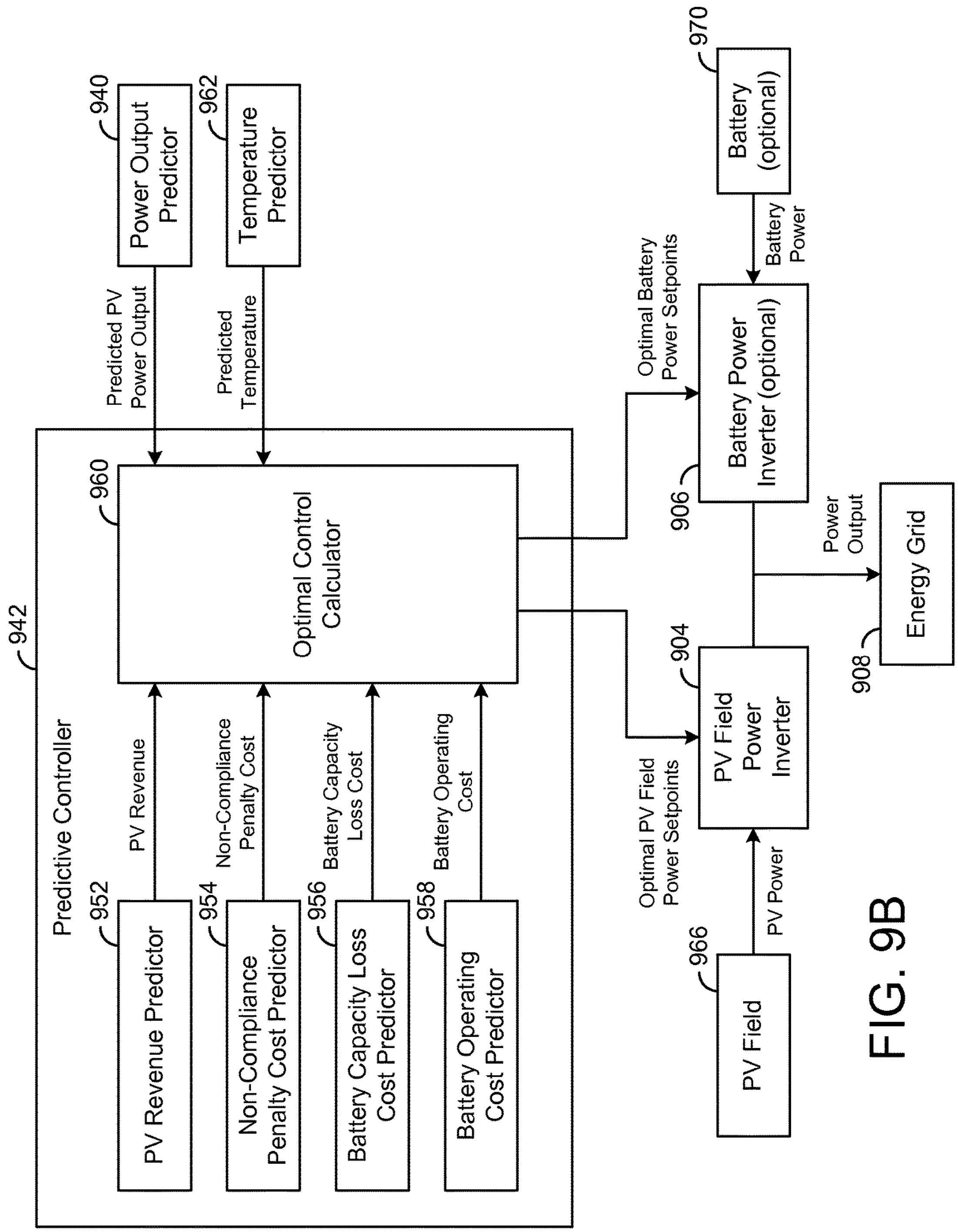
FIG. 9B is a block diagram illustrating the predictive controller of FIG. 9A in greater detail, according to an exemplary embodiment.

Referring now to FIG. 9B, a block diagram illustrating predictive controller 942 in greater detail is shown, according to an exemplary embodiment. Predictive controller 942 is shown to include a PV revenue predictor 952, a noncompliance penalty cost predictor 954, a battery capacity loss predictor 956, a battery operating cost predictor 958, and an optimal control calculator 960. Predictors 952-958 may use predictive models to determine an expected revenue and/or an expected cost of various control decisions made by optimal control calculator 960. Control decisions may include, for example, power setpoints for PV field power inverter 904 and/or power setpoints for battery power inverter 906 at each time step within a prediction window. The power setpoints for PV field power inverter 904 may be used by PV power inverter 904 to control an amount of PV power from PV field 966 provided to energy grid 908 at each time step. The power setpoints for battery power inverter 906 may be used by battery power inverter 906 to control an amount of power from battery 970 provided to energy grid 908 and/or an amount of power stored in battery 970 at each time step.

Optimal control calculator 960 may use the expected revenues and expected costs to determine an optimal set of power setpoints for the duration of the prediction window. Optimal control calculator 960 may determine the optimal power setpoints by selecting a set of power setpoints that optimize (e.g., maximize) a value function over the duration of the prediction window. The value function may include a plurality of terms that vary based on the power setpoints. For example, the value function may include an estimated revenue from the power output to energy grid 908, an estimated cost of failing to comply with the ramp rate limit, an estimated cost of battery capacity loss attributable to charging and discharging battery 970, and/or the cost of operating battery 970 (e.g., heat generation, inverter losses, etc.). Each term in the value function may be defined or provided by one or more of predictors 952-958.

PV revenue predictor 952 may be configured to predict an amount of revenue gained in exchange for the power output provided to energy grid 908. In some embodiments, PV revenue predictor 952 calculates PV revenue by multiplying the power output at each time step during the prediction window by a price at which the power is sold to energy grid 908. In other embodiments, PV revenue predictor 952 estimates an amount of energy provided to energy grid 908 over the duration of the prediction window and multiplies the amount of energy by a price per unit energy.

The amount of power/energy output to energy grid 908 may vary based on the control decisions made by optimal control calculator 960. In some embodiments, PV revenue predictor 952 provides optimal control calculator 960 with a PV revenue model that defines an amount of revenue as a function of the power output at each time step. For example, the revenue model may be defined as follows:

$$\$PV_{revenue}=\$_{kWh}(kW_{PV}+kW_{battery})$$

where $\$PV_{revenue}$ is the PV revenue, $\$_{kWh}$ is a price per unit of energy/power provided to energy grid 908, $kW_{PV}$ is the power setpoint for PV field power inverter 904, and $kW_{battery}$ is the power setpoint for battery power inverter 906. The quantity $kW_{PV}+kW_{battery}$ may be the total power output provided to energy grid 908. Optimal control calculator 960 may use the PV revenue model as part of the value function used to predict an overall value of the control decisions.

Non-compliance penalty cost predictor 954 may be configured to predict a cost of failing to comply with the ramp rate limit. The cost of failing to comply with the ramp rate limit may be a function of the number of non-compliance events that occur during the prediction window. Non-compliance events may occur when the power output to energy grid 908 increases or decreases at a rate in excess of the ramp rate limit. In some embodiments, non-compliance penalty cost predictor 954 classifies each time step as either compliant or non-compliant according to the rate of change of the power output during the time step. For example, non-compliance penalty cost predictor 954 may calculate the rate of change me powei output $$\left(\text{e.g., } \frac{dP_{PV}}{dt}\right)$$

during each time step and compare the rate of change to the rate limit $$\left(\text{e.g., } \frac{dP_{limit}}{dt}\right).$$

If the absolute value of the rate of change exceeds the ramp rate limit, non-compliance penalty cost predictor 954 may classify the time step as non-compliant.

The amount of power output to energy grid 908 may vary based on the control decisions made by optimal control calculator 960. In some embodiments, non-compliance penalty cost predictor 954 provides optimal control calculator 960 with a non-compliance penalty cost model that defines the non-compliance penalty cost as a function of the power output. For example, the non-compliance penalty cost model may be defined as follows:

$$\$Penalty_{non-compliance}=f\left(\max\left\{\frac{dP_{PV}}{dt}-\frac{dP_{limit}}{dt}>0,\,0\right\},\,\#_{occurrences}\right)$$

where $\$Penalty_{non-compliance}$ is the non-compliance penalty cost, and the term $$\frac{dP_{PV}}{dt}-\frac{dP_{limit}}{dt}$$

represents the amount by which the rate of change of the power output $$\frac{dP_{PV}}{dt}$$

exceeds the ramp rate limit $$\frac{dP_{limit}}{dt}.$$

In some embodiments, the max{ } term is a binary term that selects 1 if the ramp rate limit is exceeded and 0 if the ramp rate limit is not exceeded. The total non-compliance penalty cost may be based on the total number of non-compliance events (e.g., the total number of occurrences) during the prediction window. Optimal control calculator 960 may use the non-compliance penalty cost model as part of the value function used to predict an overall value of the control decisions.

Battery capacity loss cost predictor 956 may be configured to predict the cost of losses in battery capacity. The control decisions made by optimal control calculator 960 (i.e., the battery power setpoints) may have an effect on battery capacity over time. For example, losses in battery capacity may be attributable to repeatedly charging and discharging battery 970. Battery capacity loss cost predictor 956 may be configured to estimate an amount of battery capacity loss resulting from the control decisions made by optimal control calculator 960 and may assign a cost to the estimated battery capacity loss.

In some embodiments, battery capacity loss cost predictor 956 provides optimal control calculator 960 with a battery capacity loss cost model that defines the cost of battery capacity loss as a function of the control decisions made by optimal control calculator 960. For example, the battery capacity loss cost model may be defined as follows:

$$\$BatteryLifeLoss=f\left(DOD,\,T,\,SOC,\,\sum kW_{battery},\,\sum\frac{dkW_{battery}}{dt},\,\$PV_{revenue},\,i_n n\right)$$

where \$BatteryLifeLoss is the cost of the battery capacity loss, $kW_{battery}$ is the battery power setpoint, and $$\frac{dkW_{battery}}{dt}$$

is the rate of change of the battery power setpoint. As previously mentioned, the battery power setpoint $kW_{battery}$ may be one of the control decisions made by optimal control calculator 960. Optimal control calculator 960 may use the battery capacity loss cost model as part of the value function used to predict an overall value of the control decisions.

Battery operating cost predictor 960 may be configured to predict the cost of operating battery 970. The cost of operating battery 970 may include heat generation by battery 970. Heat generation may occur when battery 970 is charged or discharged and may require additional energy to be used to provide cooling for battery 970 or a space in which battery 970 is located. The cost of operating battery 970 may also include inverter losses and other inefficiencies (e.g., energy losses) that occur when battery 970 is charged or discharged.

The cost of operating battery 970 may be based on the control decisions made by optimal control calculator 960. In some embodiments, battery operating cost predictor 958 provides optimal control calculator 960 with a battery operating cost model that defines the cost of operating battery 970 as a function of the control decisions made by optimal control calculator 960. For example, the battery operating cost model may be defined as follows:

$$\$BatteryOperatingCost = \$_{kWh} \cdot k\overline{W}_{battery} \cdot t_{hours}\left[\frac{1}{\overline{\eta}_{freq}} + \frac{1-\overline{\eta}_{battery}}{\overline{COP}_{HVAC}}\right]$$

where \$BatteryOperatingCost is the cost of operating battery 970, $\$_{k\overline{Wh}}$ is the average cost per unit of energy lost, $k\overline{W}_{battery}$ is the average of the absolute value of the battery charging/discharging rates, $t_{hours}$ is the number of operating hours of battery 970, $\overline{\eta}_{battery}$ is the average storage efficiency of battery 970 (e.g., $\overline{\eta}_{battery}$~0.98), $\overline{\eta}_{freq}$ is the average efficiency of battery power inverter 906 (e.g., $\overline{\eta}_{freq}$~0.975), and $\overline{COP}_{HVAC}$ is the average coefficient of performance for the HVAC equipment used to cool battery 970. Optimal control calculator 960 may use the battery operating cost model as part of the value function used to predict an overall value of the control decisions.

Still referring to FIG. 9B, optimal control calculator 960 is shown receiving the PV revenue, the non-compliance penalty cost, the battery capacity loss cost, and the battery operating cost from predictors 952-958. In other embodiments, optimal control calculator 960 receives the predictive models from predictors 952-958. Optimal control calculator 960 may use the predictive models to predict revenues and costs estimated to result from various control decisions made by optimal control calculator 960. Optimal control calculator 960 is also shown receiving the predicted PV power output from power output predictor 940 and the predicted temperature from temperature predictor 962. The predicted PV power and predicted temperature may be defined for each time step within the prediction window. For example, the predicted PV power and the predicted temperature may be provided as vectors, as shown in the following equations:

$$\hat{P}_{PV} = \begin{bmatrix} \hat{P}_{PV,1} \\ \vdots \\ \hat{P}_{PV,H} \end{bmatrix} \quad \hat{T}_{OA} = \begin{bmatrix} \hat{T}_{OA,1} \\ \vdots \\ \hat{T}_{OA,H} \end{bmatrix}$$

where $\hat{P}_{PV,k}$ is the predicted power output of PV field 966 at time step k, $\hat{T}_{OA,k}$ is the predicted outside air temperature at time step k, and H is the total number of time steps within the prediction window.

Optimal control calculator 960 may use a value function to estimate the value of various sets of control decisions. In some embodiments, the value function is defined as follows:

$$J = \max\left\{\sum_{k}^{k+H} \$PV_{revenue,k} - \$Penalty_{non-compliance,k} - \$BatteryOperatingCost_k - \$BatteryLifeLoss_k\right\}$$

where $\$PV_{revenue,k}$ is the predicted PV revenue at time step k, $\$Penalty_{non-compliance,k}$ is the predicted cost of failing to comply with the ramp rate limit at time step k, $\$BatteryOperatingCost_{k}$ is the predicted cost of operating battery 970 at time step k, and $\$BatteryLifeLoss_k$ is the predicted loss in battery capacity at time step k. Each of these terms may be a function of the control decisions made by optimal control calculator 960, as previously described. Optimal control calculator 960 may optimize (e.g., maximize) the value function J subject to equality constraints (e.g., first law energy balances) and inequality constraints (e.g., second law equipment date limits) to determine optimal values for the PV field power setpoint $kW_{PV}$ and the battery power setpoint $kW_{battery}$ at each time step within the prediction window.

Other Types of Renewable Energy Systems

Figure 10:
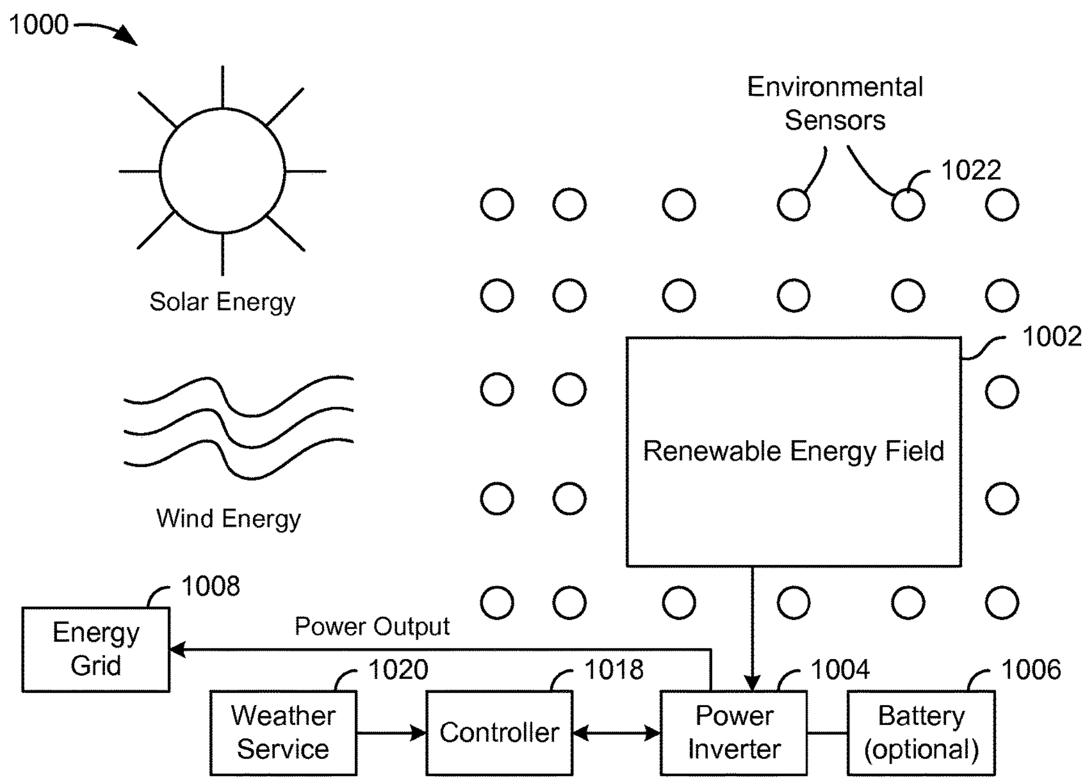
FIG. 10 is a drawing of a renewable energy system which predicts environmental disturbances and preemptively initiates ramp rate control before the environmental disturbances affect the renewable energy system, according to an exemplary embodiment.

Referring now to FIG. 10, a renewable energy system 1000 is shown, according to an exemplary embodiment. System 1000 is shown to include a power inverter 1004, an optional battery 1006, an energy grid 1008, and a controller 1018, which may be the same or similar to the corresponding components described with reference to FIGS. 3 and 7.

System 1000 is also shown to include a renewable energy field 1002. Renewable energy field 1002 may be configured to generate electricity using any type of renewable energy source (e.g., solar energy, wind energy, hydroelectric energy, tidal energy, geothermal energy, etc.). For example, renewable energy field 1002 may include a wind turbine array, a solar array, a hydroelectric plant, a geothermal energy extractor, or any other type of system or device configured to convert a renewable energy source into electricity.

System 1000 is shown to include environmental sensors 1022. Environmental sensors 1022 may be configured to measure an environmental condition that can affect the power output of renewable energy field 1002. For example, environmental sensors 1022 may include any of the cloud detection devices described with reference to FIG. 3. In some embodiments, environmental sensors 1022 include wind sensors configured to detect a wind speed and/or wind direction. In some embodiments, environmental sensors 1022 include flow sensors or water level sensors configured to measure a flowrate of water used to generate hydroelectric power.

Environmental sensors 1022 may be configured to detect an environmental disturbance before the disturbance affects renewable energy field 1002. For example, environmental sensors 1022 may measure a solar intensity or a wind speed at a location outside renewable energy field 1002. If renewable energy field 1002 uses hydroelectric power generation, environmental sensors 1022 may measure a water flowrate upstream of renewable energy field. In some embodiments, input from a weather service 1020 is used to supplement or replace the inputs from environmental sensors 1022. Advantageously, detecting the environmental disturbance before it affects renewable energy field 1002 allows controller 1018 to preemptively ramp down the power output provided to energy grid 1008 when the power output is still high, thereby avoiding the need for electric energy storage (i.e., battery 1006) for ramp rate control.

Figure 11:
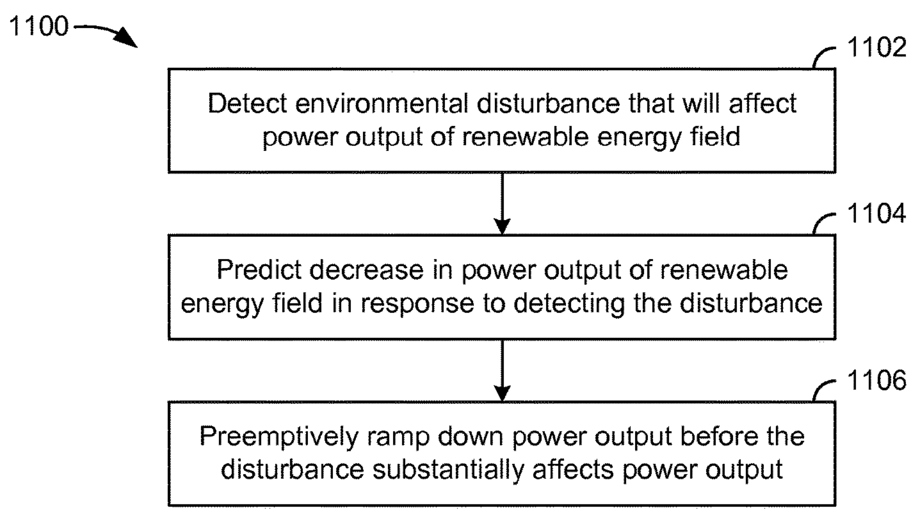
FIG. 11 is a flowchart of a process for controlling a ramp rate in the renewable energy system of FIG. 10, according to an exemplary embodiment.

Referring now to FIG. 11, a flowchart of another process 1100 for controlling a ramp rate in a renewable energy system is shown, according to an exemplary embodiment. Process 1100 may be performed by one or more components of renewable energy system 1000 (e.g., controller 1018, power inverter 1004, etc.), as described with reference to FIG. 11.

Process 1100 is shown to include detecting an environmental disturbance that will affect the power output of a renewable energy field (step 1102). The environmental disturbance may be any type of event or condition that changes the power output of the renewable energy field. For example, the environmental disturbance may be a change in solar intensity, a change in wind speed, a change in water flow rate, or any other event or condition that affects the rate at which renewable energy field 1002 generates electricity. In some embodiments, the environmental disturbance is detected by one or more environmental sensors configured to detect an approaching environmental disturbance before the environmental disturbance affects the renewable energy field.

Process 1100 is shown to include predicting a decrease in the power output of the renewable energy field in response to detecting the disturbance (step 1104). Step 1104 may include identifying the environmental disturbance detected in step 1102 and determining various attributes of the disturbance (e.g., position, size, velocity, etc.). The attributes of the disturbance may be used to determine an expected future location of the disturbance. If the expected future location of the disturbance coincides with the renewable energy field, step 1104 may include predicting that the power output of the renewable energy field is expected to decrease.

Process 1100 is shown to include preemptively ramping down the power output in response to the predicted decrease in power output (step 1106). Step 1106 may include causing a power inverter to limit the energy being generated by the renewable energy field. Advantageously, since the ramping down is performed preemptively (i.e., while the power output is still high), no additional energy from a battery is required.

Example Disturbance Rejection Scenarios

Figure 12:
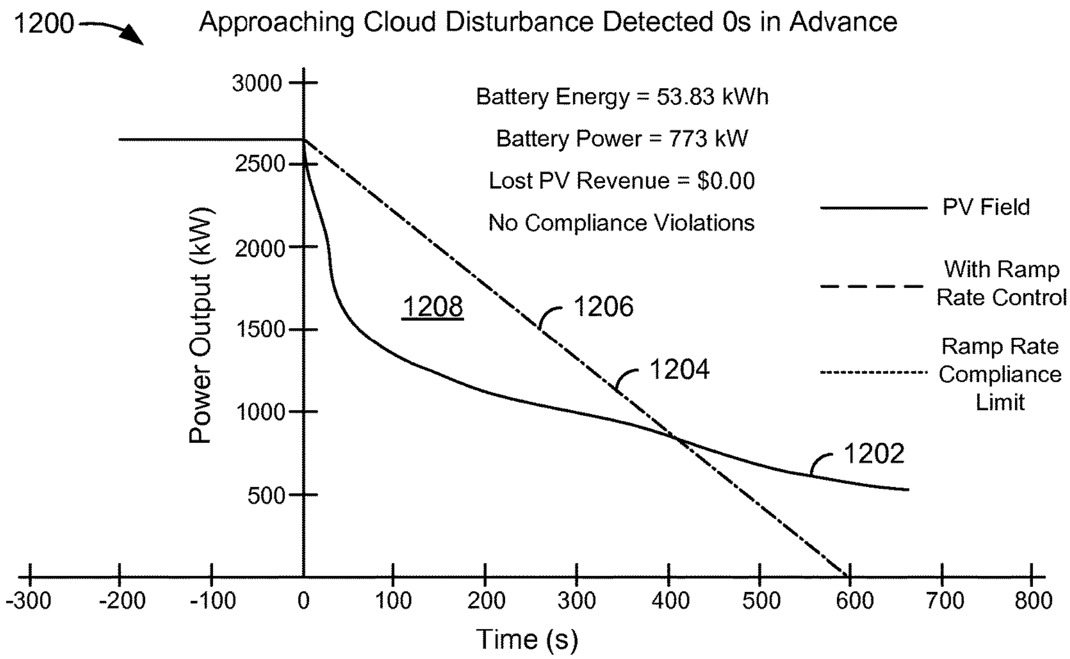
FIG. 12 is a graph illustrating a ramp rate control process in which a cloud disturbance is detected 0 seconds before the disturbance occurs and battery power is used to stay within ramp rate compliance limits, according to an exemplary embodiment.
Figure 13:
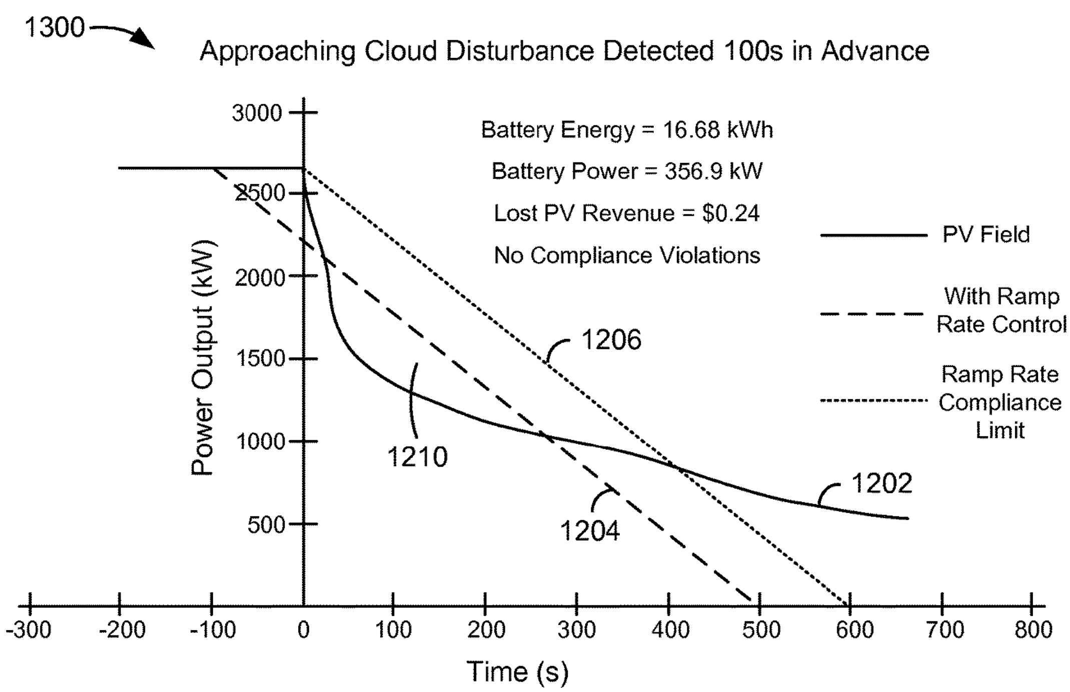
FIG. 13 is a graph illustrating a ramp rate control process in which a cloud disturbance is detected 100 seconds before the disturbance occurs and less battery power is used to stay within ramp rate compliance limits, according to an exemplary embodiment.
Figure 14:
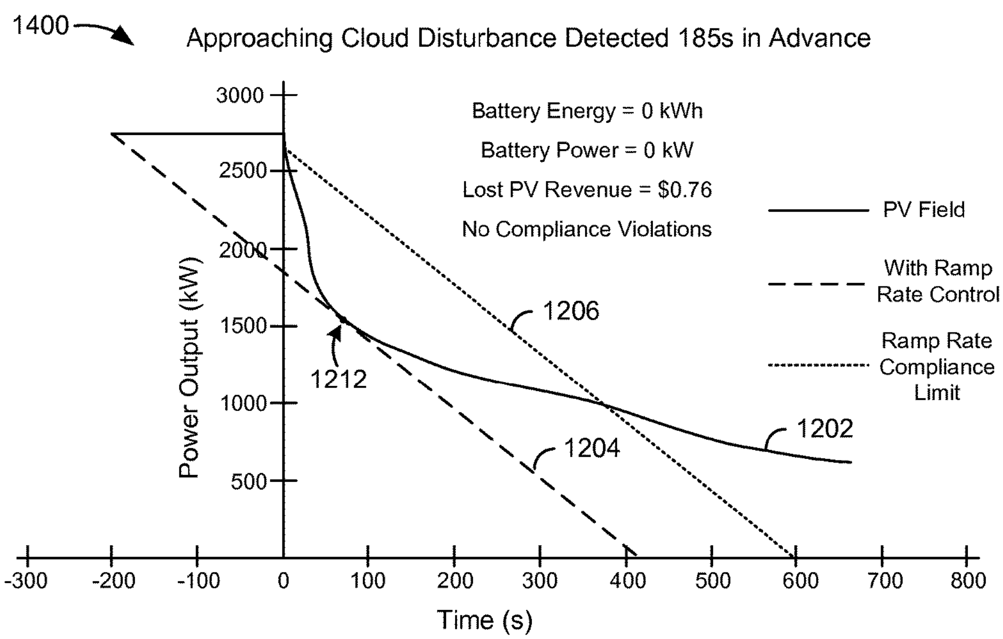
FIG. 14 is a graph illustrating a ramp rate control process in which a cloud disturbance is detected 185 seconds before the disturbance occurs and no battery power is used to stay within ramp rate compliance limits, according to an exemplary embodiment.

Referring now to FIGS. 12-14, several graphs 1200-1400 illustrating how a predictive controller can use predictions of approaching cloud disturbances to reduce the size and cost of batteries and power inverters in ramp rate control applications are shown, according to an exemplary embodiment. Line 1202 represents the power output of a PV field (e.g., PV field 966) as a function of time. At time=0 seconds, a cloud casts a shadow on PV field 966, which causes the power output of PV field 966 to drop suddenly at a rate exceeding the ramp rate limit. Line 1204 represents the power output provided to the energy grid (e.g., energy grid 908) when the power output is being controlled by a predictive controller configured to perform ramp rate control (e.g., predictive controller 942). Line 1206 represents the ramp rate compliance limit, shown as approximately 10% per minute.

Referring particularly to FIG. 12, graph 1200 illustrates a scenario in which predictive controller 942 detects an approaching cloud disturbance 0 seconds in advance (i.e., using a prediction horizon of 0 seconds). When the prediction horizon is 0 seconds, PV field power inverter 904 may be unable to start ramping down power output before the cloud shadow impacts PV field 966. Therefore, the only way to prevent the power output from dropping faster than the ramp rate compliance limit is to use energy from a large battery.

As shown in graph 1200, energy from the battery is used to supplement the power output from PV field 966 between time=0 seconds and time=400 seconds. Accordingly, the power output provided to the energy grid may follow line 1204 starting at time=0 seconds. Battery power is required until the power output from PV field 966 is sufficient to comply with the ramp rate limit, indicated by the intersection of lines 1202 and 1204 at time=400 seconds. At time=400 seconds, the power output provided to the energy grid switches back to line 1202.

In graph 1200, the area 1208 between lines 1202 and lines 1204 represents the amount of battery energy required to stay within compliance limits (e.g., approximately 53.83 kWh). The vertical distance between line 1202 and line 1204 at each instant in time represents the amount of battery power required to stay within compliance. The maximum battery power required is shown as approximately 773 kW.

Referring now to FIG. 13, graph 1300 illustrates a scenario in which predictive controller 942 detects an approaching cloud disturbance 100 seconds in advance of the disturbance affecting PV field 966. PV field power inverter 904 begins ramping down the power output at time=−100 seconds. Accordingly, the power output provided to the energy grid may follow line 1204 starting at time=−100. At approximately time=10 seconds, the PV field power output drops below the minimum required power to maintain stay within compliance. This is indicated by the intersection of lines 1202 and 1204 at time=10 seconds.

As shown in graph 1300, energy from the battery is used to supplement the power output from PV field 966 between time=10 seconds and time=260 seconds. Between time=−100 seconds and time=260 seconds, predictive controller 942 may decrease the power setpoint for PV field power inverter 904 at the ramp rate compliance limit. Battery power is required until the power output from PV field 966 is sufficient to comply with the ramp rate limit, indicated by the intersection of lines 1202 and 1204 at time=260 seconds. At time=260 seconds, battery power is no longer required and the power output provided to the energy grid switches back to line 1202. Between time=260 seconds and time=400 seconds, predictive controller 942 may decrease the power setpoint for PV field power inverter 904 at a rate less than the compliance limit, causing the power output to follow line 1202.

In graph 1300, the area 1210 between lines 1202 and lines 1204 represents the amount of battery energy required to stay within compliance limits (e.g., approximately 16.68 kWh). The vertical distance between line 1202 and line 1204 at each instant in time represents the amount of battery power required to stay within compliance. The maximum battery power required is shown as approximately 356.9 kW. Advantageously, predictive controller 942 reduces the required battery power by approximately 54% (i.e., from 773 kW to 357 kW) and the required battery capacity by approximately 69% (i.e., from 53.83 kWh to 16.68 kWh) with 100 seconds of advance notice. The cost penalty to begin ramping down power output at time=−100 seconds is only $0.24, assuming an energy cost of approximately $0.06 per kWh.

Referring now to FIG. 14, graph 1400 illustrates a scenario in which predictive controller 942 detects an approaching cloud disturbance 185 seconds in advance of the disturbance affecting PV field 966. PV field power inverter 904 begins ramping down the power output at time=−185 seconds. Between time=−185 seconds and time=75 seconds, the power output is ramped down at a rate equal to the compliance limit. Accordingly, the power output provided to the energy grid may follow line 1204 starting at time=−185.

At approximately time=75 seconds, line 1202 intersects line 1204 at a single point 1212. The single intersection point 1212 indicates that PV power inverter 904 is just able to reject the cloud disturbance by ramping down the power output in accordance with the setpoints provided by predictive controller 942 without requiring any power from the battery. Starting at time=75 seconds, predictive controller 942 may decrease the power setpoint for PV field power inverter 904 at a rate less than the compliance limit, causing the power output to follow line 1202.

As shown in graph 1400, the power output line 1202 does not drop below the minimum power required to stay within compliance, indicated by line 1204. Therefore, no battery power is required to stay within the compliance limit. The cost penalty to begin ramping down power output at time=−185 seconds is only $0.76, assuming an energy cost of approximately $0.06 per kWh. Advantageously, providing predictive controller 942 with 185 seconds of advance notice eliminates the requirement for a battery and a bidirectional power inverter, both of which can be expensive in conventional PV power systems. In other embodiments, a small (less expensive) battery may be used to account for PV disturbance prediction errors using feedback control, as described with reference to FIG. 9.

Figure 15:
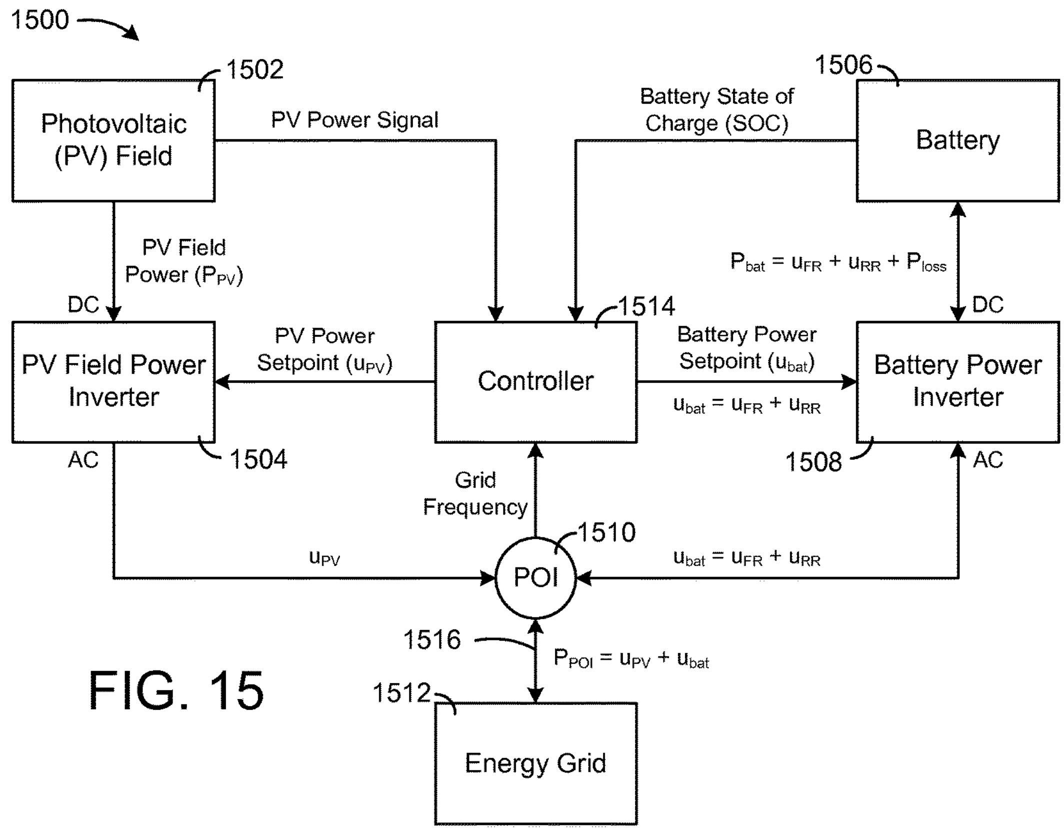
FIG. 15 is a block diagram of an electrical energy storage system that uses battery storage to perform both ramp rate control and frequency regulation, according to an exemplary embodiment.
Figure 16:
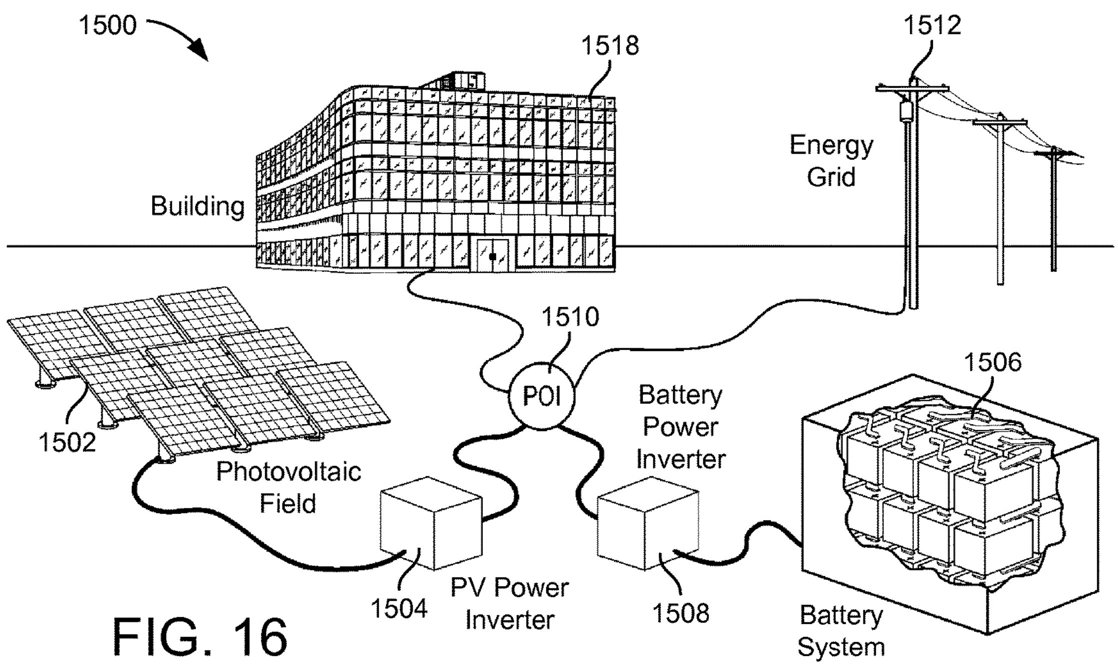
FIG. 16 is a drawing of the electrical energy storage system of FIG. 15, according to an exemplary embodiment.

Electrical Energy Storage System with Frequency Regulation and Ramp Rate Control Referring now to FIGS. 15-16, an electrical energy storage system 1500 is shown, according to an exemplary embodiment. System 1500 can use battery storage to perform both ramp rate control and frequency regulation. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). The grid frequency may remain balanced as long as there is a balance between the demand from the energy grid and the supply to the energy grid. An increase in demand yields a decrease in grid frequency, whereas an increase in supply yields an increase in grid frequency. During a fluctuation of the grid frequency, system 1500 may offset the fluctuation by either drawing more energy from the energy grid (e.g., if the grid frequency is too high) or by providing energy to the energy grid (e.g., if the grid frequency is too low). Advantageously, system 1500 may use battery storage in combination with photovoltaic power to perform frequency regulation while simultaneously complying with ramp rate requirements and maintaining the state-of-charge of the battery storage within a predetermined desirable range.

System 1500 is shown to include a photovoltaic (PV) field 1502, a PV field power inverter 1504, a battery 1506, a battery power inverter 1508, a point of interconnection (POI) 1510, and an energy grid 1512. In some embodiments, system 1500 also includes a controller 1514 (shown in FIG. 15) and/or a building 1518 (shown in FIG. 16). In brief overview, PV field power inverter 1504 can be operated by controller 1514 to control the power output of PV field 1502. Similarly, battery power inverter 1508 can be operated by controller 1514 to control the power input and/or power output of battery 1506. The power outputs of PV field power inverter 1504 and battery power inverter 1508 combine at POI 1510 to form the power provided to energy grid 1512. In some embodiments, building 1518 is also connected to POI 1510. Building 1518 can consume a portion of the combined power at POI 1510 to satisfy the energy requirements of building 1518.

PV field 1502 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 1502 may have any of a variety of sizes and/or locations. In some embodiments, PV field 1502 is part of a large-scale photovoltaic power station (e.g., a solar park or farm) capable of providing an energy supply to a large number of consumers. When implemented as part of a large-scale system, PV field 1502 may cover multiple hectares and may have power outputs of tens or hundreds of megawatts. In other embodiments, PV field 1502 may cover a smaller area and may have a relatively lesser power output (e.g., between one and ten megawatts, less than one megawatt, etc.). For example, PV field 1502 may be part of a rooftop-mounted system capable of providing enough electricity to power a single home or building. It is contemplated that PV field 1502 may have any size, scale, and/or power output, as may be desirable in different implementations.

PV field 1502 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 1502. When PV field 1502 is partially or completely covered by shadow, the power output of PV field 1502 (i.e., PV field power $P_{PV}$) may drop as a result of the decrease in solar intensity.

In some embodiments, PV field 1502 is configured to maximize solar energy collection. For example, PV field 1502 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 1502. In some embodiments, PV field 1502 includes a collection of mirrors, lenses, or solar concentrators configured to direct and/or concentrate sunlight on the solar panels. The energy generated by PV field 1502 may be stored in battery 1506 or provided to energy grid 1512.

Still referring to FIG. 15, system 1500 is shown to include a PV field power inverter 1504. Power inverter 1504 may be configured to convert the DC output of PV field 1502 $P_{PV}$ into an alternating current (AC) output that can be fed into energy grid 1512 or used by a local (e.g., off-grid) electrical network and/or by building 1518. For example, power inverter 1504 may be a solar inverter or grid-tie inverter configured to convert the DC output from PV field 1502 into a sinusoidal AC output synchronized to the grid frequency of energy grid 1512. In some embodiments, power inverter 1504 receives a cumulative DC output from PV field 1502. For example, power inverter 1504 may be a string inverter or a central inverter. In other embodiments, power inverter 1504 may include a collection of micro-inverters connected to each solar panel or solar cell. PV field power inverter 1504 may convert the DC power output $P_{PV}$ into an AC power output $u_{PV}$ and provide the AC power output $u_{PV}$ to POI 1510.

Power inverter 1504 may receive the DC power output $P_{PV}$ from PV field 1502 and convert the DC power output to an AC power output that can be fed into energy grid 1512. Power inverter 1504 may synchronize the frequency of the AC power output with that of energy grid 1512 (e.g., 50 Hz or 60 Hz) using a local oscillator and may limit the voltage of the AC power output to no higher than the grid voltage. In some embodiments, power inverter 1504 is a resonant inverter that includes or uses LC circuits to remove the harmonics from a simple square wave in order to achieve a sine wave matching the frequency of energy grid 1512. In various embodiments, power inverter 1504 may operate using high-frequency transformers, low-frequency transformers, or without transformers. Low-frequency transformers may convert the DC output from PV field 1502 directly to the AC output provided to energy grid 1512. High-frequency transformers may employ a multi-step process that involves converting the DC output to high-frequency AC, then back to DC, and then finally to the AC output provided to energy grid 1512.

Power inverter 1504 may be configured to perform maximum power point tracking and/or anti-islanding. Maximum power point tracking may allow power inverter 1504 to produce the maximum possible AC power from PV field 1502. For example, power inverter 1504 may sample the DC power output from PV field 1502 and apply a variable resistance to find the optimum maximum power point. Anti-islanding is a protection mechanism that immediately shuts down power inverter 1504 (i.e., preventing power inverter 1504 from generating AC power) when the connection to an electricity-consuming load no longer exists. In some embodiments, PV field power inverter 1504 performs ramp rate control by limiting the power generated by PV field 1502.

PV field power inverter 1504 can include any of a variety of circuit components (e.g., resistors, capacitors, indictors, transformers, transistors, switches, diodes, etc.) configured to perform the functions described herein. In some embodiments DC power from PV field 1502 is connected to a transformer of PV field power inverter 1504 through a center tap of a primary winding. A switch can be rapidly switched back and forth to allow current to flow back to PV field 1502 following two alternate paths through one end of the primary winding and then the other. The alternation of the direction of current in the primary winding of the transformer can produce alternating current (AC) in a secondary circuit.

In some embodiments, PV field power inverter 1504 uses an electromechanical switching device to convert DC power from PV field 1502 into AC power. The electromechanical switching device can include two stationary contacts and a spring supported moving contact. The spring can hold the movable contact against one of the stationary contacts, whereas an electromagnet can pull the movable contact to the opposite stationary contact. Electric current in the electromagnet can be interrupted by the action of the switch so that the switch continually switches rapidly back and forth. In some embodiments, PV field power inverter 1504 uses transistors, thyristors (SCRs), and/or various other types of semiconductor switches to convert DC power from PV field 1502 into AC power. SCRs provide large power handling capability in a semiconductor device and can readily be controlled over a variable firing range.

In some embodiments, PV field power inverter 1504 produces a square voltage waveform (e.g., when not coupled to an output transformer). In other embodiments, PV field power inverter 1504 produces a sinusoidal waveform that matches the sinusoidal frequency and voltage of energy grid 1512. For example, PV field power inverter 1504 can use Fourier analysis to produce periodic waveforms as the sum of an infinite series of sine waves. The sine wave that has the same frequency as the original waveform is called the fundamental component. The other sine waves, called harmonics, that are included in the series have frequencies that are integral multiples of the fundamental frequency.

In some embodiments, PV field power inverter 1504 uses inductors and/or capacitors to filter the output voltage waveform. If PV field power inverter 1504 includes a transformer, filtering can be applied to the primary or the secondary side of the transformer or to both sides. Low-pass filters can be applied to allow the fundamental component of the waveform to pass to the output while limiting the passage of the harmonic components. If PV field power inverter 1504 is designed to provide power at a fixed frequency, a resonant filter can be used. If PV field power inverter 1504 is an adjustable frequency inverter, the filter can be tuned to a frequency that is above the maximum fundamental frequency. In some embodiments, PV field power inverter 1504 includes feedback rectifiers or antiparallel diodes connected across semiconductor switches to provide a path for a peak inductive load current when the switch is turned off. The antiparallel diodes can be similar to freewheeling diodes commonly used in AC/DC converter circuits.

Still referring to FIG. 15, system 1500 is shown to include a battery power inverter 1508. Battery power inverter 1508 may be configured to draw a DC power $P_{bat}$ from battery 1506, convert the DC power $P_{bat}$ into an AC power $u_{bat}$,and provide the AC power $u_{bat}$ to POI 1510. Battery power inverter 1508 may also be configured to draw the AC power $u_{bat}$ from POI 1510, convert the AC power $u_{bat}$ into a DC battery power $P_{bat}$,and store the DC battery power $P_{bat}$ in battery 1506. As such, battery power inverter 1508 can function as both a power inverter and a rectifier to convert between DC and AC in either direction. The DC battery power $P_{bat}$ may be positive if battery 1506 is providing power to battery power inverter 1508 (i.e., if battery 1506 is discharging) or negative if battery 1506 is receiving power from battery power inverter 1508 (i.e., if battery 1506 is charging). Similarly, the AC battery power $u_{bat}$ may be positive if battery power inverter 1508 is providing power to POI 1510 or negative if battery power inverter 1508 is receiving power from POI 1510.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 1506 and/or battery power inverter 1508 (i.e., $P_{bat}=u_{FR}+u_{RR}+P_{loss}$). The PV field power $u_{PV}$ and the battery power $u_{bat}$ combine at POI 1510 to form $P_{POI}$ (i.e., $P_{POI}=u_{PV}+u_{bat}$), which represents the amount of power provided to energy grid 1512. $P_{POI}$ may be positive if POI 1510 is providing power to energy grid 1512 or negative if POI 1510 is receiving power from energy grid 1512.

Like PV field power inverter 1504, battery power inverter 1508 can include any of a variety of circuit components (e.g., resistors, capacitors, indictors, transformers, transistors, switches, diodes, etc.) configured to perform the functions described herein. Battery power inverter 1508 can include many of the same components as PV field power inverter 1504 and can operate using similar principles. For example, battery power inverter 1508 can use electromechanical switching devices, transistors, thyristors (SCRs), and/or various other types of semiconductor switches to convert between AC and DC power. Battery power inverter 1508 can operate the circuit components to adjust the amount of power stored in battery 1506 and/or discharged from battery 1506 (i.e., power throughput) based on a power control signal or power setpoint from controller 1514.

Still referring to FIG. 15, system 1500 is shown to include a controller 1514. Controller 1514 may be configured to generate a PV power setpoint $u_{PV}$ for PV field power inverter 1504 and a battery power setpoint $u_{bat}$ for battery power inverter 1508. Throughout this disclosure, the variable $u_{PV}$ is used to refer to both the PV power setpoint generated by controller 1514 and the AC power output of PV field power inverter 1504 since both quantities have the same value. Similarly, the variable $u_{bat}$ is used to refer to both the battery power setpoint generated by controller 1514 and the AC power output/input of battery power inverter 1508 since both quantities have the same value.

PV field power inverter 1504 uses the PV power setpoint $u_{PV}$ to control an amount of the PV field power $P_{PV}$ to provide to POI 1510. The magnitude of $u_{PV}$ may be the same as the magnitude of $P_{PV}$ or less than the magnitude of $P_{PV}$. For example, $u_{PV}$ may be the same as $P_{PV}$ if controller 1514 determines that PV field power inverter 1504 is to provide all of the photovoltaic power $P_{PV}$ to POI 1510. However, $u_{PV}$ may be less than $P_{PV}$ if controller 1514 determines that PV field power inverter 1504 is to provide less than all of the photovoltaic power $P_{PV}$ to POI 1510. For example, controller 1514 may determine that it is desirable for PV field power inverter 1504 to provide less than all of the photovoltaic power $P_{PV}$ to POI 1510 to prevent the ramp rate from being exceeded and/or to prevent the power at POI 1510 from exceeding a power limit.

Battery power inverter 1508 uses the battery power setpoint $u_{bat}$ to control an amount of power charged or discharged by battery 1506. The battery power setpoint $u_{bat}$ may be positive if controller 1514 determines that battery power inverter 1508 is to draw power from battery 1506 or negative if controller 1514 determines that battery power inverter 1508 is to store power in battery 1506. The magnitude of $u_{bat}$ controls the rate at which energy is charged or discharged by battery 1506.

Controller 1514 may generate $u_{PV}$ and $u_{bat}$ based on a variety of different variables including, for example, a power signal from PV field 1502 (e.g., current and previous values for $P_{PV}$), the current state-of-charge (SOC) of battery 1506, a maximum battery power limit, a maximum power limit at POI 1510, the ramp rate limit, the grid frequency of energy grid 1512, and/or other variables that can be used by controller 1514 to perform ramp rate control and/or frequency regulation. Advantageously, controller 1514 generates values for $u_{PV}$ and $u_{bat}$ that maintain the ramp rate of the PV power within the ramp rate compliance limit while participating in the regulation of grid frequency and maintaining the SOC of battery 1506 within a predetermined desirable range. An exemplary controller which can be used as controller 1514 and exemplary processes which may be performed by controller 1514 to generate the PV power setpoint $u_{PV}$ and the battery power setpoint $u_{bat}$ are described in detail in U.S. Provisional Patent Application No. 62/239,245 filed Oct. 8, 2015, the entire disclosure of which is incorporated by reference herein.

Frequency Regulation and Ramp Rate Controller

Figure 17:
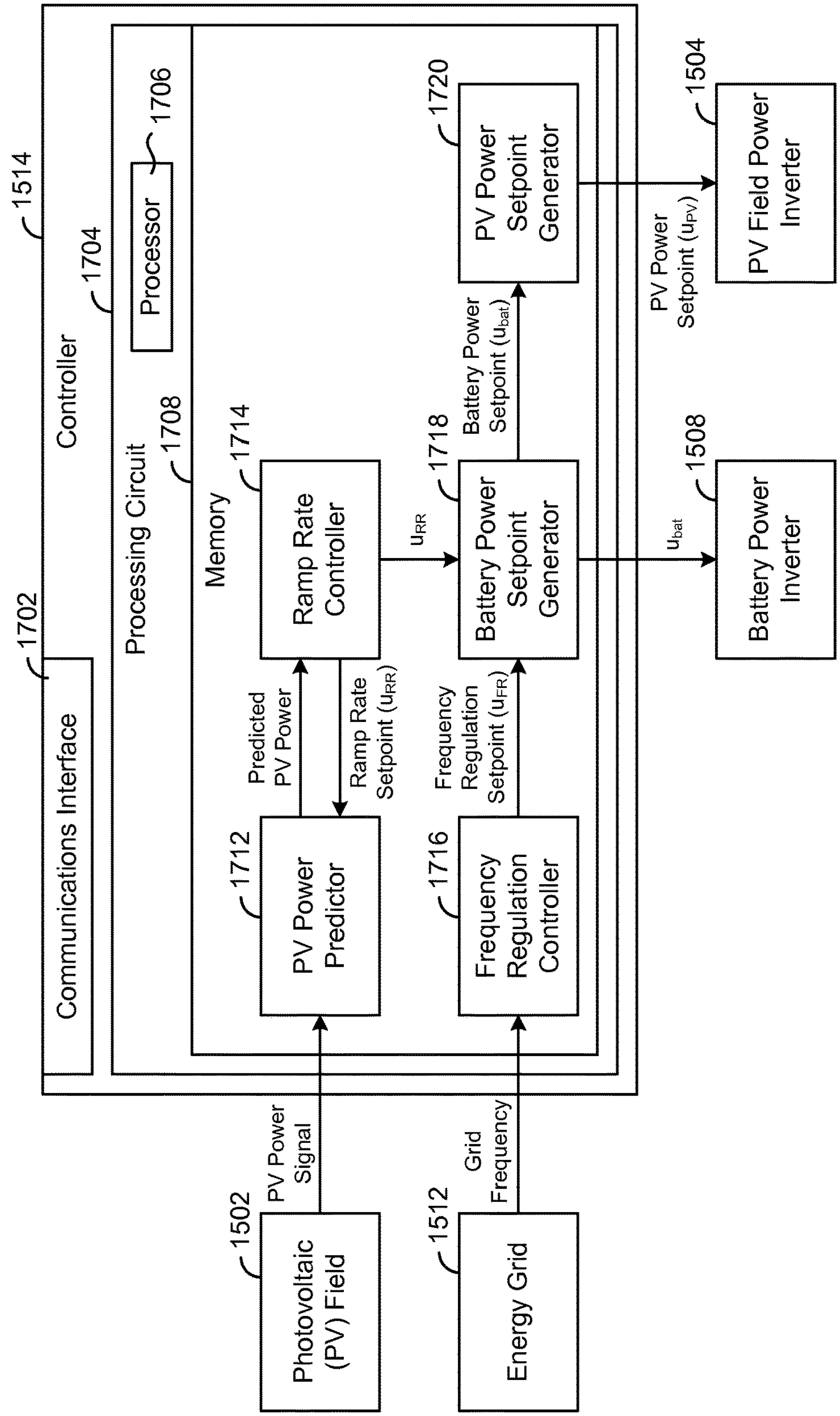
FIG. 17 is a block diagram of a frequency regulation and ramp rate controller which can be used to monitor and control the electrical energy storage system of FIG. 15, according to an exemplary embodiment.

Referring now to FIG. 17, a block diagram illustrating controller 1514 in greater detail is shown, according to an exemplary embodiment. Controller 1514 is shown to include a communications interface 1702 and a processing circuit 1704. Communications interface 1702 may include wired or wireless interfaces (e.g., jacks, antennas, transmitters, receivers, transceivers, wire terminals, etc.) for conducting data communications with various systems, devices, or networks. For example, communications interface 1502 may include an Ethernet card and port for sending and receiving data via an Ethernet-based communications network and/or a WiFi transceiver for communicating via a wireless communications network. Communications interface 1702 may be configured to communicate via local area networks or wide area networks (e.g., the Internet, a building WAN, etc.) and may use a variety of communications protocols (e.g., BACnet, IP, LON, etc.).

Communications interface 1702 may be a network interface configured to facilitate electronic data communications between controller 1514 and various external systems or devices (e.g., PV field 1502, energy grid 1512, PV field power inverter 1504, battery power inverter 1508, etc.). For example, controller 1514 may receive a PV power signal from PV field 1502 indicating the current value of the PV power $P_{PV}$ generated by PV field 1502. Controller 1514 may use the PV power signal to predict one or more future values for the PV power $P_{PV}$ and generate a ramp rate setpoint $u_{RR}$. Controller 1514 may receive a grid frequency signal from energy grid 1512 indicating the current value of the grid frequency. Controller 1514 may use the grid frequency to generate a frequency regulation setpoint $u_{FR}$. Controller 1514 may use the ramp rate setpoint $u_{RR}$ and the frequency regulation setpoint $u_{FR}$ to generate a battery power setpoint $u_{bat}$ and may provide the battery power setpoint $u_{bat}$ to battery power inverter 1508. Controller 1514 may use the battery power setpoint $u_{bat}$ to generate a PV power setpoint $u_{PV}$ and may provide the PV power setpoint $u_{PV}$ to PV field power inverter 1504.

Still referring to FIG. 17, processing circuit 1704 is shown to include a processor 1706 and memory 1708. Processor 1706 may be a general purpose or specific purpose processor, an application specific integrated circuit (ASIC), one or more field programmable gate arrays (FPGAs), a group of processing components, or other suitable processing components. Processor 1706 may be configured to execute computer code or instructions stored in memory 1708 or received from other computer readable media (e.g., CDROM, network storage, a remote server, etc.).

Memory 1708 may include one or more devices (e.g., memory units, memory devices, storage devices, etc.) for storing data and/or computer code for completing and/or facilitating the various processes described in the present disclosure. Memory 1708 may include random access memory (RAM), read-only memory (ROM), hard drive storage, temporary storage, non-volatile memory, flash memory, optical memory, or any other suitable memory for storing software objects and/or computer instructions. Memory 1708 may include database components, object code components, script components, or any other type of information structure for supporting the various activities and information structures described in the present disclosure. Memory 1708 may be communicably connected to processor 1706 via processing circuit 1704 and may include computer code for executing (e.g., by processor 1706) one or more processes described herein.

Predicting PV Power Output

Still referring to FIG. 17, controller 1514 is shown to include a PV power predictor 1712. PV power predictor 1712 may receive the PV power signal from PV field 1502 and use the PV power signal to make a short term prediction of the photovoltaic power output $P_{PV}$. In some embodiments, PV power predictor 1712 predicts the value of $P_{PV}$ for the next time step (i.e., a one step ahead prediction). For example, at each time step k, PV power predictor 1712 may predict the value of the PV power output $P_{PV}$ for the next time step k+1 (i.e., $\hat{P}_{PV}(k+1)$). Advantageously, predicting the next value for the PV power output $P_{PV}$ allows controller 1514 to predict the ramp rate and perform an appropriate control action to prevent the ramp rate from exceeding the ramp rate compliance limit.

In some embodiments, PV power predictor 1712 performs a time series analysis to predict $\hat{P}_{PV}(k+1)$. A time series may be defined by an ordered sequence of values of a variable at equally spaced intervals. PV power predictor 1712 may model changes between values of $P_{PV}$ over time using an autoregressive moving average (ARMA) model or an autoregressive integrated moving average (ARIMA) model. PV power predictor 1712 may use the model to predict the next value of the PV power output $P_{PV}$ and correct the prediction using a Kalman filter each time a new measurement is acquired. The time series analysis technique is described in greater detail in the following paragraphs.

In some embodiments, PV power predictor 1712 uses a technique in the Box-Jenkins family of techniques to perform the time series analysis. These techniques are statistical tools that use past data (e.g., lags) to predict or correct new data, and other techniques to find the parameters or coefficients of the time series. A general representation of a time series from the Box-Jenkins approach is:

$$X_k - \sum_{r=1}^{p} \varphi_r X_{k-r} = \sum_{s=0}^{q} \theta_s \varepsilon_{k-s}$$

which is known as an ARMA process. In this representation, the parameters p and q define the order and number of lags of the time series, φ is an autoregressive parameter, and θ is a moving average parameter. This representation is desirable for a stationary process which has a mean, variance, and autocorrelation structure that does not change over time. However, if the original process $\{Y_k\}$ representing the time series values of $P_{PV}$ is not stationary, $X_k$ can represent the first difference (or higher order difference) of the process $\{Y_k - Y_{k-1}\}$. If the difference is stationary, PV power predictor 1712 may model the process as an ARIMA process.

PV power predictor 1712 may be configured to determine whether to use an ARMA model or an ARIMA model to model the time series of the PV power output $P_{PV}$. Determining whether to use an ARMA model or an ARIMA model may include identifying whether the process is stationary. In some embodiments, the power output $P_{PV}$ is not stationary. However, the first difference $Y_k - Y_{k-1}$ may be stationary. Accordingly, PV power predictor 1712 may select an ARIMA model to represent the time series of $P_{PV}$.

PV power predictor 1712 may find values for the parameters p and q that define the order and the number of lags of the time series. In some embodiments, PV power predictor 1712 finds values for p and q by checking the partial autocorrelation function (PACF) and selecting a number where the PACF approaches zero (e.g., p=q). For some time series data, PV power predictor 1712 may determine that a $4^{th}$ or $5^{th}$ order model is appropriate. However, it is contemplated that PV power predictor 1712 may select a different model order to represent different time series processes.

PV power predictor 1712 may find values for the autoregressive parameter $\varphi_{1 \ldots p}$ and the moving average parameter $\theta_{1 \ldots q}$. In some embodiments, PV power predictor 1712 uses an optimization algorithm to find values for $\varphi_{1 \ldots p}$ and $\theta_{1 \ldots q}$ given the time series data $\{Y_k\}$. For example, PV power predictor 1712 may generate a discrete-time ARIMA model of the form:

$$A(z)y(k) = \left[\frac{C(z)}{1 - z^{-1}}\right]e(t)$$

where A(z) and C(z) are defined as follows:

$$A(z)=1+\varphi_1 z^{-1}+\varphi_2 z^{-2}+\varphi_3 z^{-3}+\varphi_4 z^{-4}$$

$$C(z)=1+\theta_1 z^{-1}+\theta_2 z^{-2}+\theta_3 z^{-3}+\theta_4 z^{-4}$$

where the values for $\varphi_{1 \ldots p}$ and $\theta_{1 \ldots q}$ are determined by fitting the model to the time series values of $P_{PV}$.

In some embodiments, PV power predictor 1712 uses the ARIMA model as an element of a Kalman filter. The Kalman filter may be used by PV power predictor 1712 to correct the estimated state and provide tighter predictions based on actual values of the PV power output $P_{PV}$. In order to use the ARIMA model with the Kalman filter, PV power predictor 1712 may generate a discrete-time state-space representation of the ARIMA model of the form:

$$x(k+1)=Ax(k)+Ke(k)$$

$$y(k)=Cx(k)+e(k)$$

where y(k) represents the values of the PV power output $P_{PV}$ and e(k) is a disturbance considered to be normal with zero mean and a variance derived from the fitted model. It is contemplated that the state-space model can be represented in a variety of different forms. For example, the ARIMA model can be rewritten as a difference equation and used to generate a different state-space model using state-space modeling techniques. In various embodiments, PV power predictor 1712 may use any of a variety of different forms of the state-space model.

The discrete Kalman filter consists of an iterative process that takes a state-space model and forwards it in time until there are available data to correct the predicted state and obtain a better estimate. The correction may be based on the evolution of the mean and covariance of an assumed white noise system. For example, PV power predictor 1712 may use a state-space model of the following form:

$$x(k+1)=Ax(k)+Bu(k)+w(k)\ w(k)\sim N(0,Q)$$

$$y(k)=Cx(k)+Du(k)+v(k)\ v(k)\sim N(0,R)$$

where N( ) represents a normal distribution, v(k) is the measurement error having zero mean and variance R, and w(k) is the process error having zero mean and variance Q. The values of R and Q are design choices. The variable x(k) is a state of the process and the variable y(k) represents the PV power output $P_{PV}(k)$. This representation is referred to as a stochastic state-space representation.

PV power predictor 1712 may use the Kalman filter to perform an iterative process to predict $\hat{P}_{PV}(k+1)$ based on the current and previous values of $P_{PV}$ (e.g., $P_{PV}(k)$, $P_{PV}(k-1)$, etc.). The iterative process may include a prediction step and an update step. The prediction step moves the state estimate forward in time using the following equations:

$$\hat{x}^-(k+1)=A*\hat{x}(k)$$

$$P^-(k+1)=A*P(k)*A^T+Q$$

where $\hat{x}(k)$ is the mean of the process or estimated state at time step k and P(k) is the covariance of the process at time step k. The super index "–" indicates that the estimated state $\hat{x}^-(k+1)$ is based on the information known prior to time step k+1 (i.e., information up to time step k). In other words, the measurements at time step k+1 have not yet been incorporated to generate the state estimate $\hat{x}^-(k+1)$. This is known as an a priori state estimate.

PV power predictor 1712 may predict the PV power output $\hat{P}_{PV}(k+1)$ by determining the value of the predicted measurement $\hat{y}^-(k+1)$. As previously described, the measurement y(k) and the state x(k) are related by the following equation:

$$y(k)=Cx(k)+e(k)$$

which allows PV power predictor 1712 to predict the measurement $\hat{y}^-(k+1)$ as a function of the predicted state $\hat{x}^-(k+1)$. PV power predictor 1712 may use the measurement estimate $\hat{y}^-(k+1)$ as the value for the predicted PV power output $\hat{P}_{PV}(k+1)$ (i.e., $\hat{P}_{PV}(k+1)=\hat{y}^-(k+1)$).

The update step uses the following equations to correct the a priori state estimate $\hat{x}^-(k+1)$ based on the actual (measured) value of y(k+1):

$$K=P^-(k+1)*C^T*[R+C*P^-(k+1)*C^T]^{-1}$$

$$\hat{x}(k+1)=\hat{x}^-(k+1)+K*[y(k+1)-C*\hat{x}^-(k+1)]$$

$$P(k+1)=P^-(k+1)-K*[R+C*P^-(k+1)*C^T]*K^T$$

where y(k+1) corresponds to the actual measured value of $P_{PV}(k+1)$. The variable $\hat{x}(k+1)$ represents the a posteriori estimate of the state x at time k+1 given the information known up to time step k+1. The update step allows PV power predictor 1712 to prepare the Kalman filter for the next iteration of the prediction step.

Although PV power predictor 1712 is primarily described as using a time series analysis to predict $\hat{P}_{PV}(k+1)$, it is contemplated that PV power predictor 1712 may use any of a variety of techniques to predict the next value of the PV power output $P_{PV}$. For example, PV power predictor 1712 may use a deterministic plus stochastic model trained from historical PV power output values (e.g., linear regression for the deterministic portion and an AR model for the stochastic portion). This technique is described in greater detail in U.S. patent application Ser. No. 14/717,593, titled "Building Management System for Forecasting Time Series Values of Building Variables" and filed May 20, 2015, the entirety of which is incorporated by reference herein.

In other embodiments, PV power predictor 1712 uses input from cloud detectors (e.g., cameras, light intensity sensors, radar, etc.) to predict when an approaching cloud will cast a shadow upon PV field 1502. When an approaching cloud is detected, PV power predictor 1712 may estimate an amount by which the solar intensity will decrease as a result of the shadow and/or increase once the shadow has passed PV field 1502. PV power predictor 1712 may use the predicted change in solar intensity to predict a corresponding change in the PV power output $P_{PV}$. This technique is described in greater detail in U.S. Provisional Patent Application No. 62/239,131 titled "Systems and Methods for Controlling Ramp Rate in a Photovoltaic Energy System" and filed Oct. 8, 2015, the entirety of which is incorporated by reference herein. PV power predictor 1712 may provide the predicted PV power output $\hat{P}_{PV}(k+1)$ to ramp rate controller 1714.

Controlling Ramp Rate

Still referring to FIG. 17, controller 1514 is shown to include a ramp rate controller 1714. Ramp rate controller 1714 may be configured to determine an amount of power to charge or discharge from battery 1506 for ramp rate control (i.e., $u_{RR}$). Advantageously, ramp rate controller 1714 may determine a value for the ramp rate power $u_{RR}$ that simultaneously maintains the ramp rate of the PV power (i.e., $u_{RR}+P_{PV}$) within compliance limits while allowing controller 1514 to regulate the frequency of energy grid 1512 and while maintaining the state-of-charge of battery 1506 within a predetermined desirable range.

In some embodiments, the ramp rate of the PV power is within compliance limits as long as the actual ramp rate evaluated over a one minute interval does not exceed ten percent of the rated capacity of PV field 1502. The actual ramp rate may be evaluated over shorter intervals (e.g., two seconds) and scaled up to a one minute interval. Therefore, a ramp rate may be within compliance limits if the ramp rate satisfies one or more of the following inequalities:

$$|rr|<\frac{0.1P_{cap}}{30}(1+\text{tolerance})$$

$$|RR|<0.1P_{cap}(1+\text{tolerance})$$

where rr is the ramp rate calculated over a two second interval, RR is the ramp rate calculated over a one minute interval, $P_{cap}$ is the rated capacity of PV field 1502, and tolerance is an amount by which the actual ramp rate can exceed the compliance limit without resulting in a non-compliance violation (e.g., tolerance=10%). In this formulation, the ramp rates rr and RR represent a difference in the PV power (e.g., measured in kW) at the beginning and end of the ramp rate evaluation interval.

Simultaneous implementation of ramp rate control and frequency regulation can be challenging (e.g., can result in non-compliance), especially if the ramp rate is calculated as the difference in the power $P_{POI}$ at POI 1510. In some embodiments, the ramp rate over a two second interval is defined as follows:

$$rr=[P_{POI}(k)-P_{POI}(k-1)]-[u_{FR}(k)-u_{FR}(k-1)]$$

where $P_{POI}(k-1)$ and $P_{POI}(k)$ are the total powers at POI 1510 measured at the beginning and end, respectively, of a two second interval, and $u_{FR}(k-1)$ and $u_{FR}(k)$ are the powers used for frequency regulation measured at the beginning and end, respectively, of the two second interval.

The total power at POI 1510 (i.e., $P_{POI}$) is the sum of the power output of PV field power inverter 1504 (i.e., $u_{PV}$) and the power output of battery power inverter 1508 (i.e., $u_{bat}=u_{FR}u_{RR}$). Assuming that PV field power inverter 1504 is not limiting the power $P_{PV}$ generated by PV field 1502, the output of PV field power inverter 1504 $u_{PV}$ may be equal to the PV power output $P_{PV}$ (i.e., $P_{PV}=u_{PV}$) and the total power $P_{POI}$ at POI 1510 can be calculated using the following equation:

$$P_{POI}=P_{PV}+u_{FR}+u_{RR}$$

Therefore, the ramp rate rr can be rewritten as:

$$rr=P_{PV}(k)-P_{PV}(k-1)+u_{RR}(k)-u_{RR}(k-1)$$

and the inequality which must be satisfied to comply with the ramp rate limit can be rewritten as:

$$|P_{PV}(k)-P_{PV}(k-1)+u_{RR}(k)-u_{RR}(k-1)|<\frac{0.1P_{cap}}{30}(1+\text{tolerance})$$

where $P_{PV}(k-1)$ and $P_{PV}(k)$ are the power outputs of PV field 1502 measured at the beginning and end, respectively, of the two second interval, and $u_{RR}(k-1)$ and $u_{RR}(k)$ are the powers used for ramp rate control measured at the beginning and end, respectively, of the two second interval.

In some embodiments, ramp rate controller 1714 determines the ramp rate compliance of a facility based on the number of scans (i.e., monitored intervals) in violation that occur within a predetermined time period (e.g., one week) and the total number of scans that occur during the predetermined time period. For example, the ramp rate compliance RRC may be defined as a percentage and calculated as follows:

$$RRC=100\left(1-\frac{n_{vscan}}{n_{tscan}}\right)$$

where $n_{vscan}$ is the number of scans over the predetermined time period where rr is in violation and $n_{tscan}$ is the total number of scans during which the facility is performing ramp rate control during the predetermined time period.

In some embodiments, the intervals that are monitored or scanned to determine ramp rate compliance are selected arbitrarily or randomly (e.g., by a power utility). Therefore, it may be impossible to predict which intervals will be monitored. Additionally, the start times and end times of the intervals may be unknown. In order to guarantee ramp rate compliance and minimize the number of scans where the ramp rate is in violation, ramp rate controller 1714 may determine the amount of power $u_{RR}$ used for ramp rate control ahead of time. In other words, ramp rate controller 1714 may determine, at each instant, the amount of power $u_{RR}$ to be used for ramp rate control at the next instant. Since the start and end times of the intervals may be unknown, ramp rate controller 1714 may perform ramp rate control at smaller time intervals (e.g., on the order of milliseconds).

Ramp rate controller 1714 may use the predicted PV power $\hat{P}_{PV}(k-1)$ at instant k+1 and the current PV power $P_{PV}(k)$ at instant k to determine the ramp rate control power $\hat{u}_{RR_T}(k)$ at instant k. Advantageously, this allows ramp rate controller 1714 to determine whether the PV power $P_{PV}$ is in an up-ramp, a down-ramp, or no-ramp at instant k. Assuming a T seconds time resolution, ramp rate controller 1714 may determine the value of the power for ramp rate control $\hat{u}_{RR_T}(k)$ at instant k based on the predicted value of the PV power $\hat{P}_{PV}(k+1)$, the current value of the PV power $P_{PV}(k)$, and the previous power used for ramp rate control $\hat{u}i_{RR_T}(k-1)$. Scaling to T seconds and assuming a tolerance of zero, ramp rate compliance is guaranteed if $\hat{u}_{RR_T}(k)$ satisfies the following inequality:

$$lb_{RR_T}\leq\hat{u}_{RR_T}\leq ub_{RR_T}$$

where T is the sampling time in seconds, $lb_{RR_T}$ is the lower bound on $\hat{u}_{RR_T}(k)$, and $ub_{RR_T}$ is the upper bound on $\hat{u}_{RR_T}(k)$ In some embodiments, the lower bound $lb_{RR_T}$ and the upper bound $ub_{RR_T}$ are defined as follows:

$$lb_{RR_T}=-\left(\hat{P}_{PV}(k+1)-P_{PV}(k)\right)+\hat{u}_{RR_T}(k-1)-\frac{0.1P_{cap}}{60/T}+\lambda\sigma$$

$$ub_{RR_T}=-\left(\hat{P}_{PV}(k+1)-P_{PV}(k)\right)+\hat{u}_{RR_T}(k-1)+\frac{0.1P_{cap}}{60/T}-\lambda\sigma$$

where σ is the uncertainty on the PV power prediction and λ is a scaling factor of the uncertainty in the PV power prediction. Advantageously, the lower bound $lb_{RR_T}$ and the upper bound $ub_{RR_T}$ provide a range of ramp rate power $\hat{u}_{RR_T}(k)$ that guarantees compliance of the rate of change in the PV power.

In some embodiments, ramp rate controller 1714 determines the ramp rate power $\hat{u}_{RR_T}(k)$ based on whether the PV power $P_{PV}$ is in an up-ramp, a down-ramp, or no-ramp (e.g., the PV power is not changing or changing at a compliant rate) at instant k. Ramp rate controller 1714 may also consider the state-of-charge (SOC) of battery 1506 when determining $\hat{u}_{RR_T}(k)$ Exemplary processes which may be performed by ramp rate controller 1714 to generate values for the ramp rate power $\hat{u}_{RR_T}(k)$ are described in detail in U.S. Patent Application No. 62/239,245. Ramp rate controller 1714 may provide the ramp rate power setpoint $\hat{u}_{RR_T}(k)$ to battery power setpoint generator 1718 for use in determining the battery power setpoint $u_{bat}$.

Controlling Frequency Regulation

Referring again to FIG. 17, controller 1514 is shown to include a frequency regulation controller 1716. Frequency regulation controller 1716 may be configured to determine an amount of power to charge or discharge from battery 1506 for frequency regulation (i.e., $u_{FR}$). Frequency regulation controller 1716 is shown receiving a grid frequency signal from energy grid 1512. The grid frequency signal may specify the current grid frequency $f_{grid}$ of energy grid 1512. In some embodiments, the grid frequency signal also includes a scheduled or desired grid frequency $f_s$ to be achieved by performing frequency regulation. Frequency regulation controller 1716 may determine the frequency regulation setpoint $u_{FR}$ based on the difference between the current grid frequency $f_{grid}$ and the scheduled frequency $f_s$.

In some embodiments, the range within which the grid frequency $f_{grid}$ is allowed to fluctuate is determined by an electric utility. Any frequencies falling outside the permissible range may be corrected by performing frequency regulation. Facilities participating in frequency regulation may be required to supply or consume a contracted power for purposes of regulating grid frequency $f_{grid}$ (e.g., up to 10% of the rated capacity of PV field 1502 per frequency regulation event).

In some embodiments, frequency regulation controller 1716 performs frequency regulation using a dead-band control technique with a gain that is dependent upon the difference $f_e$ between the scheduled grid frequency $f_s$ and the actual grid frequency $f_{grid}$ (i.e., $f_e=f_s-f_{grid}$) and an amount of power required for regulating a given deviation amount of frequency error $f_e$. Such a control technique is expressed mathematically by the following equation:

$$u_{FR}(k)=\min(\max(lb_{FR}, \alpha), ub_{FR})$$

where $lb_{FR}$ and $ub_{FR}$ are the contracted amounts of power up to which power is to be consumed or supplied by a facility. $lb_{FR}$ and $ub_{FR}$ may be based on the rated capacity $P_{cap}$ of PV field 1502 as shown in the following equations:

$$lb_{FR}=-0.1\times P_{cap}$$

$$ub_{FR}=0.1\times P_{cap}$$

The variable α represents the required amount of power to be supplied or consumed from energy grid 1512 to offset the frequency error $f_e$. In some embodiments, frequency regulation controller 1716 calculates α using the following equation:

$$\alpha=K_{FR}\times\text{sign}(f_e)\times\max(|f_e|-d_{band},0)$$

where $d_{band}$ is the threshold beyond which a deviation in grid frequency must be regulated and $K_{FR}$ is the control gain. In some embodiments, frequency regulation controller 1716 calculates the control gain $K_{FR}$ as follows:

$$K_{FR} = \frac{P_{cap}}{0.1\times droop\times f_s}$$

where droop is a parameter specifying a percentage that defines how much power must be supplied or consumed to offset a 1 Hz deviation in the grid frequency. Frequency regulation controller 1716 may calculate the frequency regulation setpoint $u_{FR}$ using these equations and may provide the frequency regulation setpoint to battery power setpoint generator 1718.

Generating Battery Power Setpoints

Still referring to FIG. 17, controller 1514 is shown to include a battery power setpoint generator 1718. Battery power setpoint generator 1718 may be configured to generate the battery power setpoint $u_{bat}$ for battery power inverter 1508. The battery power setpoint $u_{bat}$ is used by battery power inverter 1508 to control an amount of power drawn from battery 1506 or stored in battery 1506. For example, battery power inverter 1508 may draw power from battery 1506 in response to receiving a positive battery power setpoint $u_{bat}$ from battery power setpoint generator 1718 and may store power in battery 1506 in response to receiving a negative battery power setpoint $u_{bat}$ from battery power setpoint generator 1718.

Battery power setpoint generator 1718 is shown receiving the ramp rate power setpoint $u_{RR}$ from ramp rate controller 1714 and the frequency regulation power setpoint $u_{FR}$ from frequency regulation controller 1716. In some embodiments, battery power setpoint generator 1718 calculates a value for the battery power setpoint $u_{bat}$ by adding the ramp rate power setpoint $u_{RR}$ and the frequency response power setpoint $u_{FR}$. For example, battery power setpoint generator 1718 may calculate the battery power setpoint $u_{bat}$ using the following equation:

$$u_{bat}=u_{RR}+u_{FR}$$

In some embodiments, battery power setpoint generator 1718 adjusts the battery power setpoint $u_{bat}$ based on a battery power limit for battery 1506. For example, battery power setpoint generator 1718 may compare the battery power setpoint $u_{bat}$ with the battery power limit battPowerLimit. If the battery power setpoint is greater than the battery power limit (i.e., $u_{bat}$>battPowerLimit), battery power setpoint generator 1718 may replace the battery power setpoint $u_{bat}$ with the battery power limit. Similarly, if the battery power setpoint is less than the negative of the battery power limit (i.e., $u_{bat}$<−battPowerLimit), battery power setpoint generator 1718 may replace the battery power setpoint $u_{bat}$ with the negative of the battery power limit.

In some embodiments, battery power setpoint generator 1718 causes frequency regulation controller 1716 to update the frequency regulation setpoint $u_{FR}$ in response to replacing the battery power setpoint $u_{bat}$ with the battery power limit battPowerLimit or the negative of the battery power limit−battPowerLimit. For example, if the battery power setpoint $u_{bat}$ is replaced with the positive battery power limit battPowerLimit, frequency regulation controller 1716 may update the frequency regulation setpoint $u_{FR}$ using the following equation:

$$u_{FR}(k)=\text{battPowerLimit}-\hat{u}_{RR_T}(k)$$

Similarly, if the battery power setpoint $u_{bat}$ is replaced with the negative battery power limit−battPowerLimit, frequency regulation controller 1716 may update the frequency regulation setpoint $u_{FR}$ using the following equation:

$$u_{FR}(k)=-\text{battPowerLimit}-\hat{u}_{RR_T}(k)$$

These updates ensure that the amount of power used for ramp rate control $\hat{u}_{RR_T}(k)$ and the amount of power used for frequency regulation $u_{FR}$ (k) can be added together to calculate the battery power setpoint $u_{bat}$. Battery power setpoint generator 1718 may provide the battery power setpoint $u_{bat}$ to battery power inverter 1508 and to PV power setpoint generator 1720.

Generating PV Power Setpoints

Still referring to FIG. 17, controller 1514 is shown to include a PV power setpoint generator 1720. PV power setpoint generator 1720 may be configured to generate the PV power setpoint $u_{PV}$ for PV field power inverter 1504. The PV power setpoint $u_{PV}$ is used by PV field power inverter 1504 to control an amount of power from PV field 1502 to provide to POI 1510.

In some embodiments, PV power setpoint generator 1720 sets a default PV power setpoint $u_{PV}(k)$ for instant k based on the previous value of the PV power $P_{PV}(k-1)$ at instant k−1. For example, PV power setpoint generator 1720 may increment the previous PV power $P_{PV}(k-1)$ with the compliance limit as shown in the following equation:

$$u_{PV}(k) = P_{PV}(k-1) + \frac{0.1P_{cap}}{60/T} - \lambda\sigma$$

This guarantees compliance with the ramp rate compliance limit and gradual ramping of the PV power output to energy grid 1512. The default PV power setpoint may be useful to guarantee ramp rate compliance when the system is turned on, for example, in the middle of a sunny day or when an up-ramp in the PV power output $P_{PV}$ is to be handled by limiting the PV power at PV power inverter 1504 instead of charging battery 1506.

In some embodiments, PV power setpoint generator 1720 updates the PV power setpoint $u_{PV}(k)$ based on the value of the battery power setpoint $u_{bat}(k)$ so that the total power provided to POI 1510 does not exceed a POI power limit. For example, PV power setpoint generator 1720 may use the PV power setpoint $u_{PV}(k)$ and the battery power setpoint $u_{bat}(k)$ to calculate the total power $P_{POI}(k)$ at point of intersection 1510 using the following equation:

$$P_{POI}(k)=u_{bat}(k)+u_{PV}(k)$$

PV power setpoint generator 1720 may compare the calculated power $P_{POI}(k)$ with a power limit for POI 1510 (i.e., POIPowerLimit). If the calculated power $P_{POI}(k)$ exceeds the POI power limit (i.e., $P_{POI}(k)>\text{POIPowerLimit}$), PV power setpoint generator 1720 may replace the calculated power $P_{POI}(k)$ with the POI power limit. PV power setpoint generator 1720 may update the PV power setpoint $u_{PV}(k)$ using the following equation:

$$u_{PV}(k)=\text{POIPowerLimit}-u_{bat}(k)$$

This ensures that the total power provided to POI 1510 does not exceed the POI power limit by causing PV field power inverter 1504 to limit the PV power. PV power setpoint generator 1720 may provide the PV power setpoint $u_{PV}$ to PV field power inverter 1504.

Electrical Energy Storage System with Frequency Response Optimization

Figure 18:
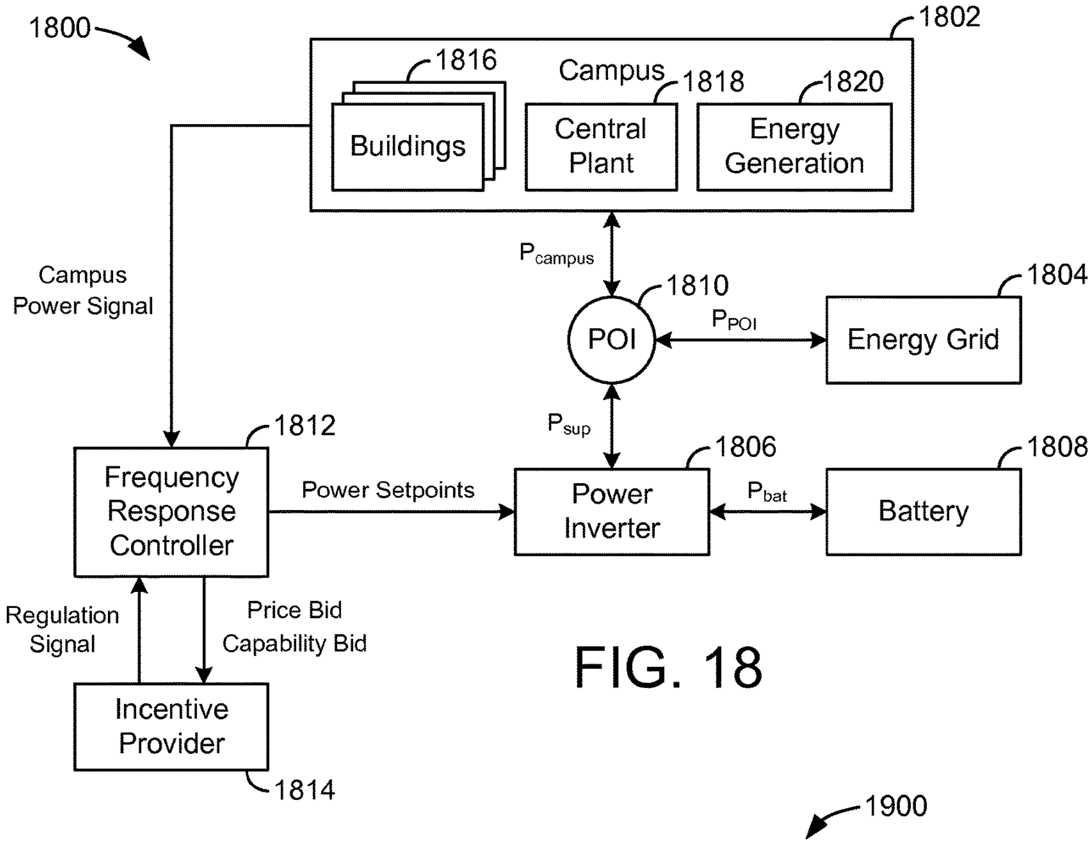
FIG. 18 is a block diagram of a frequency response optimization system, according to an exemplary embodiment.

Referring now to FIG. 18, a frequency response optimization system 1800 is shown, according to an exemplary embodiment. System 1800 is shown to include a campus 1802 and an energy grid 1804. Campus 1802 may include one or more buildings 1816 that receive power from energy grid 1804. Buildings 1816 may include equipment or devices that consume electricity during operation. For example, buildings 1816 may include HVAC equipment, lighting equipment, security equipment, communications equipment, vending machines, computers, electronics, elevators, or other types of building equipment. In some embodiments, buildings 1816 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 1816 is described in U.S. patent application Ser. No. 14/717,593.

In some embodiments, campus 1802 includes a central plant 1818. Central plant 1818 may include one or more subplants that consume resources from utilities (e.g., water, natural gas, electricity, etc.) to satisfy the loads of buildings 1816. For example, central plant 1818 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 1816. The subplants may be configured to convert input resources (e.g., electricity, water, natural gas, etc.) into output resources (e.g., cold water, hot water, chilled air, heated air, etc.) that are provided to buildings 1816. An exemplary central plant which may be used to satisfy the loads of buildings 1816 is described U.S. patent application Ser. No. 14/634,609, titled "High Level Central Plant Optimization" and filed Feb. 27, 2015, the entire disclosure of which is incorporated by reference herein.

In some embodiments, campus 1802 includes energy generation 1820. Energy generation 1820 may be configured to generate energy that can be used by buildings 1816, used by central plant 1818, and/or provided to energy grid 1804. In some embodiments, energy generation 1820 generates electricity. For example, energy generation 1820 may include an electric power plant, a photovoltaic energy field, or other types of systems or devices that generate electricity. The electricity generated by energy generation 1820 can be used internally by campus 1802 (e.g., by buildings 1816 and/or campus 1818) to decrease the amount of electric power that campus 1802 receives from outside sources such as energy grid 1804 or battery 1808. If the amount of electricity generated by energy generation 1820 exceeds the electric power demand of campus 1802, the excess electric power can be provided to energy grid 1804 or stored in battery 1808. The power output of campus 1802 is shown in FIG. 18 as $P_{campus}$. $P_{campus}$ may be positive if campus 1802 is outputting electric power or negative if campus 1802 is receiving electric power.

Still referring to FIG. 18, system 1800 is shown to include a power inverter 1806 and a battery 1808. Power inverter 1806 may be configured to convert electric power between direct current (DC) and alternating current (AC). For example, battery 1808 may be configured to store and output DC power, whereas energy grid 1804 and campus 1802 may be configured to consume and generate AC power. Power inverter 1806 may be used to convert DC power from battery 1808 into a sinusoidal AC output synchronized to the grid frequency of energy grid 1804. Power inverter 1806 may also be used to convert AC power from campus 1802 or energy grid 1804 into DC power that can be stored in battery 1808. The power output of battery 1808 is shown as $P_{bat}$. $P_{bat}$ may be positive if battery 1808 is providing power to power inverter 1806 or negative if battery 1808 is receiving power from power inverter 1806.

In some instances, power inverter 1806 receives a DC power output from battery 1808 and converts the DC power output to an AC power output that can be fed into energy grid 1804. Power inverter 1806 may synchronize the frequency of the AC power output with that of energy grid 1804 (e.g., 50 Hz or 60 Hz) using a local oscillator and may limit the voltage of the AC power output to no higher than the grid voltage. In some embodiments, power inverter 1806 is a resonant inverter that includes or uses LC circuits to remove the harmonics from a simple square wave in order to achieve a sine wave matching the frequency of energy grid 1804. In various embodiments, power inverter 1806 may operate using high-frequency transformers, low-frequency transformers, or without transformers. Low-frequency transformers may convert the DC output from battery 1808 directly to the AC output provided to energy grid 1804. High-frequency transformers may employ a multi-step process that involves converting the DC output to high-frequency AC, then back to DC, and then finally to the AC output provided to energy grid 1804.

System 1800 is shown to include a point of interconnection (POI) 1810. POI 1810 is the point at which campus 1802, energy grid 1804, and power inverter 1806 are electrically connected. The power supplied to POI 1810 from power inverter 1806 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 1806 and/or battery 1808). $P_{sup}$ may be positive is power inverter 1806 is providing power to POI 1810 or negative if power inverter 1806 is receiving power from POI 1810. $P_{campus}$ and $P_{sup}$ combine at POI 1810 to form $P_{POI}$. $P_{POI}$ may be defined as the power provided to energy grid 1804 from POI 1810. $P_{POI}$ may be positive if POI 1810 is providing power to energy grid 1804 or negative if POI 1810 is receiving power from energy grid 1804.

Still referring to FIG. 18, system 1800 is shown to include a frequency response controller 1812. Controller 1812 may be configured to generate and provide power setpoints to power inverter 1806. Power inverter 1806 may use the power setpoints to control the amount of power $P_{sup}$ provided to POI 1810 or drawn from POI 1810. For example, power inverter 1806 may be configured to draw power from POI 1810 and store the power in battery 1808 in response to receiving a negative power setpoint from controller 1812. Conversely, power inverter 1806 may be configured to draw power from battery 1808 and provide the power to POI 1810 in response to receiving a positive power setpoint from controller 1812. The magnitude of the power setpoint may define the amount of power $P_{sup}$ provided to or from power inverter 1806. Controller 1812 may be configured to generate and provide power setpoints that optimize the value of operating system 1800 over a time horizon.

In some embodiments, frequency response controller 1812 uses power inverter 1806 and battery 1808 to perform frequency regulation for energy grid 1804. Frequency regulation is the process of maintaining the stability of the grid frequency (e.g., 60 Hz in the United States). The grid frequency may remain stable and balanced as long as the total electric supply and demand of energy grid 1804 are balanced. Any deviation from that balance may result in a deviation of the grid frequency from its desirable value. For example, an increase in demand may cause the grid frequency to decrease, whereas an increase in supply may cause the grid frequency to increase. Frequency response controller 1812 may be configured to offset a fluctuation in the grid frequency by causing power inverter 1806 to supply energy from battery 1808 to energy grid 1804 (e.g., to offset a decrease in grid frequency) or store energy from energy grid 1804 in battery 1808 (e.g., to offset an increase in grid frequency).

In some embodiments, frequency response controller 1812 uses power inverter 1806 and battery 1808 to perform load shifting for campus 1802. For example, controller 1812 may cause power inverter 1806 to store energy in battery 1808 when energy prices are low and retrieve energy from battery 1808 when energy prices are high in order to reduce the cost of electricity required to power campus 1802. Load shifting may also allow system 1800 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 1800 to smooth momentary spikes in the electric demand of campus 1802 by drawing energy from battery 1808 in order to reduce peak power draw from energy grid 1804, thereby decreasing the demand charge incurred.

Still referring to FIG. 18, system 1800 is shown to include an incentive provider 1814. Incentive provider 1814 may be a utility (e.g., an electric utility), a regional transmission organization (RTO), an independent system operator (ISO), or any other entity that provides incentives for performing frequency regulation. For example, incentive provider 1814 may provide system 1800 with monetary incentives for participating in a frequency response program. In order to participate in the frequency response program, system 1800 may maintain a reserve capacity of stored energy (e.g., in battery 1808) that can be provided to energy grid 1804. System 1800 may also maintain the capacity to draw energy from energy grid 1804 and store the energy in battery 1808. Reserving both of these capacities may be accomplished by managing the state-of-charge of battery 1808.

Frequency response controller 1812 may provide incentive provider 1814 with a price bid and a capability bid. The price bid may include a price per unit power (e.g., $/MW) for reserving or storing power that allows system 1800 to participate in a frequency response program offered by incentive provider 1814. The price per unit power bid by frequency response controller 1812 is referred to herein as the "capability price." The price bid may also include a price for actual performance, referred to herein as the "performance price." The capability bid may define an amount of power (e.g., MW) that system 1800 will reserve or store in battery 1808 to perform frequency response, referred to herein as the "capability bid."

Incentive provider 1814 may provide frequency response controller 1812 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 1812. In other embodiments, $CP_{cap}$, $CP_{perf}$, and $Reg_{award}$ may not be the same as the bids placed by controller 1812. For example, $CP_{cap}$, $CP_{perf}$, and $Reg_{award}$ may be generated by incentive provider 1814 based on bids received from multiple participants in the frequency response program. Controller 1812 may use $CP_{cap}$, $CP_{perf}$, and $Reg_{award}$ to perform frequency regulation.

Frequency response controller 1812 is shown receiving a regulation signal from incentive provider 1814. The regulation signal may specify a portion of the regulation award $Reg_{award}$ that frequency response controller 1812 is to add or remove from energy grid 1804. In some embodiments, the regulation signal is a normalized signal (e.g., between −1 and 1) specifying a proportion of $Reg_{award}$. Positive values of the regulation signal may indicate an amount of power to add to energy grid 1804, whereas negative values of the regulation signal may indicate an amount of power to remove from energy grid 1804.

Frequency response controller 1812 may respond to the regulation signal by generating an optimal power setpoint for power inverter 1806. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 1812 uses a battery life model to quantify and monetize battery degradation as a function of the power setpoints provided to power inverter 1806. Advantageously, the battery life model allows controller 1812 to perform an optimization that weighs the revenue generation potential of participating in the frequency response program against the cost of battery degradation and other costs of participation (e.g., less battery power available for campus 1802, increased electricity costs, etc.). An exemplary regulation signal and power response are described in greater detail with reference to FIG. 19.

Figure 19:
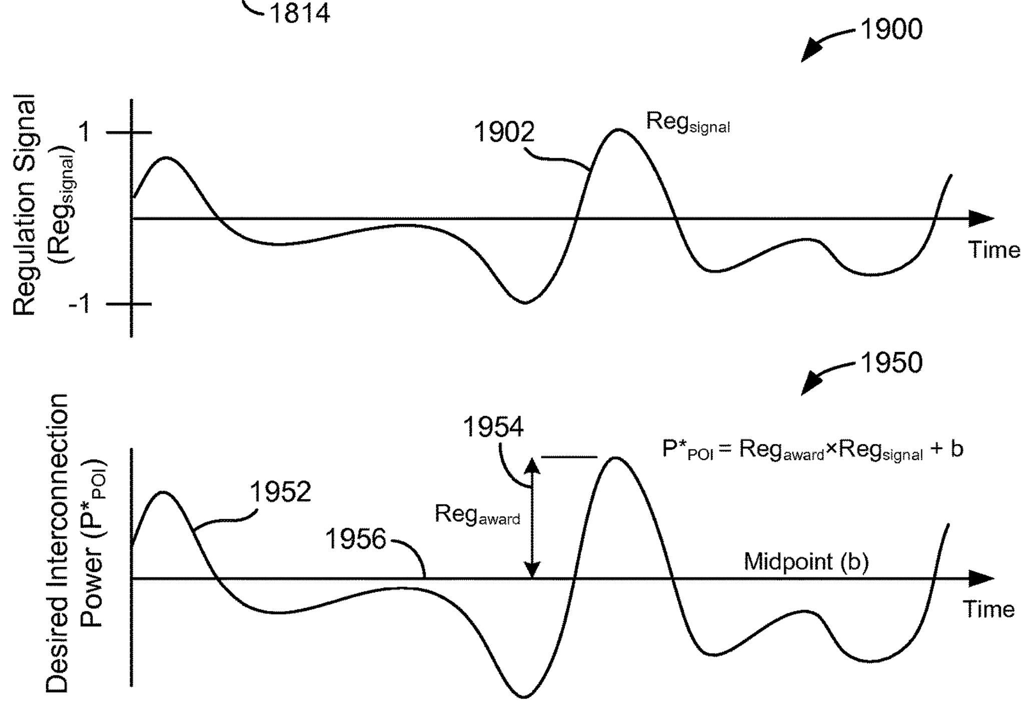
FIG. 19 is a graph of a regulation signal which may be provided to the frequency response optimization system of FIG. 18 and a frequency response signal which may be generated by frequency response optimization system of FIG. 18, according to an exemplary embodiment.

Referring now to FIG. 19, a pair of frequency response graphs 1900 and 1950 are shown, according to an exemplary embodiment. Graph 1900 illustrates a regulation signal $Reg_{signal}$ 1902 as a function of time. $Reg_{signal}$ 1902 is shown as a normalized signal ranging from −1 to 1 (i.e., $-1 \leq Reg_{signal} \leq 1$). $Reg_{signal}$ 1902 may be generated by incentive provider 1814 and provided to frequency response controller 1812. $Reg_{signal}$ 1902 may define a proportion of the regulation award $Reg_{award}$ 1954 that controller 1812 is to add or remove from energy grid 1804, relative to a baseline value referred to as the midpoint b 1956. For example, if the value of $Reg_{award}$ 1954 is 10 MW, a regulation signal value of 0.5 (i.e., $Reg_{signal}=0.5$) may indicate that system 1800 is requested to add 5 MW of power at POI 1810 relative to midpoint b (e.g., $P^*_{POI}=10\text{ MW}\times 0.5+b$), whereas a regulation signal value of −0.3 may indicate that system 1800 is requested to remove 3 MW of power from POI 1810 relative to midpoint b (e.g., $P^*_{POI}=10\text{ MW}\times -0.3+b$).

Graph 1950 illustrates the desired interconnection power $P^*_{POI}$ 1952 as a function of time. $P^*_{POI}$ 1952 may be calculated by frequency response controller 1812 based on $Reg_{signal}$ 1902, $Reg_{award}$ 1954, and a midpoint b 1956. For example, controller 1812 may calculate $P^*_{POI}$ 1952 using the following equation:

$$P^*_{POI}=Reg_{award}\times Reg_{signal}+b$$

where $P^*_{POI}$ represents the desired power at POI 1810 (e.g., $P^*_{POI}=P_{sup}+P_{campus}$) and b is the midpoint. Midpoint b may be defined (e.g., set or optimized) by controller 1812 and may represent the midpoint of regulation around which the load is modified in response to $Reg_{signal}$ 1902. Optimal adjustment of midpoint b may allow controller 1812 to actively participate in the frequency response market while also taking into account the energy and demand charge that will be incurred.

In order to participate in the frequency response market, controller 1812 may perform several tasks. Controller 1812 may generate a price bid (e.g., $/MW) that includes the capability price and the performance price. In some embodiments, controller 1812 sends the price bid to incentive provider 1814 at approximately 15:30 each day and the price bid remains in effect for the entirety of the next day. Prior to beginning a frequency response period, controller 1812 may generate the capability bid (e.g., MW) and send the capability bid to incentive provider 1814. In some embodiments, controller 1812 generates and sends the capability bid to incentive provider 1814 approximately 1.5 hours before a frequency response period begins. In an exemplary embodiment, each frequency response period has a duration of one hour; however, it is contemplated that frequency response periods may have any duration.

At the start of each frequency response period, controller 1812 may generate the midpoint b around which controller 1812 plans to perform frequency regulation. In some embodiments, controller 1812 generates a midpoint b that will maintain battery 1808 at a constant state-of-charge (SOC) (i.e. a midpoint that will result in battery 1808 having the same SOC at the beginning and end of the frequency response period). In other embodiments, controller 1812 generates midpoint b using an optimization procedure that allows the SOC of battery 1808 to have different values at the beginning and end of the frequency response period. For example, controller 1812 may use the SOC of battery 1808 as a constrained variable that depends on midpoint b in order to optimize a value function that takes into account frequency response revenue, energy costs, and the cost of battery degradation. Exemplary processes for calculating and/or optimizing midpoint b under both the constant SOC scenario and the variable SOC scenario are described in detail in U.S. Provisional Patent Application No. 62/239,233 filed Oct. 8, 2015, the entire disclosure of which is incorporated by reference herein.

During each frequency response period, controller 1812 may periodically generate a power setpoint for power inverter 1806. For example, controller 1812 may generate a power setpoint for each time step in the frequency response period. In some embodiments, controller 1812 generates the power setpoints using the equation:

$$P^*_{POI}=Reg_{award}\times Reg_{signal}+b$$

where $P^*_{POI}=P_{sup}+P_{campus}$. Positive values of $P^*_{POI}$ indicate energy flow from POI 1810 to energy grid 1804. Positive values of $P_{sup}$ and $P_{campus}$ indicate energy flow to POI 1810 from power inverter 1806 and campus 1802, respectively. In other embodiments, controller 1812 generates the power setpoints using the equation:

$$P^*_{POI}=Reg_{award}\times Res_{FR}+b$$

where $Res_{FR}$ is an optimal frequency response generated by optimizing a value function. Controller 1812 may subtract $P_{campus}$ from $P^*_{POI}$ to generate the power setpoint for power inverter 1806 (i.e., $P_{sup}=P^*_{POI}-P_{campus}$). The power setpoint for power inverter 1806 indicates the amount of power that power inverter 1806 is to add to POI 1810 (if the power setpoint is positive) or remove from POI 1810 (if the power setpoint is negative). Exemplary processes for calculating power inverter setpoints are described in detail in U.S. Provisional Patent Application No. 62/239,233.

Frequency Response Controller

Figure 20:
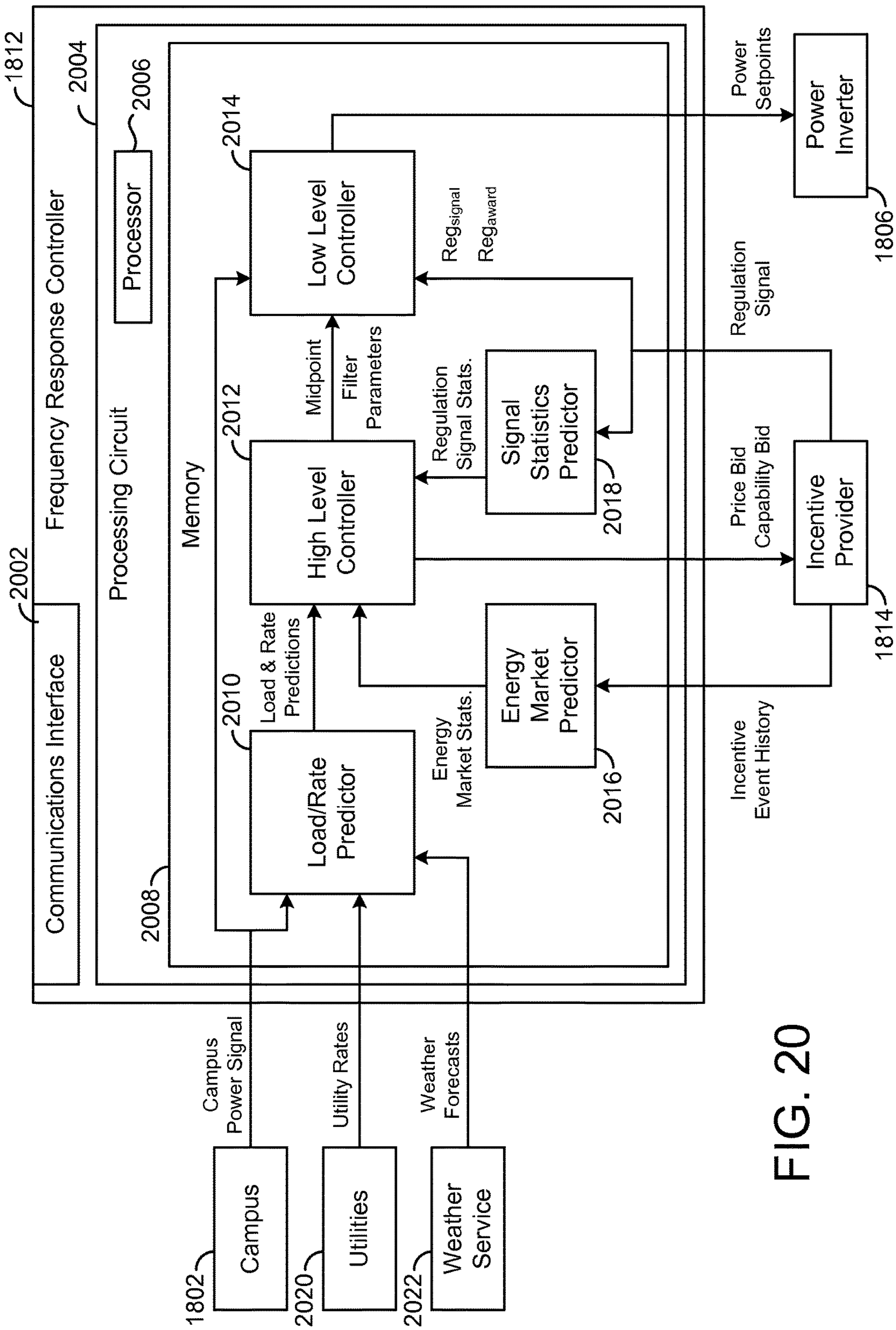
FIG. 20 is a block diagram of a frequency response controller which can be used to monitor and control the frequency response optimization system of FIG. 18, according to an exemplary embodiment.

Referring now to FIG. 20, a block diagram illustrating frequency response controller 1812 in greater detail is shown, according to an exemplary embodiment. Frequency response controller 1812 may be configured to perform an optimization process to generate values for the bid price, the capability bid, and the midpoint b. In some embodiments, frequency response controller 1812 generates values for the bids and the midpoint b periodically using a predictive optimization scheme (e.g., once every half hour, once per frequency response period, etc.). Controller 1812 may also calculate and update power setpoints for power inverter 1806 periodically during each frequency response period (e.g., once every two seconds).

In some embodiments, the interval at which controller 1812 generates power setpoints for power inverter 1806 is significantly shorter than the interval at which controller 1812 generates the bids and the midpoint b. For example, controller 1812 may generate values for the bids and the midpoint b every half hour, whereas controller 1812 may generate a power setpoint for power inverter 1806 every two seconds. The difference in these time scales allows controller 1812 to use a cascaded optimization process to generate optimal bids, midpoints b, and power setpoints.

In the cascaded optimization process, a high level controller 2012 determines optimal values for the bid price, the capability bid, and the midpoint b by performing a high level optimization. High level controller 2012 may select midpoint b to maintain a constant state-of-charge in battery 1808 (i.e., the same state-of-charge at the beginning and end of each frequency response period) or to vary the state-of-charge in order to optimize the overall value of operating system 1800 (e.g., frequency response revenue minus energy costs and battery degradation costs). High level controller 2012 may also determine filter parameters for a signal filter (e.g., a low pass filter) used by a low level controller 2014.

Low level controller 2014 uses the midpoint b and the filter parameters from high level controller 2012 to perform a low level optimization in order to generate the power setpoints for power inverter 1806. Advantageously, low level controller 2014 may determine how closely to track the desired power $P^*_{POI}$ at the point of interconnection 1810. For example, the low level optimization performed by low level controller 2014 may consider not only frequency response revenue but also the costs of the power setpoints in terms of energy costs and battery degradation. In some instances, low level controller 2014 may determine that it is deleterious to battery 1808 to follow the regulation exactly and may sacrifice a portion of the frequency response revenue in order to preserve the life of battery 1808. The cascaded optimization process is described in greater detail below.

Still referring to FIG. 20, frequency response controller 1812 is shown to include a communications interface 2002 and a processing circuit 2004. Communications interface 2002 may include wired or wireless interfaces (e.g., jacks, antennas, transmitters, receivers, transceivers, wire terminals, etc.) for conducting data communications with various systems, devices, or networks. For example, communications interface 2002 may include an Ethernet card and port for sending and receiving data via an Ethernet-based communications network and/or a WiFi transceiver for communicating via a wireless communications network. Communications interface 2002 may be configured to communicate via local area networks or wide area networks (e.g., the Internet, a building WAN, etc.) and may use a variety of communications protocols (e.g., BACnet, IP, LON, etc.).

Communications interface 2002 may be a network interface configured to facilitate electronic data communications between frequency response controller 1812 and various external systems or devices (e.g., campus 1802, energy grid 1804, power inverter 1806, incentive provider 1814, utilities 2020, weather service 2022, etc.). For example, frequency response controller 1812 may receive inputs from incentive provider 1814 indicating an incentive event history (e.g., past clearing prices, mileage ratios, participation requirements, etc.) and a regulation signal. Controller 1812 may receive a campus power signal from campus 1802, utility rates from utilities 2020, and weather forecasts from weather service 2022 via communications interface 2002. Controller 1812 may provide a price bid and a capability bid to incentive provider 1814 and may provide power setpoints to power inverter 1806 via communications interface 2002.

Still referring to FIG. 20, processing circuit 2004 is shown to include a processor 2006 and memory 2008. Processor 2006 may be a general purpose or specific purpose processor, an application specific integrated circuit (ASIC), one or more field programmable gate arrays (FPGAs), a group of processing components, or other suitable processing components. Processor 2006 may be configured to execute computer code or instructions stored in memory 2008 or received from other computer readable media (e.g., CDROM, network storage, a remote server, etc.).

Memory 2008 may include one or more devices (e.g., memory units, memory devices, storage devices, etc.) for storing data and/or computer code for completing and/or facilitating the various processes described in the present disclosure. Memory 2008 may include random access memory (RAM), read-only memory (ROM), hard drive storage, temporary storage, non-volatile memory, flash memory, optical memory, or any other suitable memory for storing software objects and/or computer instructions. Memory 2008 may include database components, object code components, script components, or any other type of information structure for supporting the various activities and information structures described in the present disclosure. Memory 2008 may be communicably connected to processor 2006 via processing circuit 2004 and may include computer code for executing (e.g., by processor 2006) one or more processes described herein.

Still referring to FIG. 20, frequency response controller 1812 is shown to include a load/rate predictor 2010. Load/rate predictor 2010 may be configured to predict the electric load of campus 1802 (i.e., $\hat{P}_{campus}$) for each time step k (e.g., k=1 . . . n) within an optimization window. Load/rate predictor 2010 is shown receiving weather forecasts from a weather service 2022. In some embodiments, load/rate predictor 2010 predicts $\hat{P}_{campus}$ as a function of the weather forecasts. In some embodiments, load/rate predictor 2010 uses feedback from campus 1802 to predict $\hat{P}_{campus}$. Feedback from campus 1802 may include various types of sensory inputs (e.g., temperature, flow, humidity, enthalpy, etc.) or other data relating to buildings 1816, central plant 1818, and/or energy generation 1820 (e.g., inputs from a HVAC system, a lighting control system, a security system, a water system, a PV energy system, etc.). Load/rate predictor 2010 may predict one or more different types of loads for campus 1802. For example, load/rate predictor 2010 may predict a hot water load, a cold water load, and/or an electric load for each time step k within the optimization window.

In some embodiments, load/rate predictor 2010 receives a measured electric load and/or previous measured load data from campus 1802. For example, load/rate predictor 2010 is shown receiving a campus power signal from campus 1802. The campus power signal may indicate the measured electric load of campus 1802. Load/rate predictor 2010 may predict one or more statistics of the campus power signal including, for example, a mean campus power $\mu_{campus}$ and a standard deviation of the campus power $\sigma_{campus}$. Load/rate predictor 2010 may predict $\hat{P}_{campus}$ as a function of a given weather forecast ($\hat{\phi}_w$), a day type (day), the time of day (t), and previous measured load data ($Y_{k-1}$). Such a relationship is expressed in the following equation:

$$\hat{P}_{campus}=f(\hat{\phi}_w,\ \text{day},\ t|Y_{k-1})$$

In some embodiments, load/rate predictor 2010 uses a deterministic plus stochastic model trained from historical load data to predict $\hat{P}_{campus}$. Load/rate predictor 2010 may use any of a variety of prediction methods to predict $\hat{P}_{campus}$ (e.g., linear regression for the deterministic portion and an AR model for the stochastic portion). In some embodiments, load/rate predictor 2010 makes load/rate predictions using the techniques described in U.S. patent application Ser. No. 14/717,593.

Load/rate predictor 2010 is shown receiving utility rates from utilities 2020. Utility rates may indicate a cost or price per unit of a resource (e.g., electricity, natural gas, water, etc.) provided by utilities 2020 at each time step k in the optimization window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period.

Utility rates may be actual rates received from utilities 2020 or predicted utility rates estimated by load/rate predictor 2010.

In some embodiments, the utility rates include demand charges for one or more resources provided by utilities 2020. A demand charge may define a separate cost imposed by utilities 2020 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, frequency response controller 1812 may be configured to account for demand charges in the high level optimization process performed by high level controller 2012. Utilities 2020 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 2010 may store the predicted campus power $\hat{P}_{campus}$ and the utility rates in memory 2008 and/or provide the predicted campus power $\hat{P}_{campus}$ campus and the utility rates to high level controller 2012.

Still referring to FIG. 20, frequency response controller 1812 is shown to include an energy market predictor 2016 and a signal statistics predictor 2018. Energy market predictor 2016 may be configured to predict energy market statistics relating to the frequency response program. For example, energy market predictor 2016 may predict the values of one or more variables that can be used to estimate frequency response revenue. In some embodiments, the frequency response revenue is defined by the following equation:

$$\text{Rev}=PS(CP_{cap}+MR\cdot CP_{perf})\text{Reg}_{award}$$

where Rev is the frequency response revenue, $CP_{cap}$ is the capability clearing price, MR is the mileage ratio, and $CP_{perf}$ is the performance clearing price. PS is a performance score based on how closely the frequency response provided by controller 1812 tracks the regulation signal. Energy market predictor 2016 may be configured to predict the capability clearing price $CP_{cap}$, the performance clearing price $CP_{perf}$, the mileage ratio MR, and/or other energy market statistics that can be used to estimate frequency response revenue. Energy market predictor 2016 may store the energy market statistics in memory 2008 and/or provide the energy market statistics to high level controller 2012.

Signal statistics predictor 2018 may be configured to predict one or more statistics of the regulation signal provided by incentive provider 1814. For example, signal statistics predictor 2018 may be configured to predict the mean $\mu_{FR}$, standard deviation $\sigma_{FR}$, and/or other statistics of the regulation signal. The regulation signal statistics may be based on previous values of the regulation signal (e.g., a historical mean, a historical standard deviation, etc.) or predicted values of the regulation signal (e.g., a predicted mean, a predicted standard deviation, etc.).

In some embodiments, signal statistics predictor 2018 uses a deterministic plus stochastic model trained from historical regulation signal data to predict future values of the regulation signal. For example, signal statistics predictor 2018 may use linear regression to predict a deterministic portion of the regulation signal and an AR model to predict a stochastic portion of the regulation signal. In some embodiments, signal statistics predictor 2018 predicts the regulation signal using the techniques described in U.S. patent application Ser. No. 14/717,593. Signal statistics predictor 2018 may use the predicted values of the regulation signal to calculate the regulation signal statistics. Signal statistics predictor 2018 may store the regulation signal statistics in memory 2008 and/or provide the regulation signal statistics to high level controller 2012.

Still referring to FIG. 20, frequency response controller 1812 is shown to include a high level controller 2012. High level controller 2012 may be configured to generate values for the midpoint b and the capability bid $\text{Reg}_{award}$. In some embodiments, high level controller 2012 determines a midpoint b that will cause battery 1808 to have the same state-of-charge (SOC) at the beginning and end of each frequency response period. In other embodiments, high level controller 2012 performs an optimization process to generate midpoint b and $\text{Reg}_{award}$. For example, high level controller 2012 may generate midpoint b using an optimization procedure that allows the SOC of battery 1808 to vary and/or have different values at the beginning and end of the frequency response period. High level controller 2012 may use the SOC of battery 1808 as a constrained variable that depends on midpoint b in order to optimize a value function that takes into account frequency response revenue, energy costs, and the cost of battery degradation. Both of these embodiments are described in greater detail with reference to FIG. 21.

High level controller 2012 may determine midpoint b by equating the desired power $P^*_{POI}$ at POI 1810 with the actual power at POI 1810 as shown in the following equation:

$$(\text{Reg}_{signal})(\text{Reg}_{award})+b=P_{bat}+P_{loss}+P_{campus}$$

where the left side of the equation $(\text{Reg}_{signal})(\text{Reg}_{award})+b$ is the desired power $P^*_{POI}$ at POI 1810 and the right side of the equation is the actual power at POI 1810. Integrating over the frequency response period results in the following equation:

$$\int_{period}((Reg_{signal})(Reg_{award})+b)\,dt=\int_{period}(P_{bat}+P_{loss}+P_{campus})\,dt$$

For embodiments in which the SOC of battery 1808 is maintained at the same value at the beginning and end of the frequency response period, the integral of the battery power $P_{bat}$ over the frequency response period is zero (i.e., $\int P_{bat}dt=0$). Accordingly, the previous equation can be rewritten as follows:

$$b=\int_{period}P_{loss}\,dt+\int_{period}P_{campus}\,dt-Reg_{award}\int_{period}Reg_{signal}\,dt$$

where the term $\int P_{bat}\,dt$ has been omitted because $\int P_{bat}\,dt=0$. This is ideal behavior if the only goal is to maximize frequency response revenue. Keeping the SOC of battery 1808 at a constant value (and near 50%) will allow system 1800 to participate in the frequency market during all hours of the day.

High level controller 2012 may use the estimated values of the campus power signal received from campus 1802 to predict the value of $\int P_{campus}\,dt$ over the frequency response period. Similarly, high level controller 2012 may use the estimated values of the regulation signal from incentive provider 1814 to predict the value of $\int Reg_{signal}\,dt$ over the frequency response period. High level controller 2012 may estimate the value of $\int P_{loss}\,dt$ using a Thevinin equivalent circuit model of battery 1808 (described in greater detail with reference to FIG. 21). This allows high level controller 2012 to estimate the integral $\int P_{loss}\,dt$ as a function of other variables such as $Reg_{award}$, $Reg_{signal}$, $P_{campus}$, and midpoint b.

After substituting known and estimated values, the preceding equation can be rewritten as follows:

$$\frac{1}{4P_{max}}[E\{P_{campus}^2\}+Reg_{award}^2E\{Reg_{signal}^2\}-2Reg_{award}E\{Reg_{signal}\}E\{P_{campus}\}]\Delta t+[Reg_{award}E\{Reg_{signal}\}-E\{P_{campus}\}]\Delta t+\frac{b}{2P_{max}}[Reg_{award}E\{Reg_{signal}\}-E\{P_{campus}\}]\Delta t+b\Delta t+\frac{b^2}{4P_{max}}\Delta t=0$$

where the notation E{ } indicates that the variable within the brackets { } is ergodic and can be approximated by the estimated mean of the variable. For example, the term $E\{Reg_{signal}\}$ can be approximated by the estimated mean of the regulation signal $\mu_{FR}$ and the term $E\{P_{campus}\}$ can be approximated by the estimated mean of the campus power signal $\mu_{campus}$. High level controller 2012 may solve the equation for midpoint b to determine the midpoint b that maintains battery 1808 at a constant state-of-charge.

For embodiments in which the SOC of battery 1808 is treated as a variable, the SOC of battery 1808 may be allowed to have different values at the beginning and end of the frequency response period. Accordingly, the integral of the battery power $P_{bat}$ over the frequency response period can be expressed as $-\Delta SOC \cdot C_{des}$ as shown in the following equation:

$$\int_{period} P_{bat}\,dt = -\Delta SOC \cdot C_{des}$$

where ΔSOC is the change in the SOC of battery 1808 over the frequency response period and $C_{des}$ is the design capacity of battery 1808. The SOC of battery 1808 may be a normalized variable (i.e., $0 \le SOC \le 1$) such that the term $SOC \cdot C_{des}$ represents the amount of energy stored in battery 1808 for a given state-of-charge. The SOC is shown as a negative value because drawing energy from battery 1808 (i.e., a positive $P_{bat}$) decreases the SOC of battery 1808. The equation for midpoint b becomes:

$$b=\int_{period} P_{loss}dt+\int_{period} P_{campus}dt+\int_{period} P_{bat}dt-Reg_{award}\int_{period} Reg_{signal}dt$$

After substituting known and estimated values, the preceding equation can be rewritten as follows:

$$\frac{1}{4P_{max}}[E\{P_{campus}^2\}+Reg_{award}^2 E(Reg_{signal}^2\}-2Reg_{award}E\{Reg_{signal}\}E\{P_{campus}\}]\Delta t+$$

-continued $$[Reg_{award}E\{Reg_{signal}\}+E\{P_{campus}\}]\Delta t+\Delta SOC\cdot C_{des}+\frac{b}{4P_{max}}[Reg_{award}E\{Reg_{signal}\}-E\{P_{campus}\}]\Delta t+b\Delta t+\frac{b^2}{4P_{max}}\Delta t=0$$

High level controller 2012 may solve the equation for midpoint b in terms of ΔSOC.

High level controller 2012 may perform an optimization to find optimal midpoints b for each frequency response period within an optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J=\sum_{k=1}^{h}Rev(Reg_{award,k})+\sum_{k=1}^{h}c_kb_k+\min_{period}(P_{campus,k}+b_k)-\sum_{k=1}^{h}\lambda_{bat,k}$$

where $Rev(Reg_{award,k})$ is the frequency response revenue at time step k, $c_kb_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. The electricity cost is expressed as a positive value because drawing power from energy grid 1804 is represented as a negative power and therefore will result in negative value (i.e., a cost) in the objective function. The demand charge is expressed as a minimum for the same reason (i.e., the most negative power value represents maximum power draw from energy grid 1804).

High level controller 2012 may estimate the frequency response revenue $Rev(Reg_{award,k})$ as a function of the midpoints b. In some embodiments, high level controller 2012 estimates frequency response revenue using the following equation:

$$Rev(Reg_{award})=Reg_{award}(CP_{cap}+MR\cdot CP_{perf})$$

where $CP_{cap}$, MR, and $CP_{perf}$ are the energy market statistics received from energy market predictor 2016 and $Reg_{award}$ is a function of the midpoint b. For example, high level controller 2012 may place a bid that is as large as possible for a given midpoint, as shown in the following equation:

$$Reg_{award}=P_{limit}-|b|$$

where $P_{limit}$ is the power rating of power inverter 1806. Advantageously, selecting $Reg_{award}$ as a function of midpoint b allows high level controller 2012 to predict the frequency response revenue that will result from a given midpoint b.

High level controller 2012 may estimate the cost of battery degradation $\lambda_{bat}$ as a function of the midpoints b. For example, high level controller 2012 may use a battery life model to predict a loss in battery capacity that will result from a set of midpoints b, power outputs, and/or other variables that can be manipulated by controller 1812. In some embodiments, the battery life model expresses the loss in battery capacity $C_{loss,add}$ as a sum of multiple piecewise linear functions, as shown in the following equation:

$$C_{loss,add}=f_1(T_{cell})+f_2(SOC)+f_3(DOD)+f_4(PR)+f_5(ER)-C_{loss,nom}$$

where $T_{cell}$ is the cell temperature, SOC is the state-of-charge, DOD is the depth of discharge, PR is the average power ratio $$\left(\text{e.g., } PR = avg\left(\frac{P}{P_{des}}\right)\right),$$

and ER is the average effort ratio $$\left(\text{e.g., } ER = avg\left(\frac{\Delta P}{P_{des}}\right)\right)$$

of battery 1808. Each of these terms is described in greater detail with reference to FIG. 21. Advantageously, several of the terms in the battery life model depend on the midpoints b and power setpoints selected by controller 1812. This allows high level controller 2012 to predict a loss in battery capacity that will result from a given set of control outputs. High level controller 2012 may monetize the loss in battery capacity and include the monetized cost of battery degradation $\lambda_{bat}$ in the objective function J.

In some embodiments, high level controller 2012 generates a set of filter parameters for low level controller 2014. The filter parameters may be used by low level controller 2014 as part of a low-pass filter that removes high frequency components from the regulation signal. In some embodiments, high level controller 2012 generates a set of filter parameters that transform the regulation signal into an optimal frequency response signal $Res_{FR}$. For example, high level controller 2012 may perform a second optimization process to determine an optimal frequency response $Res_{FR}$ based on the optimized values for $Reg_{award}$ and midpoint b.

In some embodiments, high level controller 2012 determines the optimal frequency response $Res_{FR}$ by optimizing value function J with the frequency response revenue Rev ($Reg_{award}$) defined as follows:

$$\text{Rev}(\text{Reg}_{award}) = PS \cdot Reg_{award}(\text{CP}_{cap} + MR \cdot CP_{perf})$$

and with the frequency response $Res_{FR}$ substituted for the regulation signal in the battery life model. The performance score PS may be based on several factors that indicate how well the optimal frequency response $Res_{FR}$ tracks the regulation signal. Closely tracking the regulation signal may result in higher performance scores, thereby increasing the frequency response revenue. However, closely tracking the regulation signal may also increase the cost of battery degradation $\lambda_{bat}$. The optimized frequency response $Res_{FR}$ represents an optimal tradeoff between decreased frequency response revenue and increased battery life. High level controller 2012 may use the optimized frequency response $Res_{FR}$ to generate a set of filter parameters for low level controller 2014. These and other features of high level controller 2012 are described in greater detail with reference to FIG. 21.

Still referring to FIG. 20, frequency response controller 1812 is shown to include a low level controller 2014. Low level controller 2014 is shown receiving the midpoints b and the filter parameters from high level controller 2012. Low level controller 2014 may also receive the campus power signal from campus 1802 and the regulation signal from incentive provider 1814. Low level controller 2014 may use the regulation signal to predict future values of the regulation signal and may filter the predicted regulation signal using the filter parameters provided by high level controller 2012.

Low level controller 2014 may use the filtered regulation signal to determine optimal power setpoints for power inverter 1806. For example, low level controller 2014 may use the filtered regulation signal to calculate the desired interconnection power $P^*_{POI}$ using the following equation:

$$P^*_{POI} = \text{REG}_{award} \cdot \text{Reg}_{filter} + b$$

where $\text{Reg}_{filter}$ is the filtered regulation signal. Low level controller 2014 may subtract the campus power $P_{campus}$ from the desired interconnection power $P^*_{POI}$ to calculate the optimal power setpoints $P_{SP}$ for power inverter 1806, as shown in the following equation:

$$P_{SP} = P^*_{POI} - P_{campus}$$

In some embodiments, low level controller 2014 performs an optimization to determine how closely to track $P^*_{POI}$. For example, low level controller 2014 may determine an optimal frequency response $Res_{FR}$ by optimizing value function J with the frequency response revenue $\text{Rev}(\text{Reg}_{award})$ defined as follows:

$$\text{Rev}(\text{Reg}_{award}) = PS \cdot \text{Reg}_{award}(CP_{cap} + MR \cdot CP_{perf})$$

and with the frequency response $Res_{FR}$ substituted for the regulation signal in the battery life model. Low level controller 2014 may use the optimal frequency response $Res_{FR}$ in place of the filtered frequency response $\text{Reg}_{filter}$ to calculate the desired interconnection power $P^*_{POI}$ and power setpoints $P_{SP}$ as previously described. These and other features of low level controller 2014 are described in greater detail with reference to FIG. 22.

High Level Controller

Figure 21:
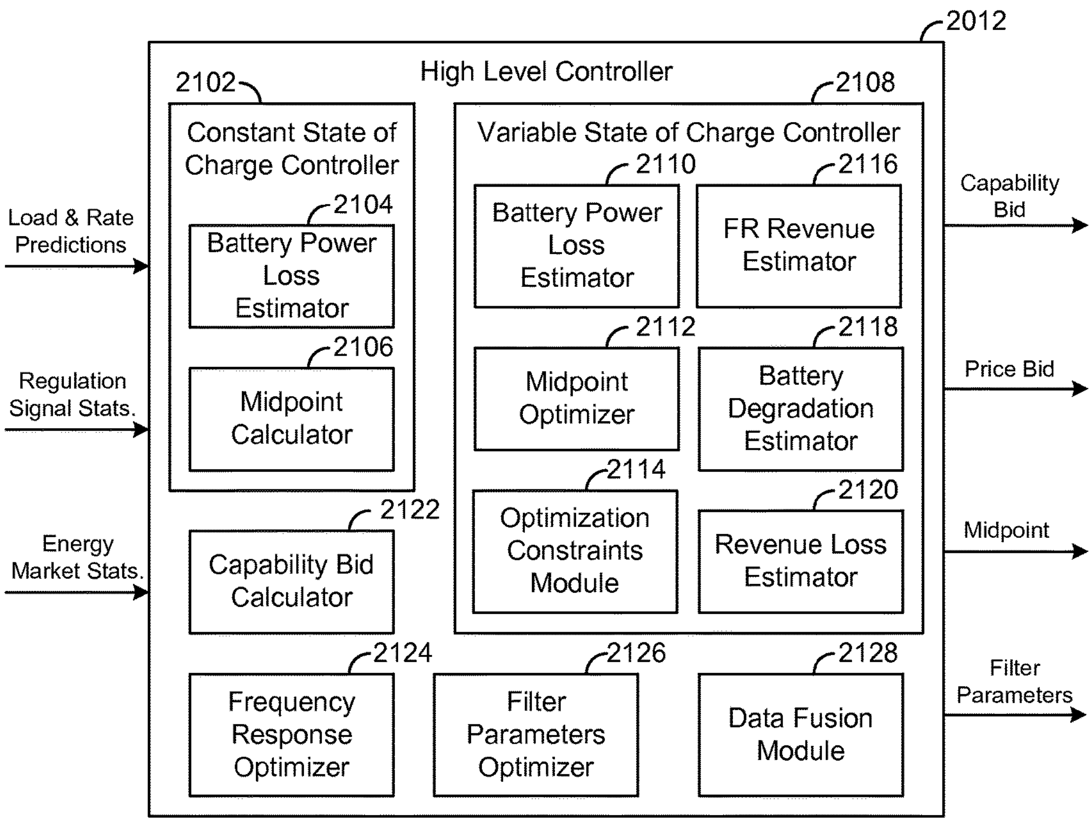
FIG. 21 is a block diagram of a high level controller which can be used in the frequency response optimization system of FIG. 18, according to an exemplary embodiment.

Referring now to FIG. 21, a block diagram illustrating high level controller 2012 in greater detail is shown, according to an exemplary embodiment. High level controller 2012 is shown to include a constant state-of-charge (SOC) controller 2102 and a variable SOC controller 2108. Constant SOC controller 2102 may be configured to generate a midpoint b that results in battery 1808 having the same SOC at the beginning and the end of each frequency response period. In other words, constant SOC controller 2108 may determine a midpoint b that maintains battery 1808 at a predetermined SOC at the beginning of each frequency response period. Variable SOC controller 2108 may generate midpoint b using an optimization procedure that allows the SOC of battery 1808 to have different values at the beginning and end of the frequency response period. In other words, variable SOC controller 2108 may determine a midpoint b that results in a net change in the SOC of battery 1808 over the duration of the frequency response period.

Constant State-of-Charge Controller

Constant SOC controller 2102 may determine midpoint b by equating the desired power $P^*_{POI}$ at POI 1810 with the actual power at POI 1810 as shown in the following equation:

$$(\text{Reg}_{signal})(\text{Reg}_{award}) + b = P_{bat} + P_{loss} + P_{campus}$$

where the left side of the equation $(\text{Reg}_{signal})(\text{Reg}_{award})+\text{b}$ is the desired power $P^*_{POI}$ at POI 1810 and the right side of the equation is the actual power at POI 1810. Integrating over the frequency response period results in the following equation:

$$\int_{period} ((Reg_{signal})(Reg_{award})+b)dt = \int_{period} (P_{bat}+P_{loss}+P_{campus})dt$$

Since the SOC of battery 1808 is maintained at the same value at the beginning and end of the frequency response period, the integral of the battery power $P_{bat}$ over the frequency response period is zero (i.e., $\int P_{bat}dt=0$). Accordingly, the previous equation can be rewritten as follows:

$$b = \int_{period} P_{loss}dt + \int_{period} P_{campus}dt - Reg_{award}\int_{period} Reg_{signal}dt$$

where the term $\int P_{bat}\,dt$ has been omitted because $\int P_{bat}\,dt=0$. This is ideal behavior if the only goal is to maximize frequency response revenue. Keeping the SOC of battery 1808 at a constant value (and near 50%) will allow system 1800 to participate in the frequency market during all hours of the day.

Constant SOC controller 2102 may use the estimated values of the campus power signal received from campus 1802 to predict the value of $\int P_{campus}\,dt$ over the frequency response period. Similarly, constant SOC controller 2102 may use the estimated values of the regulation signal from incentive provider 1814 to predict the value of $\int Reg_{signal}\,dt$ over the frequency response period. $Reg_{award}$ can be expressed as a function of midpoint b as previously described (e.g., $Reg_{award}=P_{limit}-|b|$). Therefore, the only remaining term in the equation for midpoint b is the expected battery power loss $\int P_{loss}$.

Constant SOC controller 2102 is shown to include a battery power loss estimator 2104. Battery power loss estimator 2104 may estimate the value of $\int P_{loss}\,dt$ using a Thevinin equivalent circuit model of battery 1808. For example, battery power loss estimator 2104 may model battery 1808 as a voltage source in series with a resistor. The voltage source has an open circuit voltage of $V_{OC}$ and the resistor has a resistance of $R_{TH}$. An electric current I flows from the voltage source through the resistor.

To find the battery power loss in terms of the supplied power $P_{sup}$, battery power loss estimator 2104 may identify the supplied power $P_{sup}$ as a function of the current I, the open circuit voltage $V_{OC}$, and the resistance $R_{TH}$ as shown in the following equation:

$$P_{sup}=V_{OC}I-I^2R_{TH}$$

which can be rewritten as:

$$\frac{I^2}{I_{SC}} - I + \frac{P'}{4} = 0$$

with the following substitutions:

$$I_{SC}=\frac{V_{OC}}{R_{TH}},\ P'=\frac{P}{P_{max}},\ P_{max}=\frac{V_{OC}^2}{4R_{TH}}$$

where P is the supplied power and $P_{max}$ is the maximum possible power transfer.

Battery power loss estimator 2104 may solve for the current I as follows:

$$I=\frac{I_{SC}}{2}\left(1-\sqrt{1-P'}\right)$$

which can be converted into an expression for power loss $P_{loss}$ in terms of the supplied power P and the maximum possible power transfer $P_{max}$ as shown in the following equation:

$$P_{loss}=P_{max}(1-\sqrt{1-P'})^2$$

Battery power loss estimator 2104 may simplify the previous equation by approximating the expression $(1-\sqrt{1-P'})$ as a linear function about $P'=0$. This results in the following approximation for $P_{loss}$:

$$P_{loss}\approx P_{max}\left(\frac{P'}{2}\right)^2$$

which is a good approximation for powers up to one-fifth of the maximum power.

Battery power loss estimator 2104 may calculate the expected value of $\int P_{loss}\,dt$ over the frequency response period as follows:

$$\begin{aligned}\int_{period} P_{loss}dt &= \int_{period} -P_{max}\left(\frac{Reg_{award}Reg_{signal}+b-P_{campus}}{2P_{max}}\right)^2 dt = \\ &\frac{1}{4P_{max}}\left[2Reg_{award}\int_{period} P_{campus}Reg_{signal}dt - \int_{period} P_{campus}^2dt - Reg_{award}^2\int_{period} Reg_{signal}^2dt\right] + \\ &\frac{b}{4P_{max}}\left[\int_{period} P_{campus}^2dt - Reg_{award}^2\int_{period} Reg_{signal}dt\right] - \frac{b^2}{4P_{max}}\Delta t = \\ &\frac{1}{4P_{max}}[E\{P_{campus}^2\}+Reg_{award}^2E(Reg_{signal}^2\} - 2Reg_{award}E\{Reg_{signal}\}E\{P_{campus}\}]\Delta t - \\ &\frac{b}{4P_{max}}[Reg_{award}E\{Reg_{signal}\}-E\{P_{campus}\}]\Delta t - \frac{b^2}{4P_{max}}\Delta t\end{aligned}$$

where the notation E{ } indicates that the variable within the brackets { } is ergodic and can be approximated by the estimated mean of the variable. This formulation allows battery power loss estimator 2104 to estimate $\int P_{loss}\,dt$ as a function of other variables such as $Reg_{award}$, $Reg_{signal}$, $P_{campus}$, midpoint b, and $P_{max}$.

Constant SOC controller 2102 is shown to include a midpoint calculator 2106. Midpoint calculator 2106 may be configured to calculate midpoint b by substituting the previous expression for $\int P_{loss}\,dt$ into the equation for midpoint b. After substituting known and estimated values, the equation for midpoint b can be rewritten as follows:

$$\frac{1}{4P_{max}}[E\{P_{campus}^2\}+Reg_{award}^2E(Reg_{signal}^2\} - 2Reg_{award}E\{Reg_{signal}\}E\{P_{campus}\}]\Delta t +$$

-continued $$[Reg_{award}E\{Reg_{signal}\} - E\{P_{campus}\}]\Delta t + \frac{b}{2P_{max}}[Reg_{award}E\{Reg_{signal}\} - E\{P_{campus}\}]\Delta t + b\Delta t + \frac{b^2}{4P_{max}}\Delta t = 0$$

Midpoint calculator 2106 may solve the equation for midpoint b to determine the midpoint b that maintains battery 1808 at a constant state-of-charge.

Variable State-of-Charge Controller

Variable SOC controller 2108 may determine optimal midpoints b by allowing the SOC of battery 1808 to have different values at the beginning and end of a frequency response period. For embodiments in which the SOC of battery 1808 is allowed to vary, the integral of the battery power $P_{bat}$ over the frequency response period can be expressed as $-\Delta SOC \cdot C_{des}$ as shown in the following equation:

$$\int_{period} P_{bat} dt = -\Delta SOC \cdot C_{des}$$

where ΔSOC is the change in the SOC of battery 1808 over the frequency response period and $C_{des}$ is the design capacity of battery 1808. The SOC of battery 1808 may be a normalized variable (i.e., $0 \leq SOC \leq 1$) such that the term $SOC \cdot C_{des}$ represents the amount of energy stored in battery 1808 for a given state-of-charge. The SOC is shown as a negative value because drawing energy from battery 1808 (i.e., a positive $P_{bat}$) decreases the SOC of battery 1808. The equation for midpoint b becomes:

$$b = \int_{period} P_{loss} dt + \int_{period} P_{campus} dt + \int_{period} P_{bat} dt - Reg_{award} \int_{period} Reg_{signal} dt$$

Variable SOC controller 2108 is shown to include a battery power loss estimator 2110 and a midpoint optimizer 2112. Battery power loss estimator 2110 may be the same or similar to battery power loss estimator 2104. Midpoint optimizer 2112 may be configured to establish a relationship between the midpoint b and the SOC of battery 1808. For example, after substituting known and estimated values, the equation for midpoint b can be written as follows:

$$\frac{1}{4P_{max}}[E\{P_{campus}^2\} + Reg_{award}^2 + E\{Reg_{signal}^2\} - 2Reg_{award}E\{Reg_{signal}\}E\{P_{campus}\}]\Delta t + [Reg_{award}E\{Reg_{signal}\} + E\{P_{campus}\}]\Delta t + \Delta SOC \cdot C_{des} + \frac{b}{2P_{max}}[Reg_{award}E\{Reg_{signal}\} - E\{P_{campus}\}]\Delta t + b\Delta t + \frac{b^2}{4P_{max}}\Delta t = 0$$

Advantageously, the previous equation defines a relationship between midpoint b and the change in SOC of battery 1808. Midpoint optimizer 2112 may use this equation to determine the impact that different values of midpoint b have on the SOC in order to determine optimal midpoints b. This equation can also be used by midpoint optimizer 2112 during optimization to translate constraints on the SOC in terms of midpoint b. For example, the SOC of battery 1808 may be constrained between zero and 1 (e.g., $0 \leq SOC \leq 1$) since battery 1808 cannot be charged in excess of its maximum capacity or depleted below zero. Midpoint optimizer 2112 may use the relationship between ΔSOC and midpoint b to constrain the optimization of midpoint b to midpoint values that satisfy the capacity constraint.

Midpoint optimizer 2112 may perform an optimization to find optimal midpoints b for each frequency response period within the optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where $Rev(Reg_{award,k})$ is the frequency response revenue at time step k, $c_k b_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. Midpoint optimizer 2112 may use input from frequency response revenue estimator 2116 (e.g., a revenue model) to determine a relationship between midpoint b and $Rev(Reg_{award,k})$. Similarly, midpoint optimizer 2112 may use input from battery degradation estimator 2118 and/or revenue loss estimator 2120 to determine a relationship between midpoint b and the monetized cost of battery degradation $\lambda_{bat,k}$.

Still referring to FIG. 21, variable SOC controller 2108 is shown to include an optimization constraints module 2114. Optimization constraints module 2114 may provide one or more constraints on the optimization performed by midpoint optimizer 2112. The optimization constraints may be specified in terms of midpoint b or other variables that are related to midpoint b. For example, optimization constraints module 2114 may implement an optimization constraint specifying that the expected SOC of battery 1808 at the end of each frequency response period is between zero and one, as shown in the following equation:

$$0 \leq SOC_0 + \sum_{i=1}^{j} \Delta SOC_i \leq 1 \forall\ j = 1 \ldots h$$

where $SOC_0$ is the SOC of battery 1808 at the beginning of the optimization window, $\Delta SOC_i$ is the change in SOC during frequency response period i, and h is the total number of frequency response periods within the optimization window.

In some embodiments, optimization constraints module 2114 implements an optimization constraint on midpoint b so that the power at POI 1810 does not exceed the power rating of power inverter 1806. Such a constraint is shown in the following equation:

$$-P_{limit} \leq b_k + P_{campus,max}^{(p)} \leq P_{limit}$$

where $P_{limit}$ is the power rating of power inverter 1806 and $P_{campus,max}^{(p)}$ is the maximum value of $P_{campus}$ at confidence level p. This constraint could also be implemented by identifying the probability that the sum of $b_k$ and $P_{campus,max}$ exceeds the power inverter power rating (e.g., using a probability density function for $P_{campus,max}$) and limiting that probability to less than or equal to 1−p.

In some embodiments, optimization constraints module 2114 implements an optimization constraint to ensure (with a given probability) that the actual SOC of battery 1808 remains between zero and one at each time step during the applicable frequency response period. This constraint is different from the first optimization constraint which placed bounds on the expected SOC of battery 1808 at the end of each optimization period. The expected SOC of battery 1808 can be determined deterministically, whereas the actual SOC of battery 1808 is dependent on the campus power $P_{campus}$ and the actual value of the regulation signal $Reg_{signal}$ at each time step during the optimization period. In other words, for any value of $Reg_{award}>0$, there is a chance that battery 1808 becomes fully depleted or fully charged while maintaining the desired power $P^*_{POI}$ at POI 1810.

Optimization constraints module 2114 may implement the constraint on the actual SOC of battery 1808 by approximating the battery power $P_{bat}$ (a random process) as a wide-sense stationary, correlated normally distributed process. Thus, the SOC of battery 1808 can be considered as a random walk. Determining if the SOC would violate the constraint is an example of a gambler's ruin problem. For example, consider a random walk described by the following equation:

$$y_{k+1}=y_k+x_k,\ P(x_k=1)=p,\ P(x_k-1)=1-p$$

The probability P that $y_k$ (starting at state z) will reach zero in less than n moves is given by the following equation:

$$P = 2a^{-1}(2p)^{\frac{n-z}{2}}[2(1-p)]^{\frac{n+z}{2}}\sum_{v=1}^{\frac{a}{2}}\cos^{n-1}\left(\frac{\pi v}{a}\right)\sin\left(\frac{\pi v}{a}\right)\sin\left(\frac{\pi z v}{a}\right)$$

In some embodiments, each frequency response period includes approximately n=1800 time steps (e.g., one time step every two seconds for an hour). Therefore, the central limit theorem applies and it is possible to convert the autocorrelated random process for $P_{bat}$ and the limits on the SOC of battery 1808 into an uncorrelated random process of 1 or −1 with a limit of zero.

In some embodiments, optimization constraints module 2114 converts the battery power $P_{bat}$ into an uncorrelated normal process driven by the regulation signal $Reg_{signal}$. For example, consider the original battery power described by the following equation:

$$x_{k+1}=\alpha x_k+e_k,\ x_k\sim N(\mu,\sigma),\ e_k\sim N(\mu_e,\sigma_e)$$

where the signal x represents the battery power $P_{bat}$, a is an autocorrelation parameter, and e is a driving signal. In some embodiments, e represents the regulation signal $Reg_{signal}$. If the power of the signal x is known, then the power of signal e is also known, as shown in the following equations:

$$\mu(1-\alpha)=\mu_e$$

$$E\{x_k^2\}(1-\alpha)^2-2\alpha\mu\mu_e=E\{e_k^2\}$$

$$E\{x_k^2\}(1-\alpha^2)-\mu^2\alpha(1-\alpha)=E\{e_k^2\},$$

Additionally, the impulse response of the difference equation for $x_{k+1}$ is:

$$h_k=\alpha^k\ k\geq 0$$

Using convolution, $x_k$ can be expressed as follows:

$$x_k=\sum_{i=1}^{k}\alpha^{k-i}e_{i-1}$$

$$x_3=\alpha^2 e_0+\alpha^1 e_1+e_2$$

$$x_q=\alpha^{q-1}e_0+\alpha^{q-2}e_1+\ldots+\alpha e_{q-2}+e_{q-1}$$

A random walk driven by signal $x_k$ can be defined as follows:

$$y_k=\sum_{j=1}^{k}x_j=\sum_{j=1}^{k}\sum_{i=1}^{j}\alpha^{j-i}e_{i-1}$$

which for large values of j can be approximated using the infinite sum of a geometric series in terms of the uncorrelated signal e rather than x:

$$y_k=\sum_{j=1}^{k}x_j\approx\sum_{j=1}^{k}\frac{1}{1-\alpha}e_j=\sum_{j=1}^{k}x'_j\ k\gg 1$$

Thus, the autocorrelated driving signal $x_k$ of the random walk can be converted into an uncorrelated driving signal $x'_k$ with mean and power given by:

$$E\{x'_k\}=\mu,$$

$$E\{(x'_k-\mu)^2\}=\frac{1+\alpha}{1-\alpha}\sigma^2,$$

$$E\{x'^2_k\}=\frac{1+\alpha}{1-\alpha}\sigma^2+\mu^2,$$

$$\sigma^2_{x'}=\frac{1+\alpha}{1-\alpha}\sigma^2$$

where $x'_k$ represents the regulation signal $Reg_{signal}$. Advantageously, this allows optimization constraints module 2114 to define the probability of ruin in terms of the regulation signal $Reg_{signal}$.

In some embodiments, optimization constraints module 2114 determines a probability p that the random walk driven by the sequence of −1 and 1 will take the value of 1. In order to ensure that the random walk driven by the sequence of −1 and 1 will behave the same as the random walk driven by $x'_k$, optimization constraints module 2114 may select p such that the ratio of the mean to the standard deviation is the same for both driving functions, as shown in the following equations:

$$\frac{\text{mean}}{stdev}=\frac{\mu}{\sqrt{\frac{1+\alpha}{1-\alpha}}\sigma}=\tilde{\mu}=\frac{2p-1}{\sqrt{4p(1-p)}}$$

$$p=\frac{1}{2}\pm\frac{1}{2}\sqrt{1-\left(\frac{1}{\tilde{\mu}^2+1}\right)}$$

where $\tilde{\mu}$ is the ratio of the mean to the standard deviation of the driving signal (e.g., $Reg_{signal}$) and μ is the change in state-of-charge over the frequency response period divided by the number of time steps within the frequency response period $$\left(\text{i.e., } \mu = \frac{\Delta SOC}{n}\right).$$

For embodiments in which each frequency response period has a duration of one hour (i.e., 3600 seconds) and the interval between time steps is two seconds, the number of time steps per frequency response period is 1800 (i.e., n=1800). In the equation for p, the plus is used when $\tilde{\mu}$ is greater than zero, whereas the minus is used when $\tilde{\mu}$ is less than zero. Optimization constraints module 2114 may also ensure that both driving functions have the same number of standard deviations away from zero (or ruin) to ensure that both random walks have the same behavior, as shown in the following equation:

$$z = \frac{SOC \cdot C_{des}\sqrt{4p(1-p)}}{\sqrt{\frac{1+\alpha}{1-\alpha}}\sigma}$$

Advantageously, the equations for p and z allow optimization constraints module 2114 to define the probability of ruin P (i.e., the probability of battery 1808 fully depleting or reaching a fully charged state) within N time steps (n=1 . . . N) as a function of variables that are known to high level controller 2012 and/or manipulated by high level controller 2012. For example, the equation for p defines p as a function of the mean and standard deviation of the regulation signal $Reg_{signal}$, which may be estimated by signal statistics predictor 2018. The equation for z defines z as a function of the SOC of battery 1808 and the parameters of the regulation signal $Reg_{signal}$.

Optimization constraints module 2114 may use one or more of the previous equations to place constraints on $\Delta SOC \cdot C_{des}$ and $Reg_{award}$ given the current SOC of battery 1808. For example, optimization constraints module 2114 may use the mean and standard deviation of the regulation signal $Reg_{signal}$ to calculate p. Optimization constraints module 2114 may then use p in combination with the SOC of battery 1808 to calculate z. Optimization constraints module 2114 may use p and z as inputs to the equation for the probability of ruin P. This allows optimization constraints module 2114 to define the probability or ruin P as a function of the SOC of battery 1808 and the estimated statistics of the regulation signal $Reg_{signal}$. Optimization constraints module 2114 may impose constraints on the SOC of battery 1808 to ensure that the probability of ruin P within N time steps does not exceed a threshold value. These constraints may be expressed as limitations on the variables ΔSOC·Cdes and/or $Reg_{award}$, which are related to midpoint b as previously described.

In some embodiments, optimization constraints module 2114 uses the equation for the probability of ruin P to define boundaries on the combination of variables p and z. The boundaries represent thresholds when the probability of ruin P in less than N steps is greater than a critical value $P_{cr}$ (e.g., $P_{cr}$=0.001). For example, optimization constraints module 2114 may generate boundaries that correspond to a threshold probability of battery 1808 fully depleting or reaching a fully charged state during a frequency response period (e.g., in N=1800 steps).

In some embodiments, optimization constraints module 2114 constrains the probability of ruin P to less than the threshold value, which imposes limits on potential combinations of the variables p and z. Since the variables p and z are related to the SOC of battery 1808 and the statistics of the regulation signal, the constraints may impose limitations on $\Delta SOC \cdot C_{des}$ and $Reg_{award}$ given the current SOC of battery 1808. These constraints may also impose limitations on midpoint b since the variables $\Delta SOC \cdot C_{des}$ and $Reg_{award}$ are related to midpoint b. For example, optimization constraints module 2114 may set constraints on the maximum bid $Reg_{award}$ given a desired change in the SOC for battery 1808. In other embodiments, optimization constraints module 2114 penalizes the objective function J given the bid $Reg_{award}$ and the change in SOC.

Still referring to FIG. 21, variable SOC controller 2108 is shown to include a frequency response (FR) revenue estimator 2116. FR revenue estimator 2116 may be configured to estimate the frequency response revenue that will result from a given midpoint b (e.g., a midpoint provided by midpoint optimizer 2112). The estimated frequency response revenue may be used as the term $Rev(Reg_{award,k})$ in the objective function J. Midpoint optimizer 2112 may use the estimated frequency response revenue along with other terms in the objective function J to determine an optimal midpoint b.

In some embodiments, FR revenue estimator 2116 uses a revenue model to predict frequency response revenue. An exemplary revenue model which may be used by FR revenue estimator 2116 is shown in the following equation:

$$Rev(Reg_{award}) = Reg_{award}(CP_{cap} + MR \cdot CP_{perf})$$

where $CP_{cap}$, MR, and $CP_{perf}$ are the energy market statistics received from energy market predictor 2016 and $Reg_{award}$ is a function of the midpoint b. For example, capability bid calculator 2122 may calculate $Reg_{award}$ using the following equation:

$$Reg_{award} = P_{limit} - |b|$$

where $P_{limit}$ is the power rating of power inverter 1806.

As shown above, the equation for frequency response revenue used by FR revenue estimator 2116 does not include a performance score (or assumes a performance score of 1.0). This results in FR revenue estimator 2116 estimating a maximum possible frequency response revenue that can be achieved for a given midpoint b (i.e., if the actual frequency response of controller 1812 were to follow the regulation signal exactly). However, it is contemplated that the actual frequency response may be adjusted by low level controller 2014 in order to preserve the life of battery 1808. When the actual frequency response differs from the regulation signal, the equation for frequency response revenue can be adjusted to include a performance score. The resulting value function J may then be optimized by low level controller 2014 to determine an optimal frequency response output which considers both frequency response revenue and the costs of battery degradation, as described with reference to FIG. 22.

Still referring to FIG. 21, variable SOC controller 2108 is shown to include a battery degradation estimator 2118. Battery degradation estimator 2118 may estimate the cost of battery degradation that will result from a given midpoint b (e.g., a midpoint provided by midpoint optimizer 2112). The estimated battery degradation may be used as the term $\lambda_{bat}$ in the objective function J. Midpoint optimizer 2112 may use the estimated battery degradation along with other terms in the objective function J to determine an optimal midpoint b.

In some embodiments, battery degradation estimator 2118 uses a battery life model to predict a loss in battery capacity that will result from a set of midpoints b, power outputs, and/or other variables that can be manipulated by controller 1812. The battery life model may define the loss in battery capacity $C_{loss,add}$ as a sum of multiple piecewise linear functions, as shown in the following equation:

$$C_{loss,add}=f_1(T_{cell})+f_2(SOC)+f_3(DOD)+f_4(PR)+f_5(ER)-C_{loss,nom}$$

where $T_{cell}$ is the cell temperature, SOC is the state-of-charge, DOD is the depth of discharge, PR is the average power ratio $$\left(\text{e.g., } PR = avg\left(\frac{P_{avg}}{P_{des}}\right)\right),$$

and ER is the average effort ratio $$\text{e.g., } ER = avg\left(\frac{\Delta P_{bat}}{P_{des}}\right)$$

of battery 1808. $C_{loss,nom}$ is the nominal loss in battery capacity that is expected to occur over time. Therefore, $C_{loss,add}$ represents the additional loss in battery capacity degradation in excess of the nominal value $C_{loss,nom}$.

Battery degradation estimator 2118 may define the terms in the battery life model as functions of one or more variables that have known values (e.g., estimated or measured values) and/or variables that can be manipulated by high level controller 2012. For example, battery degradation estimator 2118 may define the terms in the battery life model as functions of the regulation signal statistics (e.g., the mean and standard deviation of $Reg_{signal}$), the campus power signal statistics (e.g., the mean and standard deviation of $P_{campus}$), $Reg_{award}$, midpoint b, the SOC of battery 1808, and/or other variables that have known or controlled values.

In some embodiments, battery degradation estimator 2118 measures the cell temperature $T_{cell}$ using a temperature sensor configured to measure the temperature of battery 1808. In other embodiments, battery degradation estimator 2118 estimates or predicts the cell temperature $T_{cell}$ based on a history of measured temperature values. For example, battery degradation estimator 2118 may use a predictive model to estimate the cell temperature $T_{cell}$ as a function of the battery power $P_{bat}$, the ambient temperature, and/or other variables that can be measured, estimated, or controlled by high level controller 2012.

Battery degradation estimator 2118 may define the variable SOC in the battery life model as the SOC of battery 1808 at the end of the frequency response period. The SOC of battery 1808 may be measured or estimated based on the control decisions made by controller 1812. For example, battery degradation estimator 2118 may use a predictive model to estimate or predict the SOC of battery 1808 at the end of the frequency response period as a function of the battery power $P_{bat}$, the midpoint b, and/or other variables that can be measured, estimated, or controlled by high level controller 2012.

Battery degradation estimator 2118 may define the average power ratio PR as the ratio of the average power output of battery 1808 (i.e., $P_{avg}$) to the design power $P_{des}$ $$\left(\text{e.g., } PR = \frac{P_{avg}}{P_{des}}\right).$$

The average power output of battery 1808 can be defined using the following equation:

$$P_{avg}E\{|Reg_{award}Reg_{signal}+b-P_{loss}-P_{campus}|\}$$

where the expression $(Reg_{award}Reg_{signal}+b-P_{loss}-P_{campus})$ represents the battery power $P_{bat}$. The expected value of $P_{avg}$ is given by:

$$P_{avg} = \sigma_{bat}\sqrt{\frac{2}{\pi}}\exp\left(\frac{-\mu_{bat}^2}{2\sigma_{bat}^2}\right)+\text{erf}\left(\frac{-\mu_{bat}}{\sqrt{2\sigma_{bat}^2}}\right)$$

where $\mu_{bat}$ and $\sigma_{bat}^2$ are the mean and variance of the battery power $P_{bat}$. The variables $\mu_{bat}$ and $\sigma_{bat}^2$ may be defined as follows:

$$\mu_{bat}=Reg_{award}E\{Reg_{signal}\}+b-E\{P_{loss}\}-E\{P_{campus}\}$$

$$\sigma_{bat}^2=REG_{award}^2\sigma_{FR}^2+\sigma_{campus}^2$$

where $\sigma_{FR}^2$ is the variance of $Reg_{signal}$ and the contribution of the battery power loss to the $Reg_{signal}$ variance $\sigma_{bat}^2$ is neglected.

Battery degradation estimator 2118 may define the average effort ratio ER as the ratio of the average change in battery power $\Delta P_{avg}$ to the design power $P_{des}$ $$\left(\text{i.e., } ER = \frac{\Delta P_{avg}}{P_{des}}\right).$$

The average change in battery power can be defined using the following equation:

$$\Delta P_{avg}=E\{P_{bat,k}-P_{bat,k-1}\}$$

$$\Delta P_{avg}=E\{|Reg_{award}(Reg_{signal,k}-Reg_{signal,k-1})-(P_{loss,k}-P_{loss,k-1})-(P_{campus,k}-P_{campus,k-1})|\}$$

To make this calculation more tractable, the contribution due to the battery power loss can be neglected. Additionally, the campus power $P_{campus}$ and the regulation signal $Reg_{signal}$ can be assumed to be uncorrelated, but autocorrelated with first order autocorrelation parameters of $\alpha_{campus}$ and $\alpha$, respectively. The argument inside the absolute value in the equation for $\Delta P_{avg}$ has a mean of zero and a variance given by:

$$\begin{aligned}\sigma_{diff}^2 &= E\{[Reg_{award}(Reg_{signal,k}-Reg_{signal,k-1})-(P_{campus,k}-P_{campus,k-1})]^2\}\\ &= E\{Reg_{award}^2(Reg_{signal,k}-Reg_{signal,k-1})^2-(P_{campus,k}-P_{campus,k-1})^2\}\\ &= 2Reg_{award}^2(1-\alpha)\sigma_{FR}^2+2(1-\alpha_{campus})\sigma_{campus}^2\end{aligned}$$

Battery degradation estimator 2118 may define the depth of discharge DOD as the maximum state-of-charge minus the minimum state-of-charge of battery 1808 over the frequency response period, as shown in the following equation:

$$DOD=SOC_{max}-SOC_{min}$$

The SOC of battery 1808 can be viewed as a constant slope with a zero mean random walk added to it, as previously described. An uncorrelated normal random walk with a driving signal that has zero mean has an expected range given by:

$$E\{\max-\min\} = 2\sigma\sqrt{\frac{2N}{\pi}}$$

where E{max−min} represent the depth of discharge DOD and can be adjusted for the autocorrelation of the driving signal as follows:

$$E\{\max-\min\} = 2\sigma_{bat}\sqrt{\frac{1+\alpha_{bat}}{1-\alpha_{bat}}}\sqrt{\frac{2N}{\pi}}$$

$$\sigma_{bat}^2 = Reg_{award}^2\sigma_{FR}^2 + \sigma_{campus}^2$$

$$\alpha_{bat} = \frac{Reg_{award}^2\alpha\sigma_{FR}^2 + \alpha_{campus}\sigma_{campus}^2}{Reg_{award}^2\sigma_{FR}^2 + \sigma_{campus}^2}$$

If the SOC of battery 1808 is expected to change (i.e., is not zero mean), the following equation may be used to define the depth of discharge:

$$E\{\max-\min\} = \begin{cases} R_0 + c\cdot\Delta SOC\cdot\exp\left\{-\alpha\frac{R_0-\Delta SOC}{\sigma_{bat}}\right\} & \Delta SOC < R_0 \\ \Delta SOC + c\cdot R_0\cdot\exp\left\{-\alpha\frac{\Delta SOC-R_0}{\sigma_{bat}}\right\} & \Delta SOC > R_0 \end{cases}$$

where $R_0$ is the expected range with zero expected change in the state-of-charge. Battery degradation estimator 2118 may use the previous equations to establish a relationship between the capacity loss $C_{loss,add}$ and the control outputs provided by controller 1812.

Still referring to FIG. 21, variable SOC controller 2108 is shown to include a revenue loss estimator 2120. Revenue loss estimator 2120 may be configured to estimate an amount of potential revenue that will be lost as a result of the battery capacity loss $C_{loss,add}$. In some embodiments, revenue loss estimator 2120 converts battery capacity loss $C_{loss,add}$ into lost revenue using the following equation:

$$R_{loss}=(CP_{cap}+MR\cdot CP_{perf})C_{loss,add}P_{des}$$

where $R_{loss}$ is the lost revenue over the duration of the frequency response period.

Revenue loss estimator 2120 may determine a present value of the revenue loss $R_{loss}$ using the following equation:

$$\lambda_{bat} = \left[\frac{1-\left(1+\frac{i}{n}\right)^{-n}}{\frac{i}{n}}\right]R_{loss}$$

where n is the total number of frequency response periods (e.g., hours) during which the revenue loss occurs and $\lambda_{bat}$ is the present value of the revenue loss during the ith frequency response period. In some embodiments, the revenue loss occurs over ten years (e.g., n=87,600 hours). Revenue loss estimator 2120 may provide the present value of the revenue loss $\lambda_{bat}$ to midpoint optimizer 2112 for use in the objective function J.

Midpoint optimizer 2112 may use the inputs from optimization constraints module 2114, FR revenue estimator 2116, battery degradation estimator 2118, and revenue loss estimator 2120 to define the terms in objective function J. Midpoint optimizer 2112 may determine values for midpoint b that optimize objective function J. In various embodiments, midpoint optimizer 2112 may use sequential quadratic programming, dynamic programming, or any other optimization technique.

Still referring to FIG. 21, high level controller 2012 is shown to include a capability bid calculator 2122. Capability bid calculator 2122 may be configured to generate a capability bid $Reg_{award}$ based on the midpoint b generated by constant SOC controller 2102 and/or variable SOC controller 2108. In some embodiments, capability bid calculator 2122 generates a capability bid that is as large as possible for a given midpoint, as shown in the following equation:

$$Reg_{award}=P_{limit}-|b|$$

where $P_{limit}$ is the power rating of power inverter 1806. Capability bid calculator 2122 may provide the capability bid to incentive provider 1814 and to frequency response optimizer 2124 for use in generating an optimal frequency response.

Filter Parameters Optimization

Still referring to FIG. 21, high level controller 2012 is shown to include a frequency response optimizer 2124 and a filter parameters optimizer 2126. Filter parameters optimizer 2126 may be configured to generate a set of filter parameters for low level controller 2014. The filter parameters may be used by low level controller 2014 as part of a low-pass filter that removes high frequency components from the regulation signal $Reg_{signal}$. In some embodiments, filter parameters optimizer 2126 generates a set of filter parameters that transform the regulation signal $Reg_{signal}$ into an optimal frequency response signal $Res_{FR}$. Frequency response optimizer 2124 may perform a second optimization process to determine the optimal frequency response $Res_{FR}$ based on the values for $Reg_{award}$ and midpoint b. In the second optimization, the values for $Reg_{award}$ and midpoint b may be fixed at the values previously determined during the first optimization.

In some embodiments, frequency response optimizer 2124 determines the optimal frequency response $Res_{FR}$ by optimizing value function J shown in the following equation:

$$J = \sum_{k=1}^{h} Rev(Reg_{award,k}) + \sum_{k=1}^{h} c_k b_k + \min_{period}(P_{campus,k} + b_k) - \sum_{k=1}^{h}\lambda_{bat,k}$$

where the frequency response revenue $Rev(Reg_{award})$ is defined as follows:

$$Rev(Reg_{award})=PS\cdot Reg_{award}(CP_{cap}+MR\cdot CP_{perf})$$

and the frequency response $Res_{FR}$ is substituted for the regulation signal $Reg_{signal}$ in the battery life model used to calculate $\lambda_{bat,k}$. The performance score PS may be based on several factors that indicate how well the optimal frequency response $Res_{FR}$ tracks the regulation signal $Reg_{signal}$.

The frequency response $Res_{FR}$ may affect both $Rev(Reg_{award})$ and the monetized cost of battery degradation $\lambda_{bat}$. Closely tracking the regulation signal may result in higher performance scores, thereby increasing the frequency response revenue. However, closely tracking the regulation signal may also increase the cost of battery degradation $\lambda_{bat}$. The optimized frequency response $Res_{FR}$ represents an optimal tradeoff between decreased frequency response revenue and increased battery life (i.e., the frequency response that maximizes value J).

In some embodiments, the performance score PS is a composite weighting of an accuracy score, a delay score, and a precision score. Frequency response optimizer 2124 may calculate the performance score PS using the performance score model shown in the following equation:

$$PS = \frac{1}{3}PS_{acc} + \frac{1}{3}PS_{delay} + \frac{1}{3}PS_{prec}$$

where $PS_{acc}$ is the accuracy score, $PS_{delay}$ is the delay score, and $PS_{prec}$ is the precision score. In some embodiments, each term in the precision score is assigned an equal weighting (e.g., ⅓). In other embodiments, some terms may be weighted higher than others.

The accuracy score $PS_{acc}$ may be the maximum correlation between the regulation signal $Reg_{signal}$ and the optimal frequency response $Res_{FR}$. Frequency response optimizer 2124 may calculate the accuracy score $PS_{acc}$ using the following equation:

$$PS_{acc} = \max_{\delta} r_{Reg,Res(\delta)}$$

where δ is a time delay between zero and $\delta_{max}$ (e.g., between zero and five minutes).

The delay score $PS_{delay}$ may be based on the time delay δ between the regulation signal $Reg_{signal}$ and the optimal frequency response $Res_{FR}$. Frequency response optimizer 2124 may calculate the delay score $PS_{delay}$ using the following equation:

$$PS_{delay} = \left|\frac{\delta[s] - \delta_{max}}{\delta_{max}}\right|$$

where δ[s] is the time delay of the frequency response $Res_{FR}$ relative to the regulation signal $Reg_{signal}$ and $\delta_{max}$ is the maximum allowable delay (e.g., 5 minutes or 300 seconds).

The precision score $PS_{prec}$ may be based on a difference between the frequency response $Res_{FR}$ and the regulation signal $Reg_{signal}$. Frequency response optimizer 2124 may calculate the precision score $PS_{prec}$ using the following equation:

$$PS_{prec} = 1 - \frac{\sum |Res_{FR} - Reg_{signal}|}{\sum |Reg_{signal}|}$$

Frequency response optimizer 2124 may use the estimated performance score and the estimated battery degradation to define the terms in objective function J. Frequency response optimizer 2124 may determine values for frequency response $Res_{FR}$ that optimize objective function J. In various embodiments, frequency response optimizer 2124 may use sequential quadratic programming, dynamic programming, or any other optimization technique.

Filter parameters optimizer 2126 may use the optimized frequency response $Res_{FR}$ to generate a set of filter parameters for low level controller 2014. In some embodiments, the filter parameters are used by low level controller 2014 to translate an incoming regulation signal into a frequency response signal. Low level controller 2014 is described in greater detail with reference to FIG. 22.

Figure 24:
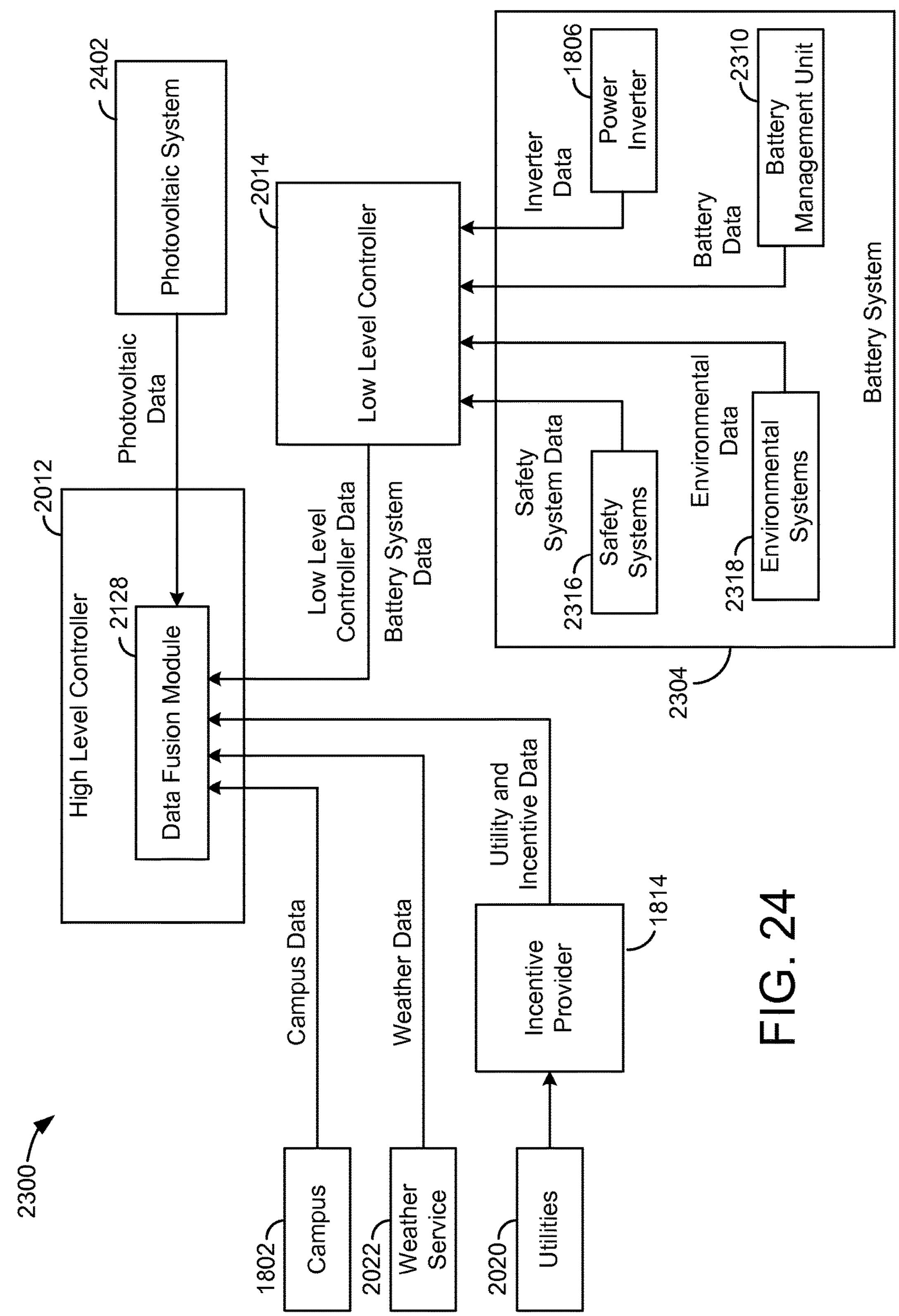
FIG. 24 is a block diagram illustrating data flow into a data fusion module of the frequency response control system of FIG. 23, according to an exemplary embodiment.

Still referring to FIG. 21, high level controller 2012 is shown to include a data fusion module 2128. Data fusion module 2128 is configured to aggregate data received from external systems and devices for processing by high level controller 2012. For example, data fusion module 2128 may store and aggregate external data such as the campus power signal, utility rates, incentive event history and/or weather forecasts as shown in FIG. 24. Further, data fusion module 2128 may store and aggregate data from low level controller 2014. For example, data fusion module 2128 may receive data such as battery SOC, battery temperature, battery system temperature data, security device status data, battery voltage data, battery current data and/or any other data provided by battery system 2304. Data fusion module 2128 is described in greater detail with reference to FIG. 24.

Low Level Controller

Figure 22:
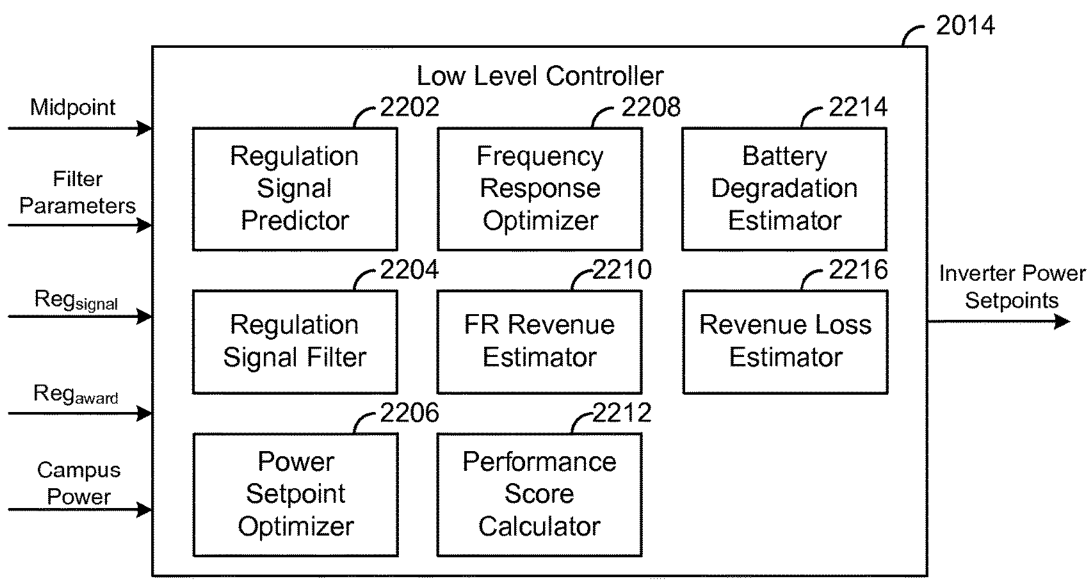
FIG. 22 is a block diagram of a low level controller which can be used in the frequency response optimization system of FIG. 18, according to an exemplary embodiment.

Referring now to FIG. 22, a block diagram illustrating low level controller 2014 in greater detail is shown, according to an exemplary embodiment. Low level controller 2014 may receive the midpoints b and the filter parameters from high level controller 2012. Low level controller 2014 may also receive the campus power signal from campus 1802 and the regulation signal $Reg_{signal}$ and the regulation award $Reg_{award}$ award from incentive provider 1814.

Predicting and Filtering the Regulation Signal

Low level controller 2014 is shown to include a regulation signal predictor 2202. Regulation signal predictor 2202 may use a history of past and current values for the regulation signal $Reg_{signal}$ to predict future values of the regulation signal. In some embodiments, regulation signal predictor 2202 uses a deterministic plus stochastic model trained from historical regulation signal data to predict future values of the regulation signal $Reg_{signal}$. For example, regulation signal predictor 2202 may use linear regression to predict a deterministic portion of the regulation signal $Reg_{signal}$ and an AR model to predict a stochastic portion of the regulation signal $Reg_{signal}$. In some embodiments, regulation signal predictor 2202 predicts the regulation signal $Reg_{signal}$ using the techniques described in U.S. patent application Ser. No. 14/717,593.

Low level controller 2014 is shown to include a regulation signal filter 2204. Regulation signal filter 2204 may filter the incoming regulation signal $Reg_{signal}$ and/or the predicted regulation signal using the filter parameters provided by high level controller 2012. In some embodiments, regulation signal filter 2204 is a low pass filter configured to remove high frequency components from the regulation signal $Reg_{signal}$. Regulation signal filter 2204 may provide the filtered regulation signal to power setpoint optimizer 2206.

Determining Optimal Power Setpoints

Power setpoint optimizer 2206 may be configured to determine optimal power setpoints for power inverter 1806 based on the filtered regulation signal. In some embodiments, power setpoint optimizer 2206 uses the filtered regulation signal as the optimal frequency response. For example, low level controller 2014 may use the filtered regulation signal to calculate the desired interconnection power $P^*_{POI}$ using the following equation:

$$Phd\ POI = Reg_{award} \cdot Reg_{filter} + b$$

where $Reg_{filter}$ is the filtered regulation signal. Power setpoint optimizer 2206 may subtract the campus power $P_{campus}$ from the desired interconnection power $P^*_{POI}$ to calculate the optimal power setpoints $P_{SP}$ for power inverter 1806, as shown in the following equation:

$$P_{SP} = P^*_{POI} - P_{campus}$$

In other embodiments, low level controller 2014 performs an optimization to determine how closely to track $P^*_{POI}$. For example, low level controller 2014 is shown to include a frequency response optimizer 2208. Frequency response optimizer 2208 may determine an optimal frequency response $Res_{FR}$ by optimizing value function J shown in the following equation:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where the frequency response $Res_{FR}$ affects both Rev-($Reg_{award}$) and the monetized cost of battery degradation $\lambda_{bat}$. The frequency response $Res_{FR}$ may affect both Rev ($Reg_{award}$) and the monetized cost of battery degradation $\lambda_{bat}$. The optimized frequency response $Res_{FR}$ represents an optimal tradeoff between decreased frequency response revenue and increased battery life (i.e., the frequency response that maximizes value J). The values of Rev($Reg_{award}$) and $\lambda_{bat,k}$ may be calculated by FR revenue estimator 2210, performance score calculator 2212, battery degradation estimator 2214, and revenue loss estimator 2216.

Estimating Frequency Response Revenue

Still referring to FIG. 22, low level controller 2014 is shown to include a FR revenue estimator 2210. FR revenue estimator 2210 may estimate a frequency response revenue that will result from the frequency response $Res_{FR}$. In some embodiments, FR revenue estimator 2210 estimates the frequency response revenue using the following equation:

$$Rev(Reg_{award}) = PS \cdot Reg_{award}(CP_{cap} + MR \cdot CP_{perf})$$

where $Reg_{award}$, $CP_{cap}$, MR, and $CP_{perf}$ are provided as known inputs and PS is the performance score.

Low level controller 2014 is shown to include a performance score calculator 2212. Performance score calculator 2212 may calculate the performance score PS used in the revenue function. The performance score PS may be based on several factors that indicate how well the optimal frequency response $Res_{FR}$ tracks the regulation signal $Reg_{signal}$. In some embodiments, the performance score PS is a composite weighting of an accuracy score, a delay score, and a precision score. Performance score calculator 2212 may calculate the performance score PS using the performance score model shown in the following equation:

$$PS = \frac{1}{3}PS_{acc} + \frac{1}{3}PS_{delay} + \frac{1}{3}PS_{prec}$$

where $PS_{acc}$ is the accuracy score, $PS_{delay}$ is the delay score, and $PS_{prec}$ is the precision score. In some embodiments, each term in the precision score is assigned an equal weighting (e.g., ⅓). In other embodiments, some terms may be weighted higher than others. Each of the terms in the performance score model may be calculated as previously described with reference to FIG. 21.

Estimating Battery Degradation

Still referring to FIG. 22, low level controller 2014 is shown to include a battery degradation estimator 2214. Battery degradation estimator 2214 may be the same or similar to battery degradation estimator 2118, with the exception that battery degradation estimator 2214 predicts the battery degradation that will result from the frequency response $Res_{FR}$ rather than the original regulation signal $Reg_{signal}$. The estimated battery degradation may be used as the term $\lambda_{batt}$ in the objective function J. Frequency response optimizer 2208 may use the estimated battery degradation along with other terms in the objective function J to determine an optimal frequency response $Res_{FR}$.

In some embodiments, battery degradation estimator 2214 uses a battery life model to predict a loss in battery capacity that will result from the frequency response $Res_{FR}$. The battery life model may define the loss in battery capacity $C_{loss,add}$ as a sum of multiple piecewise linear functions, as shown in the following equation:

$$C_{loss,add} = f_1(T_{cell}) + f_2(SOC) + f_3(DOD) + f_4(PR) + f_5(ER) - C_{loss,nom}$$

where $T_{cell}$ is the cell temperature, SOC is the state-of-charge, DOD is the depth of discharge, PR is the average power ratio $$\left(\text{e.g., } PR = avg\left(\frac{P_{avg}}{P_{des}}\right)\right),$$

and ER is the average ettort ratio $$\left(\text{e.g., } ER = avg\left(\frac{\Delta P_{bat}}{P_{des}}\right)\right)$$

of battery 1808. $C_{loss,nom}$ is the nominal loss in battery capacity that is expected to occur over time. Therefore, $C_{loss,add}$ represents the additional loss in battery capacity degradation in excess of the nominal value $C_{loss,nom}$. The terms in the battery life model may be calculated as described with reference to FIG. 21, with the exception that the frequency response $Res_{FR}$ is used in place of the regulation signal $Reg_{signal}$.

Still referring to FIG. 22, low level controller 2014 is shown to include a revenue loss estimator 2216. Revenue loss estimator 2216 may be the same or similar to revenue loss estimator 2120, as described with reference to FIG. 21. For example, revenue loss estimator 2216 may be configured to estimate an amount of potential revenue that will be lost as a result of the battery capacity loss $C_{loss,add}$. In some embodiments, revenue loss estimator 2216 converts battery capacity loss $C_{loss,add}$ into lost revenue using the following equation:

$$R_{loss} = (CP_{cap} + MR \cdot CP_{perf}) C_{loss,add} P_{des}$$

where $R_{loss}$ is the lost revenue over the duration of the frequency response period.

Revenue loss estimator 2120 may determine a present value of the revenue loss $R_{loss}$ using the following equation:

$$\lambda_{bat} = \left[\frac{1 - \left(1 + \frac{i}{n}\right)^{-n}}{\frac{i}{n}}\right] R_{loss}$$

where n is the total number of frequency response periods (e.g., hours) during which the revenue loss occurs and $\lambda_{bat}$ is the present value of the revenue loss during the ith frequency response period. In some embodiments, the revenue loss occurs over ten years (e.g., n=87,600 hours). Revenue loss estimator 2120 may provide the present value of the revenue loss $\lambda_{bat}$ to frequency response optimizer 2208 for use in the objective function J.

Frequency response optimizer 2208 may use the estimated performance score and the estimated battery degradation to define the terms in objective function J. Frequency response optimizer 2208 may determine values for frequency response $Res_{FR}$ that optimize objective function J. In various embodiments, frequency response optimizer 2208 may use sequential quadratic programming, dynamic programming, or any other optimization technique.

Frequency Response Control System

Figure 23:
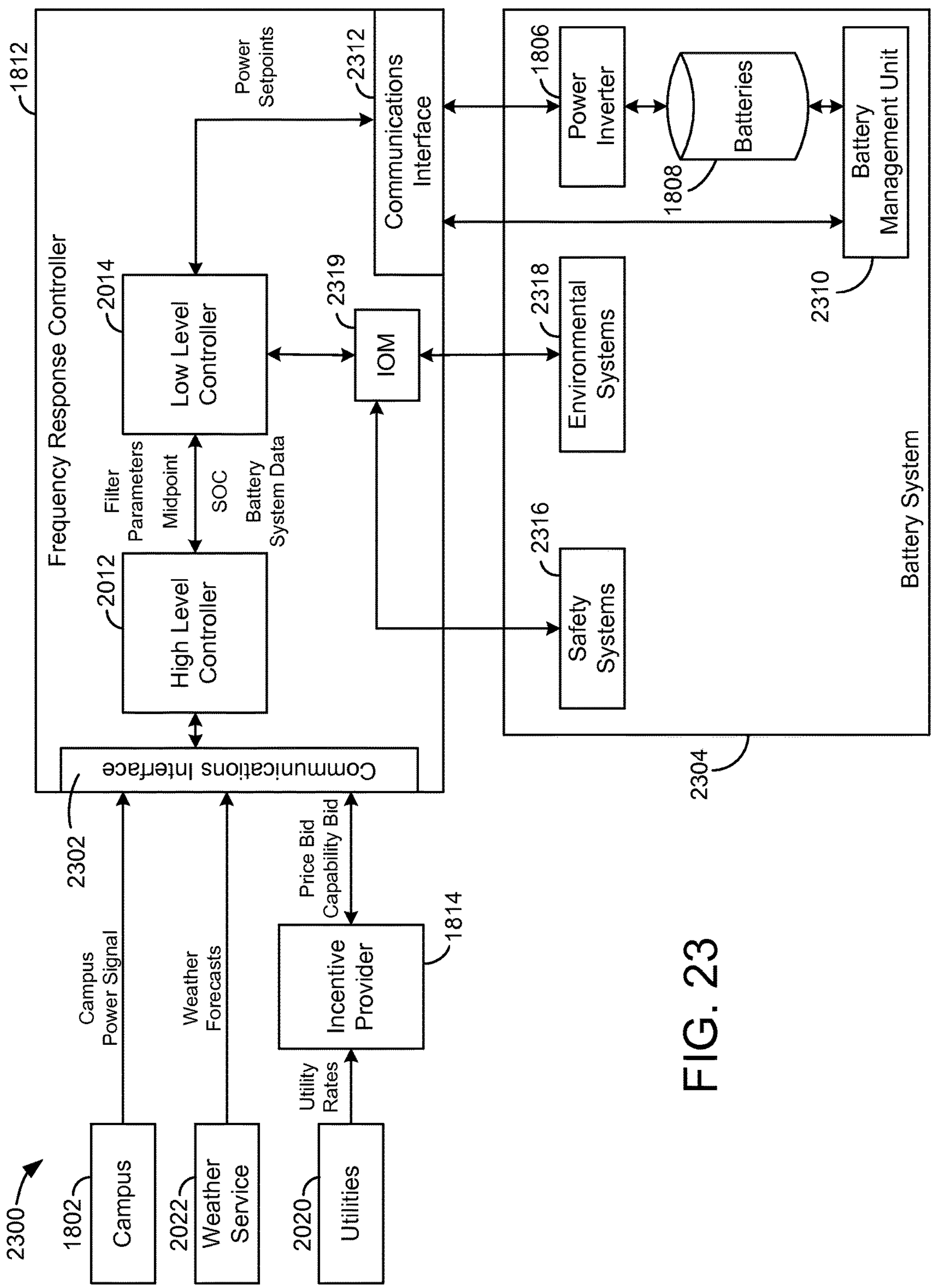
FIG. 23 is a block diagram of a frequency response control system, according to an exemplary embodiment.

Referring now to FIG. 23, a block diagram of a frequency response control system 2300 is shown, according to exemplary embodiment. Control system 2300 is shown to include frequency response controller 1812, which may be the same or similar as previously described. For example, frequency response controller 1812 may be configured to perform an optimization process to generate values for the bid price, the capability bid, and the midpoint b. In some embodiments, frequency response controller 1812 generates values for the bids and the midpoint b periodically using a predictive optimization scheme (e.g., once every half hour, once per frequency response period, etc.). Frequency response controller 1812 may also calculate and update power setpoints for power inverter 1806 periodically during each frequency response period (e.g., once every two seconds). As shown in FIG. 23, frequency response controller 1812 is in communication with one or more external systems via communication interface 2302. Additionally, frequency response controller 1812 is also shown as being in communication with a battery system 2304.

In some embodiments, the interval at which frequency response controller 1812 generates power setpoints for power inverter 1806 is significantly shorter than the interval at which frequency response controller 1812 generates the bids and the midpoint b. For example, frequency response controller 1812 may generate values for the bids and the midpoint b every half hour, whereas frequency response controller 1812 may generate a power setpoint for power inverter 1806 every two seconds. The difference in these time scales allows frequency response controller 1812 to use a cascaded optimization process to generate optimal bids, midpoints b, and power setpoints.

In the cascaded optimization process, high level controller 2012 determines optimal values for the bid price, the capability bid, and the midpoint b by performing a high level optimization. The high level controller 2012 may be a centralized server within the frequency response controller 1812. The high level controller 2012 may be configured to execute optimization control algorithms, such as those described herein. In one embodiment, the high level controller 2012 may be configured to run an optimization engine, such as a MATLAB optimization engine.

Further, the cascaded optimization process allows for multiple controllers to process different portions of the optimization process. As will be described below, the high level controller 2012 may be used to perform optimization functions based on received data, while a low level controller 2014 may receive optimization data from the high level controller 2012 and control the battery system 2304 accordingly. By allowing independent platforms to perform separation portions of the optimization, the individual platforms may be scaled and tuned independently. For example, the controller 1812 may be able to be scaled up to accommodate a larger battery system 2304 by adding additional low level controllers to control the battery system 2304. Further, the high level controller 2012 may be modified to provide additional computing power for optimizing battery system 2304 in more complex systems. Further, modifications to either the high level controller 2012 or the low level controller 2014 will not affect the other, thereby increasing overall system stability and availability.

In system 2300, high level controller 2012 may be configured to perform some or all of the functions previously described with reference to FIGS. 20-22. For example, high level controller 2012 may select midpoint b to maintain a constant state-of-charge in battery 1808 (i.e., the same state-of-charge at the beginning and end of each frequency response period) or to vary the state-of-charge in order to optimize the overall value of operating system 2300 (e.g., frequency response revenue minus energy costs and battery degradation costs), as described below. High level controller 2012 may also determine filter parameters for a signal filter (e.g., a low pass filter) used by a low level controller 2014.

The low level controller 2014 may be a standalone controller. In one embodiment, the low level controller 2014 is a Network Automation Engine (NAE) controller from Johnson Controls. However, other controllers having the required capabilities are also contemplated. The required capabilities for the low level controller 2014 may include having sufficient memory and computing power to run the applications, described below, at the required frequencies. For example, certain optimization control loops (described below) may require control loops running at 200 ms intervals. However, intervals of more than 200 ms and less than 200 ms may also be required. These control loops may require reading and writing data to and from the battery inverter. The low level controller 2014 may also be required to support Ethernet connectivity (or other network connectivity) to connect to a network for receiving both operational data, as well as configuration data. The low level controller 2014 may be configured to perform some or all of the functions previously described with reference to FIGS. 20-22.

The low level controller 2014 may be capable of quickly controlling one or more devices around one or more setpoints. For example, low level controller 2014 uses the midpoint b and the filter parameters from high level controller 2012 to perform a low level optimization in order to generate the power setpoints for power inverter 1806. Advantageously, low level controller 2014 may determine how closely to track the desired power $P^*_{POI}$ at the point of interconnection 1810. For example, the low level optimization performed by low level controller 2014 may consider not only frequency response revenue but also the costs of the power setpoints in terms of energy costs and battery degradation. In some instances, low level controller 2014 may determine that it is deleterious to battery 1808 to follow the regulation exactly and may sacrifice a portion of the frequency response revenue in order to preserve the life of battery 1808.

Low level controller 2014 may also be configured to interface with one or more other devises or systems. For example, the low level controller 2014 may communicate with the power inverter 1806 and/or the battery management unit 2310 via a low level controller communication interface 2312. Communications interface 2312 may include wired or wireless interfaces (e.g., jacks, antennas, transmitters, receivers, transceivers, wire terminals, etc.) for conducting data communications with various systems, devices, or networks. For example, communications interface 2312 may include an Ethernet card and port for sending and receiving data via an Ethernet-based communications network and/or a WiFi transceiver for communicating via a wireless communications network. Communications interface 2312 may be configured to communicate via local area networks or wide area networks (e.g., the Internet, a building WAN, etc.) and may use a variety of communications protocols (e.g., BACnet, MODBUS, CAN, IP, LON, etc.).

As described above, the low level controller 2014 may communicate setpoints to the power inverter 1806. Furthermore, the low level controller 2014 may receive data from the battery management unit 2310 via the communication interface 2312. The battery management unit 2310 may provide data relating to a state of charge (SOC) of the batteries 1808. The battery management unit 2310 may further provide data relating to other parameters of the batteries 1808, such as temperature, real time or historical voltage level values, real time or historical current values, etc. The low level controller 2014 may be configured to perform time critical functions of the frequency response controller 1812. For example, the low level controller 2014 may be able to perform fast loop (PID, PD, PI, etc.) controls in real time.

The low level controller 2014 may further control a number of other systems or devices associated with the battery system 2304. For example, the low level controller may control safety systems 2316 and/or environmental systems 2318. In one embodiment, the low level controller 2014 may communicate with and control the safety systems 2316 and/or the environmental systems 2318 through an input/output module (TOM) 2319. In one example, the IOM may be an TOM controller from Johnson Controls. The IOM may be configured to receive data from the low level controller and then output discrete control signals to the safety systems 2316 and/or environmental systems 2318. Further, the IOM 2319 may receive discrete outputs from the safety systems 2316 and/or environmental systems 2020, and report those values to the low level controller 2014. For example, the TOM 2319 may provide binary outputs to the environmental system 2318, such as a temperature setpoint; and in return may receive one or more analog inputs corresponding to temperatures or other parameters associated with the environmental systems 2318. Similarly, the safety systems 2316 may provide binary inputs to the IOM 2319 indicating the status of one or more safety systems or devices within the battery system 2304. The IOM 2319 may be able to process multiple data points from devices within the battery system 2304. Further, the IOM may be configured to receive and output a variety of analog signals (4-20 mA, 0-5V, etc.) as well as binary signals.

The environmental systems 2318 may include HVAC devices such as roof-top units (RTUs), air handling units (AHUs), etc. The environmental systems 2318 may be coupled to the battery system 2304 to provide environmental regulation of the battery system 2304. For example, the environmental systems 2318 may provide cooling for the battery system 2304. In one example, the battery system 2304 may be contained within an environmentally sealed container. The environmental systems 2318 may then be used to not only provide airflow through the battery system 2304, but also to condition the air to provide additional cooling to the batteries 1808 and/or the power inverter 1806. The environmental systems 2318 may also provide environmental services such as air filtration, liquid cooling, heating, etc. The safety systems 2316 may provide various safety controls and interlocks associated with the battery system 2304. For example, the safety systems 2316 may monitor one or more contacts associated with access points on the battery system. Where a contact indicates that an access point is being accessed, the safety systems 2316 may communicate the associated data to the low level controller 2014 via the IOM 2319. The low level controller may then generate and alarm and/or shut down the battery system 2304 to prevent any injury to a person accessing the battery system 2304 during operation. Further examples of safety systems can include air quality monitors, smoke detectors, fire suppression systems, etc.

Still referring to FIG. 23, the frequency response controller 1812 is shown to include the high level controller communications interface 2302. Communications interface 2302 may include wired or wireless interfaces (e.g., jacks, antennas, transmitters, receivers, transceivers, wire terminals, etc.) for conducting data communications with various systems, devices, or networks. For example, communications interface 2302 may include an Ethernet card and port for sending and receiving data via an Ethernet-based communications network and/or a WiFi transceiver for communicating via a wireless communications network. Communications interface 2302 may be configured to communicate via local area networks or wide area networks (e.g., the Internet, a building WAN, etc.) and may use a variety of communications protocols (e.g., BACnet, IP, LON, etc.).

Communications interface 2302 may be a network interface configured to facilitate electronic data communications between frequency response controller 1812 and various external systems or devices (e.g., campus 1802, energy grid 1804, incentive provider 1814, utilities 2020, weather service 2022, etc.). For example, frequency response controller 1812 may receive inputs from incentive provider 1814 indicating an incentive event history (e.g., past clearing prices, mileage ratios, participation requirements, etc.) and a regulation signal. Further, the incentive provider 1814 may communicate utility rates provided by utilities 2020. Frequency response controller 1812 may receive a campus power signal from campus 1802, and weather forecasts from weather service 2022 via communications interface 2302. Frequency response controller 1812 may provide a price bid and a capability bid to incentive provider 1814 and may provide power setpoints to power inverter 1806 via communications interface 2302.

Data Fusion

Turning now to FIG. 24, a block diagram illustrating data flow into the data fusion module 2128 is shown, according to some embodiments. As shown in FIG. 24, the data fusion module 2128 may receive data from multiple devices and/or systems. In one embodiment, the data fusion module 2128 may receive all data received by the high level controller 2012. For example, the data fusion module 2128 may receive campus data from the campus 1802. Campus data may include campus power requirements, campus power requests, occupancy planning, historical use data, lighting schedules, HVAC schedules, etc. In a further embodiment, the data fusion module 2128 may receive weather data from the weather service 2022. The weather service 2022 may include current weather data (temperature, humidity, barometric pressure, etc.), weather forecasts, historical weather data, etc. In a still further embodiment, the data fusion module 2128 may receive utility data from the utilities 2020. In some examples, the data fusion module 2128 may receive some or all of the utility data via the incentive provider 1814. Examples of utility data may include utility rates, future pricing schedules, anticipated loading, historical data, etc. Further, the incentive provider 1814 may further add data such as capability bid requests, price bid requests, incentive data, etc.

The data fusion module 2128 may further receive data from the low level controller 2014. In some embodiments, the low level controller may receive data from multiple sources, which may be referred to collectively as battery system data. For example, the low level controller 2014 may receive inverter data from power inverter 1806. Example inverter data may include inverter status, feedback points, inverter voltage and current, power consumption, etc. The low level controller 2014 may further receive battery data from the battery management unit 2310. Example battery data may include battery SOC, depth of discharge data, battery temperature, battery cell temperatures, battery voltage, historical battery use data, battery health data, etc. In other embodiment, the low level controller 2014 may receive environmental data from the environmental systems 2318. Examples of environmental data may include battery system temperature, battery system humidity, current HVAC settings, setpoint temperatures, historical HVAC data, etc. Further, the low level controller 2014 may receive safety system data from the safety systems 2316. Safety system data may include access contact information (e.g. open or closed indications), access data (e.g. who has accessed the battery system 2304 over time), alarm data, etc. In some embodiments, some or all of the data provided to the low level controller 2014 is via an input/output module, such as IOM 2319. For example, the safety system data and the environmental system data may be provided to the low level controller 2014 via an input/output module, as described in detail in regards to FIG. 23.

The low level controller 2014 may then communicate the battery system data to the data fusion module 2128 within the high level controller 2012. Additionally, the low level controller 2014 may provide additional data to the data fusion module 2128, such as setpoint data, control parameters, etc.

The data fusion module 2128 may further receive data from other stationary power systems, such as a photovoltaic system 2402. For example, the photovoltaic system 2402 may include one or more photovoltaic arrays and one or more photovoltaic array power inverters. The photovoltaic system 2402 may provide data to the data fusion module 2128 such as photovoltaic array efficiency, photovoltaic array voltage, photovoltaic array inverter output voltage, photovoltaic array inverter output current, photovoltaic array inverter temperature, etc. In some embodiments, the photovoltaic system 2402 may provide data directly to the data fusion module 2128 within the high level controller 2012. In other embodiments, the photovoltaic system 2402 may transmit the data to the low level controller 2014, which may then provide the data to the data fusion module 2128 within the high level controller 2012.

The data fusion module 2128 may receive some or all of the data described above, and aggregate the data for use by the high level controller 2012. In one embodiment, the data fusion module 2128 is configured to receive and aggregate all data received by the high level controller 2012, and to subsequently parse and distribute the data to one or more modules of the high level controller 2012, as described above. Further, the data fusion module 2128 may be configured to combine disparate heterogeneous data from the multiple sources described above, into a homogeneous data collection for use by the high level controller 2012. As described above, data from multiple inputs is required to optimize the battery system 2304, and the data fusion module 2128 can gather and process the data such that it can be provided to the modules of the high level controller 2012 efficiently and accurately. For example, extending battery lifespan is critical for ensuring proper utilization of the battery system 2304. By combining battery data such as temperature and voltage, along with external data such as weather forecasts, remaining battery life may be more accurately determined by the battery degradation estimator 2118, described above. Similarly, multiple data points from both external sources and the battery system 2304 may allow for more accurate midpoint estimations, revenue loss estimations, battery power loss estimation, or other optimization determination, as described above.

Figure 25:
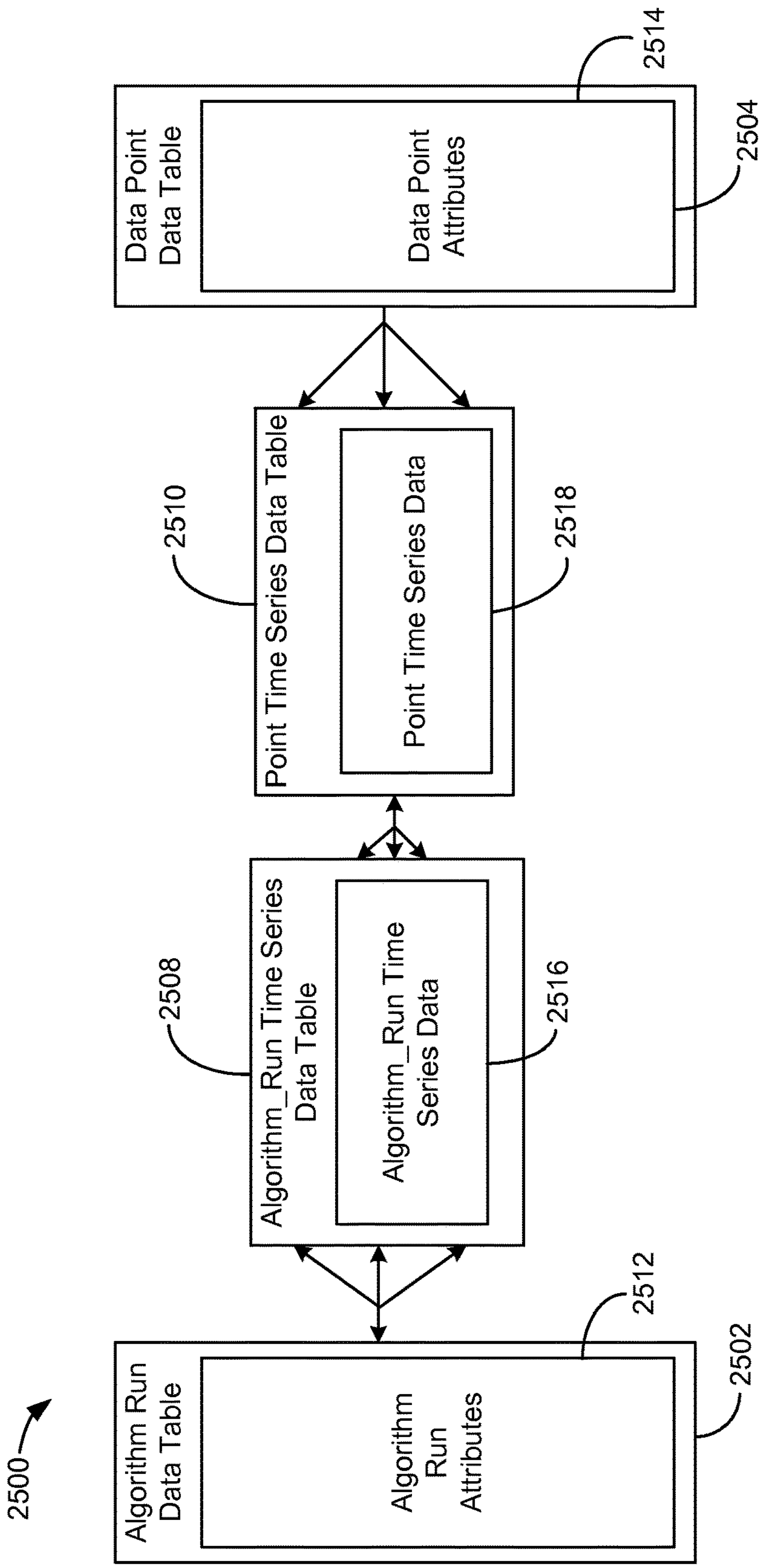
FIG. 25 is a block diagram illustrating a database schema which can be used in the frequency response control system of FIG. 23, according to an exemplary embodiment.

Turning now to FIG. 25, a block diagram showing a database schema 2500 of the system 2300 is shown, according to some embodiments. The schema 2500 is shown to include an algorithm run data table 2502, a data point data table 2504, an algorithm_run time series data table 2508 and a point time series data table 2510. The data tables 2502, 2504, 2508, 2510 may be stored on the memory of the high level controller 2012. In other embodiments, the data tables 2502, 2504, 2508, 2510 may be stored on an external storage device and accessed by the high level controller as required.

As described above, the high level controller performs calculation to generate optimization data for the battery optimization system 2300. These calculation operations (e.g. executed algorithms) may be referred to as "runs." As described above, one such run is the generation of a midpoint b which can subsequently be provided to the low level controller 2014 to control the battery system 2304. However, other types of runs are contemplated. Thus, for the above described run, the midpoint b is the output of the run. The detailed operation of a run, and specifically a run to generate midpoint b is described in detail above.

The algorithm run data table 2502 may include a number of algorithm run attributes 2512. Algorithm run attributes 2512 are those attributes associated with the high level controller 2012 executing an algorithm, or "run", to produce an output. The runs can be performed at selected intervals of time. For example, the run may be performed once every hour. However, in other examples, the run may be performed more than once every hour, or less than once every hour. The run is then performed and by the high level controller 2012 and a data point is output, for example a midpoint b, as described above. The midpoint b may be provided to the low level controller 2014 to control the battery system 2304, described above in the description of the high level controller 2304 calculating the midpoint b.

In one embodiment, the algorithm run attributes contain all the information necessary to perform the algorithm or run. In a further embodiment, the algorithm run attributes 2512 are associated with the high level controller executing an algorithm to generate a midpoint, such as midpoint b described in detail above. Example algorithm run attributes may include an algorithm run key, an algorithm run ID (e.g. "midpoint," "endpoint," "temperature_setpoint," etc.), Associated Run ID (e.g. name of the run), run start time, run stop time, target run time (e.g. when is the next run desired to start), run status, run reason, fail reason, plant object ID (e.g. name of system), customer ID, run creator ID, run creation date, run update ID, and run update date. However, this list is for example only, as it is contemplated that the algorithm run attributes may contain multiple other attributes associated with a given run.

As stated above, the algorithm run data table 2502 contains attributes associated with a run to be performed by the high level controller 2012. In some embodiments, the output of a run, is one or more "points," such as a midpoint. The data point data table 2504 contains data point attributes 2514 associated with various points that may be generated by a run. These data point attributes 2514 are used to describe the characteristics of the data points. For example, the data point attributes may contain information associated with a midpoint data point. However, other data point types are contemplated. Example attributes may include point name, default precision (e.g. number of significant digits), default unit (e.g. cm, degrees Celsius, voltage, etc.), unit type, category, fully qualified reference (yes or no), attribute reference ID, etc. However, other attributes are further considered.

The algorithm_run time series data table 2508 may contain time series data 2516 associated with a run. In one embodiment, the algorithm_run time series data 2516 includes time series data associated with a particular algorithm run ID. For example, a run associated with determining the midpoint b described above, may have an algorithm run ID of Midpoint_Run. The algorithm_run time series data table 2508 may therefore include algorithm_run time series data 2516 for all runs performed under the algorithm ID Midpoint_Run. Additionally, the algorithm_run time series data table 2508 may also contain run time series data associated with other algorithm IDs as well. The run time series data 2516 may include past data associated with a run, as well as expected future information. Example run time series data 2516 may include final values of previous runs, the unit of measure in the previous runs, previous final value reliability values, etc. As an example, a "midpoint" run may be run every hour, as described above. The algorithm_run time series data 2516 may include data related to the previously performed runs, such as energy prices over time, system data, etc. Additionally, the algorithm_run time series data 2516 may include point time series data associated with a given point, as described below.

The point time series data table 2510 may include the point time series data 2518. The point time series data 2518 may include time series data associated with a given data "point." For example, the above described midpoint b may have a point ID of "Midpoint." The point time series data table 2510 may contain point time series data 2518 associated with the "midpoint" ID, generated over time. For example, previous midpoint values may be stored in the point time series data table 2518 for each performed run. The point time series data table 2510 may identify the previous midpoint values by time (e.g. when the midpoint was used by the low level controller 2014), and may include information such as the midpoint value, reliability information associated with the midpoint, etc. In one embodiment, the point time series data table 2518 may be updated with new values each time a new "midpoint" is generated via a run. Further, the point time series data 2516 for a given point may include information independent of a given run. For example, the high level controller 2012 may monitor other data associated with the midpoint, such as regulation information from the low level controller, optimization data, etc., which may further be stored in the point time series data table 2510 as point time series data 2518.

The above described data tables may be configured to have an association or relational connection between them. For example, as shown in FIG. 25, the algorithm_run data table 2502 may have a one-to-many association or relational relationship with the algorithm_run time series association table 2508, as there may be many algorithm_run time series data points 2516 for each individual algorithm run ID. Further, the data point data table 2504 may have a one-to many relationship with the point time series data table 2510, as there may be many point time series data points 2518 associated with an individual point. Further, the point time series data table 2510 may have a one to many relationship with the algorithm_run time series data table 2508, as there may be multiple different point time series data 2518 associated with a run. Accordingly, the algorithm_run data table 2502 has a many-to-many relationship with the data point data table 2504, as there may be many points, and/or point time series data 2518, associated with may run types; and, there may be multiple run types associated with many points By using the above mentioned association data tables 2502, 2504, 2508, 2510, optimization of storage space required for storing time series data may be achieved. With the addition of additional data used in a battery optimization system, such as battery optimization system 2300 described above, vast amounts of time series data related to data provided by external sources (weather data, utility data, campus data, building automation systems (BAS) or building management systems (BMS)), and internal sources (battery systems, photovoltaic systems, etc.) is generated. By utilizing association data tables, such as those described above, the data may be optimally stored and accessed.

Example Implementations

One implementations of the present disclosure is a photovoltaic energy system. The photovoltaic energy system includes a photovoltaic field that converts solar energy into electrical energy, one or more cloud detectors that detect a cloud approaching the photovoltaic field, and a controller that uses input from the one or more cloud detectors to predict a change in solar intensity within the photovoltaic field before the change in solar intensity occurs within the photovoltaic field. The controller preemptively adjusts an electric power output of the photovoltaic energy system in response to predicting the change in solar intensity within the photovoltaic field. In some embodiments, the controller uses the predicted change in solar intensity within the photovoltaic field to predict a change in an electric power output of the photovoltaic field.

In some embodiments, the photovoltaic energy system includes a power inverter that converts a direct current (DC) output of the photovoltaic field into an alternating current (AC) output and provides the AC output to an energy grid. The AC output may define the electric power output of the photovoltaic energy system. In some embodiments, the controller preemptively adjusts the electric power output of the photovoltaic energy system by causing the power inverter to limit the electrical energy generated by the photovoltaic field. In some embodiments, preemptively adjusting the electric power output of the photovoltaic energy system includes ramping down the electric power output in accordance with a predetermined ramp rate.

In some embodiments, the controller uses the input from the cloud detectors to predict a disturbance in the electric power output of the photovoltaic energy system and uses a predictive control technique (e.g., feedforward control, model predictive control, etc.) to preemptively adjust the electric power output before the disturbance occurs. In some embodiments, the controller monitors the electric power output of the photovoltaic energy system and calculates a rate of change of the electric power output. The rate of change may define an actual ramp rate. In some embodiments, the controller compares the actual ramp rate to a threshold ramp rate and uses feedback control to adjust the electric power output of the photovoltaic energy system in response to the actual ramp rate exceeding the threshold ramp rate.

In some embodiments, the controller adjusts the electric power output of the photovoltaic energy system by causing a power inverter to limit the electrical energy generated by the photovoltaic field.

In some embodiments, the photovoltaic energy system includes a battery that stores at least a portion of the electrical energy generated by the photovoltaic field. The controller may adjust the electric power output of the photovoltaic energy system using energy from the battery to supplement an electric power output of the photovoltaic field.

In some embodiments, the cloud detectors include one or more solar intensity sensors located outside the photovoltaic field and configured to measure a solar intensity at one or more locations outside the photovoltaic field.

In some embodiments, the photovoltaic field includes a plurality of photovoltaic cells and the cloud detectors include one or more of the photovoltaic cells. In some embodiments, the controller monitors individual power outputs of the photovoltaic cells and predicts the change in solar intensity within the photovoltaic field in response to one or more of the individual power outputs dropping below a threshold value.

In some embodiments, the cloud detectors include one or more cameras that capture visual images of the cloud approaching the photovoltaic field. The one or more cameras may include at least one of an upward-oriented camera positioned at an altitude below the cloud and a downward-oriented camera positioned at an altitude above the cloud. In some embodiments, the downward-oriented camera is a satellite camera that captures the visual images of the cloud from space.

In some embodiments, the cloud detectors include one or more radar devices. In some embodiments, the cloud detectors include a weather service and the input from the cloud detectors includes a data signal from the weather service. In some embodiments, the controller uses the input from the cloud detectors to determine at least one of a size and a position of the cloud approaching the photovoltaic field. In some embodiments, the controller uses the input from the cloud detectors to determine a velocity of the cloud approaching the photovoltaic field. In some embodiments, the controller uses the input from the cloud detectors to determine an opacity of the cloud approaching the photovoltaic field.

Another implementation of the present disclosure is another photovoltaic energy system. The photovoltaic energy system includes a photovoltaic field that converts solar energy into electrical energy provided as an electric power output of the photovoltaic energy system. The system includes one or more cloud detectors that detect a cloud approaching the photovoltaic field and a controller that uses input from the one or more cloud detectors to predict a disturbance in the electric power output of the photovoltaic energy system. The controller preemptively adjusts the electric power output of the photovoltaic energy system before the disturbance occurs in accordance with a predetermined ramp rate.

In some embodiments, the predetermined ramp rate defines a threshold rate of change for the electric power output of the photovoltaic energy system. In some embodiments, preemptively adjusting the electric power output of the photovoltaic energy system includes ramping down the electric power output in accordance with the predetermined ramp rate. In some embodiments, preemptively adjusting the electric power output of the photovoltaic energy system includes ramping down the electric power output without using energy from a battery.

In some embodiments, the cloud detectors include one or more solar intensity sensors located outside the photovoltaic field and configured to measure a solar intensity at one or more locations outside the photovoltaic field.

In some embodiments, the photovoltaic energy system includes a power inverter that converts a direct current (DC) output of the photovoltaic field into an alternating current (AC) output. The AC output may define the electric power output of the photovoltaic energy system. In some embodiments, the controller preemptively adjusts the electric power output of the photovoltaic energy system by causing the power inverter to limit the electrical energy generated by the photovoltaic field.

In some embodiments, predicting the disturbance in the electric power output includes using input from the cloud detectors to predict a change in solar intensity within the photovoltaic field before the change in solar intensity occurs within the photovoltaic field.

In some embodiments, the controller uses the input from the cloud detectors to determine a time at which the disturbance is expected to occur and an amount by which the electric power output is expected to decrease as a result of the disturbance. In some embodiments, the controller uses the amount by which the electric power output is expected to decrease in combination with the predetermined ramp rate to determine a minimum amount of time required to decrease the electric power output without exceeding the predetermined ramp rate. In some embodiments, the controller determines a time at which to begin ramping down the electric power output by subtracting the minimum amount of time required to decrease the electric power output from the time at which the disturbance is expected to occur.

In some embodiments, the controller uses a predictive control technique (e.g., feedforward control, model predictive control, etc.) to predict the disturbance in the electric power output of the photovoltaic energy system and preemptively adjust the electric power output of the photovoltaic energy system before the disturbance occurs. In some embodiments, the controller monitors an actual ramp rate of the electric power output and uses feedback control to maintain the actual ramp rate within a range defined at least partially by the predetermined ramp rate.

Another implementation of the present disclosure is another photovoltaic energy system. The photovoltaic energy system includes a photovoltaic field that converts solar energy into electrical energy. The photovoltaic field includes a first photovoltaic device at a first location within the photovoltaic field and a second photovoltaic device at a second location within the photovoltaic field. The system includes a controller that monitors individual power outputs of the first photovoltaic device and the second photovoltaic device. The controller uses the individual power output of the first photovoltaic device to detect a change in solar intensity at the first location and to predict a change in solar intensity at the second location before the change in solar intensity occurs at the second location. The controller preemptively adjusts an electric power output of the photovoltaic energy system in response to predicting the change in solar intensity at the second location. In some embodiments, the controller uses the predicted change in solar intensity at the second location to predict a change in an electric power output of the photovoltaic field.

In some embodiments, the photovoltaic energy system includes a power inverter that converts a direct current (DC) output of the photovoltaic field into an alternating current (AC) output and provides the AC output to an energy grid. The AC output may define the electric power output of the photovoltaic energy system.

In some embodiments, the controller preemptively adjusts the electric power output of the photovoltaic energy system by causing the power inverter to limit the electrical energy generated by the photovoltaic field. In some embodiments, preemptively adjusting the electric power output of the photovoltaic energy system includes ramping down the electric power output in accordance with a predetermined ramp rate.

In some embodiments, the controller uses the individual power outputs to predict a disturbance in the electric power output of the photovoltaic energy system and uses a predictive control technique (e.g., feedforward control, model predictive control, etc.) to preemptively adjust the electric power output before the disturbance occurs. In some embodiments, the controller uses the individual power output of the first photovoltaic device to calculate a rate of change of the individual power output of the first photovoltaic device. The rate of change may define an actual ramp rate. In some embodiments, the controller compares the actual ramp rate to a threshold ramp rate and uses feedback control to adjust the electric power output of the photovoltaic energy system in response to the actual ramp rate exceeding the threshold ramp rate.

In some embodiments, the controller adjusts the electric power output of the photovoltaic energy system by causing a power inverter to limit the electrical energy generated by the photovoltaic field. In some embodiments, preemptively adjusting the electric power output of the photovoltaic energy system includes ramping down the electric power output without using energy from a battery.

In some embodiments, the controller uses the individual power inputs from the photovoltaic devices to detect a cloud approaching the photovoltaic field. In some embodiments, the controller uses the individual power inputs from the photovoltaic devices to determine at least one of a size and a position of the cloud approaching the photovoltaic field. In some embodiments, the controller uses the individual power inputs from the photovoltaic devices to determine a velocity of the cloud approaching the photovoltaic field. In some embodiments, the controller uses the individual power inputs from the photovoltaic devices to determine an opacity of the cloud approaching the photovoltaic field.

Another implementation of the present disclosure is a renewable energy system. The renewable energy system includes a renewable energy field that converts a renewable energy source into electrical energy and one or more sensors configured to detect a change in an environmental condition that will affect an electric power output of the renewable energy field. The system includes a controller that uses input from the one or more sensors to predict a disturbance in the electric power output of the renewable energy field. The controller preemptively adjusts the electric power output of the renewable energy field before the disturbance occurs in accordance with a predetermined ramp rate.

In some embodiments, the renewable energy field includes at least one of a photovoltaic field, a wind turbine field, a hydroelectric field, a tidal energy field, and a geothermal energy field. In some embodiments, the predetermined ramp rate defines a threshold rate of change for the electric power output of the renewable energy system. In some embodiments, the sensors are located outside the renewable energy field and configured to detect the change in the environmental condition before the change occurs within the renewable energy field.

In some embodiments, preemptively adjusting the electric power output of the renewable energy field includes ramping down the electric power output in accordance with the predetermined ramp rate. In some embodiments, preemptively adjusting the electric power output of the renewable energy field includes ramping down the electric power output without using energy from a battery.

In some embodiments, the renewable energy system includes a power inverter that converts a direct current (DC) output of the renewable energy field into an alternating current (AC) output and provides the AC output to an energy grid. In some embodiments, the controller preemptively adjusts the electric power output of the renewable energy field by causing the power inverter to limit the electrical energy generated by the renewable energy field.

In some embodiments, predicting the disturbance in the electric power output includes using input from the sensors to predict a change in the environmental condition within the renewable energy field before the change in the environmental condition occurs within the renewable energy field.

In some embodiments, the controller uses the input from the one or more sensors to determine a time at which the disturbance is expected to occur and an amount by which the electric power output is expected to decrease as a result of the disturbance. In some embodiments, the controller uses the amount by which the electric power output is expected to decrease in combination with the predetermined ramp rate to determine a minimum amount of time required to decrease the electric power output without exceeding the predetermined ramp rate. In some embodiments, the controller determines a time at which to begin ramping down the electric power output by subtracting the minimum amount of time required to decrease the electric power output from the time at which the disturbance is expected to occur.

In some embodiments, the controller uses a predictive control technique (e.g., feedforward control, model predictive control, etc.) to predict the disturbance in the electric power output of the renewable energy field and preemptively adjust the electric power output of the renewable energy field before the disturbance occurs. In some embodiments, the controller monitors an actual ramp rate of the electric power output and uses feedback control to maintain the actual ramp rate within a range defined at least partially by the predetermined ramp rate Configuration of Exemplary Embodiments The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A photovoltaic energy system comprising:

a photovoltaic field configured to convert solar energy into electrical energy;

a power inverter configured to control an electric power output of the photovoltaic field;

a battery; and a controller configured to determine optimal power setpoints for the power inverter by optimizing a value function that includes a penalty cost for failing to comply with a ramp rate limit, photovoltaic revenue as a function of the optimal power setpoints, a cost of battery capacity loss, and battery operating cost as a function of the optimal power setpoints, wherein the controller is configured to estimate the penalty cost of failing to comply with the ramp rate limit as a function of a number of noncompliance events and an amount by which an actual rate of change of the electric power output exceeds the ramp rate limit.

2. The photovoltaic energy system of claim 1, wherein the power inverter is configured to control the power output of the photovoltaic field to an energy grid.

3. The photovoltaic energy system of claim 1, wherein the power inverter is configured to convert a direct current (DC) output of the photovoltaic field into an alternating current (AC) output and provide the AC output to an energy grid, the AC output defining an electric power output of the photovoltaic energy system.

4. The photovoltaic energy system of claim 1, wherein the controller is configured to determine a set of optimal power setpoints for the power inverter at each of a plurality of time steps within a prediction window.

5. The photovoltaic energy system of claim 1, wherein the controller is configured to estimate the photovoltaic revenue as a function of an electric power output to an energy grid resulting from the optimal power setpoints and a price of the electric power output to the energy grid.

6. The photovoltaic energy system of claim 1, wherein the controller is configured to optimize the value function over a prediction window comprising a plurality of time steps;

wherein the value function is a summation of the photovoltaic revenue and the penalty cost at each of the plurality of time steps.

7. A photovoltaic energy system comprising:

a photovoltaic field configured to convert solar energy into electrical energy;

a first power inverter configured to control an electric power output of the photovoltaic field;

a battery;

a second power inverter configured to control an electric power output of the battery; and a controller configured to determine optimal power setpoints for the first power inverter and the second power inverter by optimizing a value function that includes a penalty cost for failing to comply with a ramp rate limit, a cost of battery capacity loss, and battery operating cost as a function of the optimal power setpoints, wherein the controller is configured to estimate the penalty cost of failing to comply with the ramp rate limit as a function of a number of noncompliance events and an amount by which an actual rate of change of the electric power output exceeds the ramp rate limit.

8. The photovoltaic energy system of claim 7, wherein the first power inverter is configured to control the electric power output of the photovoltaic field to an energy grid and the second power inverter is configured to control the electric power output of the battery to the energy grid.

9. The photovoltaic energy system of claim 7, wherein the first and second power inverters are configured to convert a direct current (DC) output of the photovoltaic field and the battery into an alternating current (AC) output and provide the AC outputs to an energy grid, the AC outputs defining a total electric power output of the photovoltaic energy system.

10. The photovoltaic energy system of claim 7, wherein the battery is configured to store at least a portion of the electrical energy generated by the photovoltaic field;

wherein the controller is configured to adjust a total electric power output of the photovoltaic energy system using electrical energy from the battery to supplement the electric power output of the photovoltaic field.

11. The photovoltaic energy system of claim 7, wherein the controller is configured to estimate the battery operating cost as a function of at least one of:

cost of charging the battery;

cost of discharging the battery; and heat generation from the battery.

12. The photovoltaic energy system of claim 7, wherein the value function further comprises at least one of:

estimated revenue from an electric power output of the photovoltaic energy system to an energy grid;

estimated cost of failing to comply with a ramp rate limit; and electric power losses within at least one of the first power inverter and the second power inverter.

13. The photovoltaic energy system of claim 7, wherein the controller is configured to determine a set of optimal power setpoints for the first power inverter and the second power inverter at each of a plurality of time steps within a prediction window.

14. A renewable energy system comprising:

a renewable energy field configured to convert a renewable energy source into electrical energy;

a first power inverter configured to control a power output of the renewable energy field;

a battery;

a second power inverter configured to control a power output of the battery; and a controller configured to determine optimal power setpoints for the first power inverter and the second power inverter by optimizing a value function that includes a penalty cost for failing to comply with a ramp rate limit, a cost of battery capacity loss, and battery operating cost as a function of the optimal power setpoints, wherein the controller is configured to estimate the penalty cost of failing to comply with the ramp rate limit as a function of a number of noncompliance events and an amount by which an actual rate of change of the electric power output exceeds the ramp rate limit.

15. The renewable energy system of claim 14, wherein the renewable energy field comprises at least one of a photovoltaic field, a wind turbine field, a hydroelectric field, a tidal energy field, and a geothermal energy field.

16. The renewable energy system of claim 14, wherein the first power inverter is configured to control the electric power output of the renewable energy field to an energy grid and the second power inverter is configured to control the electric power output of the battery to the energy grid.

17. The renewable energy system of claim 14, wherein the battery is configured to store at least a portion of the electrical energy generated by the renewable energy field;

wherein the controller is configured to adjust a total electric power output of the renewable energy system using electrical energy from the battery to supplement the electric power output of the renewable energy field.

18. The renewable energy system of claim 14, wherein the controller is configured to estimate the battery operating cost as a function of at least one of:

cost of charging the battery;

cost of discharging the battery; and heat generation from the battery.

19. The renewable energy system of claim 14, wherein the controller is configured to determine a set of optimal power setpoints for the first power inverter and the second power inverter at each of a plurality of time steps within a prediction window.

* * * * *